US008035612B2

(12) United States Patent  (10) Patent No.: US 8,035,612 B2
Bell et al.  (45) Date of Patent: Oct. 11, 2011

(54) SELF-CONTAINED INTERACTIVE VIDEO DISPLAY SYSTEM

(75) Inventors: Matthew Bell, Palo Alto, CA (US); Philip Gleckman, Boulder, CO (US); Joshua Zide, Santa Barbara, CA (US); Helen Shaughnessy, Mountain View, CA (US)

(73) Assignee: Intellectual Ventures Holding 67 LLC, Las Vegas, NV (US)

( * ) Notice: Subject to any disclaimer, the term of this patent is extended or adjusted under 35 U.S.C. 154(b) by 1207 days.

(21) Appl. No.: 10/946,263

(22) Filed: Sep. 20, 2004

(65) Prior Publication Data

US 2005/0162381 A1    Jul. 28, 2005

Related U.S. Application Data

(63) Continuation-in-part of application No. 10/160,217, filed on May 28, 2002, now Pat. No. 7,259,747.

(60) Provisional application No. 60/504,375, filed on Sep. 18, 2003, provisional application No. 60/514,024, filed on Oct. 24, 2003, provisional application No. 60/528,439, filed on Dec. 9, 2003, provisional application No. 60/554,520, filed on Mar. 18, 2004.

(51) Int. Cl.
*G09G 5/00*  (2006.01)

(52) U.S. Cl. ........................................ 345/156; 345/158

(58) Field of Classification Search .......... 345/156–168, 345/173–179; 178/18.01–18.07, 19.01–19.06
See application file for complete search history.

(56) References Cited

U.S. PATENT DOCUMENTS

| 2,917,980 A | 12/1959 | Grube et al. |
| 3,068,754 A | 12/1962 | Benjamin et al. |
| 3,763,468 A | 10/1973 | Ovshinsky et al. |
| 4,053,208 A | 10/1977 | Kato et al. |
| 4,275,395 A | 6/1981 | Dewey et al. |
| 4,573,191 A | 2/1986 | Kidode et al. |
| 4,725,863 A | 2/1988 | Dumbreck et al. |
| 4,843,568 A | 6/1989 | Krueger et al. |

(Continued)

FOREIGN PATENT DOCUMENTS

EP    0 055 366 A2    7/1982

(Continued)

OTHER PUBLICATIONS

Leibe B, et al: Toward Spontaneous Interaction With the Perceptive Workbench IEEE Computer Graphics and Applications, IEEE Inc. New Your, US, vol. 20, No. 6 Nov. 2000, pp. 54-64, XP000969594, ISSN: 0272-1716 the whole document.

(Continued)

*Primary Examiner* — Vijay Shankar
(74) *Attorney, Agent, or Firm* — Knobbe, Martens, Olson & Bear, LLP

(57) ABSTRACT

A self-contained interactive video display system. A projector projects a visual image onto a screen for displaying the visual image, wherein the projector projects the visual image onto a back side of the screen for presentation to a user on a front side of the screen. An illuminator illuminates an object near the front side of the screen. A camera detects interaction of an illuminated object with the visual image, wherein the screen is at least partially transparent to light detectable to the camera, allowing the camera to detect the illuminated object through the screen. A computer system directs the projector to change the visual image in response to the interaction.

35 Claims, 37 Drawing Sheets

U.S. PATENT DOCUMENTS

| | | | |
|---|---|---|---|
| 4,887,898 A | 12/1989 | Halliburton et al. | |
| 4,948,371 A * | 8/1990 | Hall | 434/21 |
| 5,001,558 A | 3/1991 | Burley et al. | |
| 5,138,304 A | 8/1992 | Bronson | |
| 5,151,718 A | 9/1992 | Nelson | |
| 5,239,373 A | 8/1993 | Tang et al. | |
| 5,276,609 A * | 1/1994 | Durlach | 40/426 |
| 5,319,496 A | 6/1994 | Jewell et al. | |
| 5,325,472 A | 6/1994 | Horiuchi et al. | |
| 5,325,473 A | 6/1994 | Monroe et al. | |
| 5,426,474 A | 6/1995 | Rubtsov et al. | |
| 5,436,639 A | 7/1995 | Arai et al. | |
| 5,442,252 A | 8/1995 | Golz | |
| 5,454,043 A | 9/1995 | Freeman | |
| 5,497,269 A | 3/1996 | Gal | |
| 5,510,828 A | 4/1996 | Lutterbach et al. | |
| 5,526,182 A | 6/1996 | Jewell et al. | |
| 5,528,263 A | 6/1996 | Platzker et al. | |
| 5,528,297 A | 6/1996 | Seegert et al. | |
| 5,534,917 A | 7/1996 | MacDougall | |
| 5,548,694 A | 8/1996 | Gibson | |
| 5,591,972 A | 1/1997 | Noble et al. | |
| 5,594,469 A | 1/1997 | Freeman et al. | |
| 5,633,691 A | 5/1997 | Vogeley et al. | |
| 5,703,637 A | 12/1997 | Miyazaki et al. | |
| 5,808,784 A | 9/1998 | Ando et al. | |
| 5,861,881 A | 1/1999 | Freeman et al. | |
| 5,882,204 A | 3/1999 | Iannazo et al. | |
| 5,923,380 A | 7/1999 | Yang | |
| 5,923,475 A | 7/1999 | Kurtz et al. | |
| 5,953,152 A | 9/1999 | Hewlett | |
| 5,969,754 A | 10/1999 | Zeman | |
| 5,978,136 A | 11/1999 | Ogawa et al. | |
| 5,982,352 A | 11/1999 | Pryor | |
| 6,008,800 A | 12/1999 | Pryor | |
| 6,058,397 A | 5/2000 | Barrus et al. | |
| 6,075,895 A | 6/2000 | Qiao et al. | |
| 6,084,979 A | 7/2000 | Kanade et al. | |
| 6,088,612 A | 7/2000 | Blair | |
| 6,097,369 A | 8/2000 | Wambach | |
| 6,106,119 A | 8/2000 | Edwards | |
| 6,118,888 A | 9/2000 | Chino et al. | |
| 6,125,198 A | 9/2000 | Onda | |
| 6,166,744 A | 12/2000 | Jaszlics et al. | |
| 6,176,782 B1 | 1/2001 | Lyons et al. | |
| 6,191,773 B1 | 2/2001 | Maruno et al. | |
| 6,198,487 B1 | 3/2001 | Fortenbery et al. | |
| 6,198,844 B1 | 3/2001 | Nomura | |
| 6,263,339 B1 | 7/2001 | Hirsh | |
| 6,292,171 B1 * | 9/2001 | Fu et al. | 345/156 |
| 6,308,565 B1 | 10/2001 | French et al. | |
| 6,323,895 B1 | 11/2001 | Sata | |
| 6,333,735 B1 | 12/2001 | Anvekar | |
| 6,335,977 B1 | 1/2002 | Kage | |
| 6,339,748 B1 * | 1/2002 | Hiramatsu | 702/159 |
| 6,349,301 B1 | 2/2002 | Mitchell et al. | |
| 6,353,428 B1 | 3/2002 | Maggioni et al. | |
| 6,359,612 B1 | 3/2002 | Peter et al. | |
| 6,388,657 B1 | 5/2002 | Natoli | |
| 6,400,374 B2 | 6/2002 | Lanier | |
| 6,407,870 B1 | 6/2002 | Hurevich et al. | |
| 6,414,672 B2 | 7/2002 | Rekimoto et al. | |
| 6,445,815 B1 | 9/2002 | Sato | |
| 6,454,419 B2 | 9/2002 | Kitazawa | |
| 6,480,267 B2 | 11/2002 | Yanagi et al. | |
| 6,491,396 B2 | 12/2002 | Karasawa et al. | |
| 6,501,515 B1 | 12/2002 | Iwamura | |
| 6,522,312 B2 | 2/2003 | Ohshima et al. | |
| 6,545,706 B1 | 4/2003 | Edwards et al. | |
| 6,552,760 B1 | 4/2003 | Gotoh et al. | |
| 6,598,978 B2 | 7/2003 | Hasegawa | |
| 6,607,275 B1 | 8/2003 | Cimini et al. | |
| 6,611,241 B1 | 8/2003 | Firester | |
| 6,654,734 B1 | 11/2003 | Mani et al. | |
| 6,658,150 B2 | 12/2003 | Tsuji et al. | |
| 6,661,918 B1 | 12/2003 | Gordon et al. | |
| 6,677,969 B1 | 1/2004 | Hongo | |
| 6,707,054 B2 | 3/2004 | Ray | |
| 6,707,444 B1 | 3/2004 | Hendriks et al. | |
| 6,712,476 B1 | 3/2004 | Ito et al. | |
| 6,720,949 B1 * | 4/2004 | Pryor et al. | 345/158 |
| 6,732,929 B2 | 5/2004 | Good et al. | |
| 6,747,666 B2 | 6/2004 | Utterback | |
| 6,752,720 B1 | 6/2004 | Clapper et al. | |
| 6,754,370 B1 | 6/2004 | Hall-Holt et al. | |
| 6,791,700 B2 | 9/2004 | Omura et al. | |
| 6,826,727 B1 | 11/2004 | Mohr et al. | |
| 6,831,664 B2 | 12/2004 | Marmaropoulos et al. | |
| 6,871,982 B2 | 3/2005 | Holman et al. | |
| 6,877,882 B1 | 4/2005 | Haven et al. | |
| 6,912,313 B2 | 6/2005 | Li | |
| 6,965,693 B1 | 11/2005 | Kondo et al. | |
| 6,971,700 B2 | 12/2005 | Blanger et al. | |
| 6,975,360 B2 | 12/2005 | Slatter | |
| 6,999,600 B2 | 2/2006 | Venetianer | |
| 7,015,894 B2 | 3/2006 | Morohoshi | |
| 7,042,440 B2 | 5/2006 | Pryor | |
| 7,054,068 B2 | 5/2006 | Yoshida et al. | |
| 7,058,204 B2 | 6/2006 | Hildreth et al. | |
| 7,068,274 B2 | 6/2006 | Welch et al. | |
| 7,069,516 B2 | 6/2006 | Rekimoto | |
| 7,088,508 B2 | 8/2006 | Ebina et al. | |
| 7,149,262 B1 | 12/2006 | Nayar et al. | |
| 7,158,676 B1 | 1/2007 | Rainsford | |
| 7,170,492 B2 | 1/2007 | Bell | |
| 7,190,832 B2 | 3/2007 | Frost et al. | |
| 7,193,608 B2 | 3/2007 | Stuerzlinger | |
| 7,227,526 B2 | 6/2007 | Hildreth et al. | |
| 7,259,747 B2 | 8/2007 | Bell | |
| 7,262,874 B2 | 8/2007 | Suzuki | |
| 7,289,130 B1 | 10/2007 | Satoh et al. | |
| 7,330,584 B2 | 2/2008 | Weiguo et al. | |
| 7,339,521 B2 | 3/2008 | Scheidemann et al. | |
| 7,348,963 B2 | 3/2008 | Bell | |
| 7,379,563 B2 | 5/2008 | Shamaie | |
| 7,382,897 B2 | 6/2008 | Brown et al. | |
| 7,394,459 B2 | 7/2008 | Bathiche et al. | |
| 7,428,542 B1 | 9/2008 | Fink et al. | |
| 7,432,917 B2 | 10/2008 | Wilson et al. | |
| 7,536,032 B2 | 5/2009 | Bell | |
| 7,559,841 B2 | 7/2009 | Hashimoto | |
| 7,576,727 B2 | 8/2009 | Bell | |
| 7,598,942 B2 | 10/2009 | Underkoffler et al. | |
| 7,619,824 B2 | 11/2009 | Poulsen | |
| 7,665,041 B2 | 2/2010 | Wilson et al. | |
| 7,710,391 B2 | 5/2010 | Bell et al. | |
| 7,737,636 B2 | 6/2010 | Li et al. | |
| RE41,685 E | 9/2010 | Feldman et al. | |
| 7,809,167 B2 | 10/2010 | Bell | |
| 7,834,846 B1 | 11/2010 | Bell | |
| 2001/0012001 A1 * | 8/2001 | Rekimoto et al. | 345/173 |
| 2001/0033675 A1 | 10/2001 | Maurer et al. | |
| 2002/0006583 A1 | 1/2002 | Michiels et al. | |
| 2002/0032697 A1 | 3/2002 | French et al. | |
| 2002/0041327 A1 * | 4/2002 | Hildreth et al. | 348/42 |
| 2002/0064382 A1 | 5/2002 | Hildreth et al. | |
| 2002/0081032 A1 | 6/2002 | Chen et al. | |
| 2002/0103617 A1 | 8/2002 | Uchiyama et al. | |
| 2002/0105623 A1 | 8/2002 | Pinhanez | |
| 2002/0130839 A1 | 9/2002 | Wallace et al. | |
| 2002/0140633 A1 | 10/2002 | Rafii et al. | |
| 2002/0140682 A1 | 10/2002 | Brown et al. | |
| 2002/0178440 A1 | 11/2002 | Agnihotri et al. | |
| 2002/0186221 A1 | 12/2002 | Bell | |
| 2003/0032484 A1 | 2/2003 | Ohshima et al. | |
| 2003/0076293 A1 | 4/2003 | Mattsson | |
| 2003/0091724 A1 | 5/2003 | Mizoguchi | |
| 2003/0093784 A1 | 5/2003 | Dimitrova et al. | |
| 2003/0098819 A1 | 5/2003 | Sukthankar et al. | |
| 2003/0103030 A1 | 6/2003 | Wu | |
| 2003/0113018 A1 | 6/2003 | Nefian et al. | |
| 2003/0122839 A1 | 7/2003 | Matraszek et al. | |
| 2003/0137494 A1 | 7/2003 | Tulbert | |
| 2003/0161502 A1 | 8/2003 | Morihara et al. | |
| 2003/0178549 A1 | 9/2003 | Ray | |
| 2004/0005924 A1 | 1/2004 | Watabe et al. | |
| 2004/0015783 A1 | 1/2004 | Lennon et al. | |

| | | | |
|---|---|---|---|
| 2004/0046736 | A1 | 3/2004 | Pryor et al. |
| 2004/0046744 | A1 | 3/2004 | Rafii et al. |
| 2004/0073541 | A1 | 4/2004 | Lindblad et al. |
| 2004/0091110 | A1 | 5/2004 | Barkans |
| 2004/0095768 | A1 | 5/2004 | Watanabe et al. |
| 2004/0183775 | A1 | 9/2004 | Bell |
| 2005/0088407 | A1 | 4/2005 | Bell |
| 2005/0089194 | A1 | 4/2005 | Bell |
| 2005/0104506 | A1 | 5/2005 | Youh et al. |
| 2005/0110964 | A1 | 5/2005 | Bell |
| 2005/0122308 | A1 | 6/2005 | Bell et al. |
| 2005/0132266 | A1 | 6/2005 | Ambrosino et al. |
| 2005/0147282 | A1 | 7/2005 | Fujii |
| 2005/0162381 | A1 | 7/2005 | Bell et al. |
| 2005/0185828 | A1 | 8/2005 | Semba et al. |
| 2005/0195598 | A1 | 9/2005 | Dancs et al. |
| 2005/0265587 | A1 | 12/2005 | Schneider |
| 2006/0010400 | A1 | 1/2006 | Dehlin et al. |
| 2006/0031786 | A1 | 2/2006 | Hillis et al. |
| 2006/0132432 | A1 | 6/2006 | Bell |
| 2006/0139314 | A1 | 6/2006 | Bell |
| 2006/0168515 | A1 | 7/2006 | Dorsett, Jr. et al. |
| 2006/0184993 | A1 | 8/2006 | Goldthwaite et al. |
| 2006/0187545 | A1 | 8/2006 | Doi |
| 2006/0227099 | A1 | 10/2006 | Han et al. |
| 2006/0242145 | A1 | 10/2006 | Krishnamurthy et al. |
| 2006/0256382 | A1 | 11/2006 | Matraszek et al. |
| 2006/0258397 | A1 | 11/2006 | Kaplan et al. |
| 2006/0294247 | A1 | 12/2006 | Hinckley et al. |
| 2007/0285419 | A1 | 2/2007 | Givon |
| 2008/0040692 | A1 | 2/2008 | Sunday et al. |
| 2008/0062123 | A1 | 3/2008 | Bell |
| 2008/0090484 | A1 | 4/2008 | Lee et al. |
| 2008/0150890 | A1 | 6/2008 | Bell et al. |
| 2008/0150913 | A1 | 6/2008 | Bell et al. |
| 2008/0245952 | A1 | 10/2008 | Troxell et al. |
| 2008/0252596 | A1 | 10/2008 | Bell et al. |
| 2009/0027337 | A1 | 1/2009 | Hildreth |
| 2009/0077504 | A1 | 3/2009 | Bell et al. |
| 2009/0102788 | A1 | 4/2009 | Nishida et al. |
| 2009/0225196 | A1 | 9/2009 | Bell et al. |
| 2009/0235295 | A1 | 9/2009 | Bell et al. |
| 2009/0251685 | A1 | 10/2009 | Bell et al. |
| 2010/0026624 | A1 | 2/2010 | Bell et al. |
| 2010/0039500 | A1 | 2/2010 | Bell et al. |
| 2010/0060722 | A1 | 3/2010 | Bell et al. |
| 2010/0121866 | A1 | 5/2010 | Bell et al. |

FOREIGN PATENT DOCUMENTS

| | | |
|---|---|---|
| EP | 0 626 636 A2 | 11/1994 |
| EP | 0 913 790 A | 5/1999 |
| EP | 1 689 172 A1 | 6/2002 |
| JP | 57-094672 A | 6/1982 |
| JP | 2000-105583 | 4/2000 |
| JP | 2002-014997 | 1/2002 |
| JP | 2002-092023 | 3/2002 |
| JP | 2002-171507 | 6/2002 |
| JP | 2003-517642 | 5/2003 |
| JP | 2003-271084 | 9/2003 |
| KR | 2003-0058894 | 7/2003 |
| WO | WO 98/38533 A1 | 9/1998 |
| WO | WO 00/16562 A1 | 3/2000 |
| WO | WO 01/63916 A1 | 8/2001 |
| WO | WO 02/01537 A2 | 1/2002 |
| WO | WO 02/100094 A2 | 12/2002 |
| WO | WO 2004/055776 A | 7/2004 |
| WO | WO 2004/097741 A1 | 11/2004 |
| WO | WO 2005/041578 A2 | 5/2005 |
| WO | WO 2005/041579 A3 | 5/2005 |
| WO | WO 2005/057398 A2 | 6/2005 |
| WO | WO 2005/057399 A2 | 6/2005 |
| WO | WO 2005/057921 A2 | 6/2005 |
| WO | WO 2005/091651 A2 | 9/2005 |
| WO | WO 2007/019443 A1 | 2/2007 |
| WO | WO 2008/124820 A1 | 10/2008 |
| WO | WO 2009/035705 A1 | 3/2009 |

OTHER PUBLICATIONS

"EffecTV" Version 0.2.0 released Mar. 27, 2001, available online at <http://web.archive.org/web/20010101-20010625re__http://effectv.sourceforge.net>.

"Index of EffecTV", as downloaded on Apr. 30, 2007 at <http://effectv.cvs.sourceforge.net/effectv/EffecTV/?pathrev=rel__0__2__0>.

2001 Symposium on Interactive 3D Graphics program description, ACM SIGGRAPH, held Mar. 19-21, 2001, Research Triangle Park, NC, downloaded from <http://www.allconferences.com/conferences/2000830092631/>; cited during opposition of European Application No. 02739710.8 filed Jun. 4, 2002.

Affidavit of Daniel Barthels regarding EffecTV, dated May 15, 2007 (partial machine translation), cited during opposition of European Application No. 02739710.8, filed Jun. 4, 2002.

Announcement: Workshop on Perceptual User Interfaces, The Banff Rocky Mountain Resort, Banff, Alberta, Canada, Oct. 20-21, 1997, can be found at <http://www.research.microsoft.com/PUIWorkshop/>, cited during opposition of European Application No. 02739710.8, filed Jun. 4, 2002.

ART+COM Bodymover 2000, as downloaded on Aug. 21, 2009 from <http://www.artcom.de/index.php?option=com__acprojects&page=6&id=28&Itemid=144&details=0&lang=en>, cited during opposition of European Application No. 02739710.8, filed Jun. 4, 2002.

Article 96(2) Communication dated Feb. 25, 2005 in European Application No. 02739710.8.

Article 96(2) Communication dated Mar. 31, 2004 in European Application No. 02739710.8.

Brown, Matthew, et al. "Multi-Image Matching using Multi-Scale Oriented Patches," Technical Report, Dec. 2004, pp. 1-48, available online at <ftp://ftp.research.microsoft.com/pub/tr/TR-2004-133.pdf>.

Brown, Matthew, et al., "Multi-Image Matching using Multi-Scale Oriented Patches," Proceedings of the 2005 IEEE Computer Society Conference on Computer Vision and Pattern Recognition, Conference Publication Date: Jun. 20-25, 2005, 8 pgs.

Buxton, Bill, "Multi-Touch Systems That I Have Known and Loved," accessed Mar. 21, 2007, http://billbuxton.com/multitouchOverview.html.

Communication dated Dec. 10, 2008 from Patentanwalt attaching article by Katy Bachman, entitled "Reactrix Up for Sale," cited during opposition of European Application No. 02739710.8, filed Jun. 4, 2002.

Crouser, P.D., et al., "Unattenuated tracer particle extraction through time-averaged, background image subtraction with outlier rejection," Experiments in Fluids, 22, 1997, 220-228, Springer-Verlag.

Davis, J.W., et al., "SIDEshow: A Silhouette-based Interactive Dual-screen Environment," Aug. 1998, MIT Media Lab Tech Report No. 457.

EffecTV Software Source: effect module, dated May 20, 2001 (German); cited during opposition of European Application No. 02739710.8, filed Jun. 4, 2002.

Elgammal, Ahmed, et al., "Non-parametric Model for Background Subtraction," Jun. 2000, European Conference on Computer Vision, Lecture Notes on Computer Science, vol. 1843, pp. 751-767.

Extended Search Report for European Application No. 06010825.5, filed Jun. 4, 2002, dated Jul. 10, 2006.

Freeman, William, et al., "Computer vision for interactive computer graphics," May-Jun. 1998, IEEE Computer Graphics and Applications, vol. 18, No. 3, pp. 42-53.

GroundFX Document, GestureTek (Very Vivid, Inc.), description available online at <http://www.gesturetek.com/groundfx>, downloaded on Aug. 11, 2006.

Haller, Michael et al., "Coeno-Storyboard: An Augmented Surface for Storyboard Presentations," Mensch & Computer 2005, Sep. 4-7, 2005, Linz, Austria.

International Preliminary Examination Report for PCT/US2002/017843, filed Jun. 4, 2002.

International Preliminary Examination Report on Patentability for PCT/US2004/035477, filed Oct. 25, 2004.

International Preliminary Report on Patentability for PCT/US2004/035478, filed Oct. 25, 2004.
International Preliminary Report on Patentability for PCT/US2004/041318, filed Dec. 9, 2004.
International Preliminary Report on Patentability for PCT/US2004/041319, filed Dec. 9, 2004.
International Preliminary Report on Patentability for PCT/US2004/041320, filed Dec. 9, 2004.
International Preliminary Report on Patentability for PCT/US2005/008984, filed Mar. 18, 2005.
International Preliminary Report on Patentability for PCT/US2006/030720, filed on Aug. 4, 2006.
International Search Report for PCT/US03/40321, filed Dec. 15, 2003.
International Search Report for PCT/US2002/017843, filed Jun. 4, 2002.
International Search Report for PCT/US2004/035477, filed Oct. 25, 2004.
Invitation to Pay Additional Fees and Partial ternational Search Report on Patentability for PCT/US2004/035478, filed Oct. 25, 2004.
International Search Report for PCT/US2004/035478, filed Oct. 25, 2004.
International Search Report for PCT/US2004/041318, filed Dec. 9, 2004.
International Search Report for PCT/US2004/041319, filed Dec. 9, 2004.
International Search Report for PCT/US2004/041320, filed Dec. 9, 2004.
International Search Report for PCT/US2005/008984, filed Mar. 18, 2005.
International Search Report for PCT/US2006/030720, filed Aug. 4, 2006.
International Search Report for PCT/US2008/059900, filed Apr. 10, 2008.
International Search Report for PCT/US2008/10750, filed Sep. 15, 2008.
Ivars Peterson, "Artificial reality; combining a person's live video image with computer graphics suggests novel ways of working and playing with computers" Science News, Jun. 22, 1985.
Jabri, Sumer et al., "Detection and Location of People in Video Images Using Adaptive Fusion of Color and Edge Information;" presented at the Int. Conf. Pattern Recognition, Barcelona, Spain, 2000.
Keays, Bill, "Using High-Bandwidth Input/Output in Interactive Art," Jun. 1999, Master's Thesis, Massachusetts Institute of Technology, School of Architecture and Planning.
Khan, Jeff; "Intelligent Room with a View"; Apr.-May 2004, RealTime Arts Magazine, Issue 60, available online at www.realtimearts.net/article/60/7432.
Kjeldesn, Rick et al., "Dynamically Reconfigurable Vision-Based User Interfaces," Apr. 2003, 3rd International Conference on Vision Systems (ICVVS '03), Graz, Austria, pp. 6-12.
Kreuger, Myron, "Videoplace—An Artificial Reality," Apr. 1985, Conference on Human Factors in Computing Systems, San Francisco, California, pp. 35-40.
Lamarre, Mathieu, et al., "Background subtraction using competing models in the block-DCT domain," Pattern Recognition, 2002 Proceedings, 16 International Conference in Quebec City, Que., Canada, Aug. 11-15, 2002, Los Alamitos, CA, USA, IEEE Comput Soc US.
Lengyel, Jed et al., "Real-Time Robot Motion Planning Using Rasterizing Computer Graphics Hardware," Aug. 1990, ACM SIGGRAPH Computer Graphics, vol. 24, Issue 4, pp. 327-335.
Levin, Golan "Computer Vision for Artists and Designers: Pedagogic Tools and Techniques for Novice Programmers," Aug. 2006, AI & Society, vol. 20, Issue 4, pp. 462-482.
Letter dated May 16, 2007 from Christian Zuckschwerdt regarding EffecTV, (partial machine translation), cited during opposition of European Application No. 02739710.8, filed Jun. 4, 2002.
Lin, Mingxiu et al., "A New Approach for Vision-based Rear Vehicle Tracking," Key Laboratory of Integrated Automation of Process Industry, Ministry of Education, Northeastern University, Shenyang, Liaoning Province, China, held May 23-25, 2007, pp. 107-111.

Malik, Shahzad et al., "Visual Touchpad: A Two-Handed Gestural Input Device," Oct. 13-15, 2004, International Conference on Multimodal Interfaces (ICMI '04).
Microsoft Surface multi-touch interface table unveiled, May 30, 2007, downloaded from http://www.dancewithshadows.com/tech/microsoft-surface.asp.
Microsoft Surface Web Page, downloaded from http://www.microsoft.com/surface/Pages/Product/WhatIs.aspx on Sep. 24, 2009.
Experience Microsoft Surface, downloaded from http://www.microsoft.com/surface/Pages/Product/Specifications.aspx on Sep. 24, 2009.
Microsoft Surface, downloaded from http://en.wikipedia.org/wiki/Microsoft_surface on Sep. 24, 2009.
Mitsubishi DiamondTouch, http://www.merl.com/projects/DiamondTouch/, visited Mar. 21, 2007.
Mo, Zhenyao "SmartCanvas: A Gesture-Driven Intelligent Drawing Desk System," Jan. 9-12, 2005, Proceedings of Intelligent User Interfaces (IUI '05).
Morano, Raymond A. et al., "Structured Light Using Pseudorandom Codes," Mar. 1998, IEEE Transactions on Pattern Analysis and Machine Intelligence, vol. 20, No. 3.
Morris, T. et al., "Real-Time Fingertip Detection for Hand Gesture Recognition," Sep. 9-11, 2002, Advanced Concepts for Intelligent Vision Systems (ACIVS '04), Ghent University, Belgium.
Notice of Opposition in European Application No. 02739710.8 dated May 14, 2007.
Observation by third party Michael Saup dated Jan. 17, 2005, cited during opposition of European Application No. 02739710.8, filed Jun. 4, 2002.
Observation by third party Petra Trefzger dated Jan. 17, 2005, cited during opposition of European Application No. 02739710.8, filed Jun. 4, 2002.
Observation by third party Simon Penny dated Jan. 17, 2005, cited during opposition of European Application No. 02739710.8, filed Jun. 4, 2002.
Plasma; 3 pages; <http://www.particles.de/paradocs/plasma/index.html>, cited in U.S. Appl. No. 10/160,217, filed Aug. 8, 2005.
Reactrix, Inc. website, Mar. 28, 2003, <http://web.archive.org/web/20030328234205/http://www.reactrix.com> and <http://web.archive.org/web/20030328234205/http://www.reactrix.com/webdemo.php>.
Rokeby, David, "Very Nervous System (VNS)," Mar. 1995, Wired Magazine, available online at <http://www.wired.com/wired/archive/3.03/rokeby.html>; sold as software at <http://homepage.mac.com/davidrokeby/softVNS.html>.
Rokeby, David, "softVNS 2 real time video processing and tracking software for Max;" SoftVNS 2 downloads, as downloaded from <http://homepage.mac.com/davidrokeby/softVNS.html> on Mar. 16, 2007.
Sato, Yoichi, et al., "Fast Tracking of Hands and Fingertips in Infrared Images for Augmented Desk Interface," Mar. 2000, 4th International Conference on Automatic Face—and Gesture-Recognition, Grenoble, France.
Schneider, John K., "Improved Fingerprint System Using Rolled and Multi-segmented Techniques," U.S. Appl. No. 60/575,952, filed Jun. 1, 2004, pp. 1-6.
Screenshots of Reactrix Product Demo Video, Mar. 28, 2003, <http://web.archive.org/web/20030407174258/http://www.reactrix.com/demo/reactrix_demo.wmv>.
Sonneck, Georg, et al., "Optimized One-to-One Personalization of Web Applications using a Graph Based Model," IEEE-22, Apr. 26, 2003, 9 pgs.
Stauffer, Chris, et al., "Learning Patterns of Activity Using Real-Time Tracking," Aug. 2000, IEEE Transaction on Pattern Analysis and Machine Intelligence, vol. 22, No. 8, pp. 747-757.
Summons to Attend Oral Proceedings in European Application No. 02739710.8, dated Aug. 12, 2005.
Summons to Attend Oral Proceedings in European Application No. 02739710.8, dated Jun. 12, 2009.
The History of Microsoft Surface, downloaded from http://www.microsoft.com/presspass/presskits/surfacecomputing/docs/SurfaceHistoryBG.doc on Sep. 24, 2009.

Wellner, Pierre, "Interacting with paper on the DigitalDesk," Jul. 1993, Communications of the ACM, Special issue on computer augmented environments: back to the real world, vol. 36, Issue 7, pp. 87-96.

Wellner, Pierre, "Digital Desk Calculator:Tangible Manipulation on a Desktop Display" Proceedings of the Symposium on User Interface Software and Technol (UIST), Hilton Head, S. Carolina, Nov. 11-13, 1991.

Written Opinion for PCT/US2002/017843, filed Jun. 4, 2002, dated Feb. 5, 2003.

Written Opinion of the International Searching Authority for PCT/US2004/035477, filed Oct. 25, 2004.

Written Opinion of the International Searching Authority for PCT/US2004/035478, filed Oct. 25, 2004.

Written Opinion of the International Searching Authority for PCT/US2004/041318, filed Dec. 9, 2004.

Written Opinion of the International Searching Authority for PCT/US2004/041319, filed Dec. 9, 2004.

Written Opinion of the International Searching Authority for PCT/US2004/041320, filed Dec. 9, 2004.

Written Opinion of the International Searching Authority for PCT/US2005/008984, filed Mar. 18, 2005.

Written Opinion of the International Searching Authority for PCT/US2006/030720, filed Aug. 4, 2006.

Written Opinion of the International Searching Authority for PCT/US2008/059900, filed Aug. 10, 2008.

R111, The Transformation From Digital Information to Analog Matter, available online at <http://www.particles.de/paradocs/r111/10mkp2004/hmtl/r111_text111hock04.html>, cited on Jan. 17, 2005 during opposition of European Application No. 02739710.8, filed Jun. 4, 2002.

Bodymover Body Movement as a Means to Obtain an Audiovisual Spatial Experience, 2000 ART+COM AG Berlin; <http://www.artcom.de/index.php?option=com_acprojects&page=6&id=28&Itemid=144& details=0&lang=en>, as downloaded on Aug. 8, 2005.

Demarest, Ken, "Sand," 2000, Mine Control, art installation, available online at <http://www.mine-control.com>, downloaded on Mar. 15, 2007.

Dachselt, Raimund, et al., "CONTIGRA: An XML-Based Architecture for Component-Oriented 3D Applications, 3D Technologies for the World Wide Web, Proceedings of the Seventh International Conference on 3D Technology," ACM, Feb. 24-28, 2002, pp. 155-163.

Foerterer, Holger, "Fluidum," 1999, art installation, description available online at <http://www.foerterer.com/fluidum>, downloaded on Mar. 16, 2007.

Foerterer, Holger, "Helikopter," 2001, art installation, description available online at http://www.foerterer.com/helikopter/index.htm>, downloaded on Mar. 16, 2007.

Frisken, Sarah F. et al., "Adaptively Sampled Distance Fields: A General Representation of Shape for Computer Graphics," Jul. 23-28, 2000, Proceedings of the 27th Annual Conference on Computer Graphics and Interactive Techniques, pp. 249-254.

Fujihata, Masaki, "Beyond Pages," 1995, art installation, description available online at <http://on1.zkm.de/zkm/werke/BeyondPages>, downloaded on Mar. 16, 2007.

Goetz, Frank, et al., "An XML-based Visual Shading Language for Vertex and Fragment Shaders," 3D Technologies for the World Wide Web, Proceedings of Ninth International Conference on 3D Technology; ACM, Apr. 5-8, 2004; pp. 87-97.

Han, Jefferson Y., "Low-Cost Multi-Touch Sensing Through Frustrated Total Internal Reflection," Oct. 23-26, 2005, ACM Symposium on User Interface Software and Technology (UIST).

Harville, Michael et al., "Foreground Segmentation Using Adaptive Mixture Models in Color and Depth," Jul. 8, 2001, Proceedings of IEEE Workshop on Detection and Recognition of Events in Video, pp. 3-11.

Hemmer, Raphael Lozano, "Body Movies," 2002, art project/installation, description available online at <http://www.lozano-hemmer.com/eproyecto.html>, downloaded on Mar. 16, 2007.

Hoff, Kenneth E. III et al, "Fast and Simple 2D Geometric Proximity Queries Using Graphics Hardware," Mar. 19-21, 2001, Proc. of the 2001 Symposium on Interactive 3D Graphics, pp. 145-148.

International Preliminary Report on Patentability for PCT/US2008/059900, filed on Apr. 10, 2008.

Joyce, Arthur W. III, et al., "Implementation and capabilities of a virtual interaction system," Sep. 10-11, 1998, Proceedings 2nd European Conference on Disability, Virtual Reality and Associated Technologies, Skovde, Sweden, pp. 237-245.

Katz Itai et al., "A Multi-Touch Surface Using Multiple Cameras," Oct. 3, 2007, Advanced Concepts for Intelligent Vision Systems, vol. 4678/2007.

Keays, Bill, "metaField Maze," 1998, exhibited at Siggraph'99 Emerging Technologies and Ars Electronica Aug. 8-13, 1999, description available online at <http://www.billkeays.com/metaFieldInfosheet1A.pdf>.

Kjeldsen, R. et al., "Interacting with Steerable Projected Displays," May 20-21, 2002, Proceedings of the 5th International Conference on Automatic Face and Gesture Recognition, Washington, D.C.

Kreuger, Myron, "Videoplace," 1969 and subsequent, summary available online at <http://www.jtnimoy.com/itp/newmediahistory/videoplace>, downloaded Mar. 21, 2007.

Kurapati, Kaushal, et al., "A Multi-Agent TV Recommender," Jul. 13-14, 2001, Workshop on Personalization in Future TV, pp. 1-8, XP02228335.

Lantagne, Michel, et al., "VIP: Vision tool for comparing Images of People," Vision Interface, Jun. 11-13, 2003, pp. 1-8.

Livingston, Mark Alan, "Vision-based Tracking with Dynamic Structured Light for Video See-through Augmented Reality," 1998, Ph.D. Dissertation, University of North Carolina at Chapel Hill, cited on Jun. 18, 2007 during opposition of European Application No. 02739710.8, filed Jun. 4, 2002.

MacIver, Malcolm, et al., "Body Electric," Apr. 15-Jun. 29, 2003, art installation, description available online at <http://www.neuromech.northwestern.edu/uropatagium/#ArtSci>.

Mandala Systems, "Video Gesture Control System Concept," 1986, description available online at <http://www.vividgroup.com/tech.html>, downloaded on Mar. 16, 2007.

Muench, Wolfgang, "Bubbles", Prix Ars Electonica Catalog 1999, Springer-Verlag, Berlin, Germany; available online at <http://hosting.zkm.de/wmuench/bub/text>, downloaded on Mar. 16, 2007.

Provision of the minutes in European Application No. 02739710.8 dated Dec. 28, 2009.

Decision revoking the European Patent in European Application No. 02739710.8 dated Dec. 28, 2009.

Paradiso, Joseph et al., "New Sensor and Music Systems for Large Interactive Surfaces," Aug. 2000, Proceedings of the Interactive Computer Music Conference, Berlin, Germany, pp. 277-280.

Penny, Simon, "Fugitive"; Oct. 1997; <http://www.ace.uci.edu/penny/works/fugitive/fugitive.html>.

Penny, Simon, et al., "Fugitive II," Jan. 8-Mar. 14, 2004, Australian Center for the Moving Image, art installation, description available online at <http://www.acmi.net.au/fugitive.jsp?>.

Penny, Simon, et al.; Traces: Wireless full body tracking in the Cave, Dec. 16-18, 1999; Japan; ICAT Virtual Reality Conference; <http://turing.ace.uci.edu/pennytexts/traces/>.

Pinhanez, C. et al., "Ubiquitous Interactive Graphics," Jul. 29-31, 2003, IBM Research Report RC22495, available at <http://www.research.ibm.com/ed/publications/rc22495.pdf>.

Pinhanez, C., "The Everywhere Displays Projector: A Device to Create Ubiquitous Graphical Interfaces," Ubicomp 2001: Ubiquitous Computing: International Conference Atlanta, Georgia, USA, Sep. 30-Oct. 2, 2001 Proceedings (Lecture Notes in Computer Science), pp. 315-331.

Rekimoto, J., et al., "Perceptual Surfaces: Towards a Human and Object Sensitive Interactive Display," Oct. 19-21, 1997, Proceedings of the Workshop on Perceptual User Interfaces, Banff, Canada, pp. 30-32.

Ringel, M. et al., "Barehands: Implement-Free Interaction with a Wall-Mounted Display," Mar. 31-Apr. 5, 2001, Proceedings of the 2001 ACM CHI Conference on Human Factors in Computing Systems (Extended Abstracts), p. 367-368.

Rogala, Miroslaw, "Lovers Leap," Nov. 21-26, 1995, art installation, Dutch Electronic Arts Festival, description available online at <http://wayback.v2.nl/DEAF/persona/rogala.html>.

Sester, Marie, "Access," Dec. 2001, Interaction 99 Biennial Catalog, Gifu, Japan, available online at <http://www.accessproject.net/concept.html>.
Snibbe, Scott, "Boundary Functions," Sep. 7-12, 1998, art installation, description available online at <http://snibbe.com/scott/bf/index.html>.
Snibbe, Scott, "Screen Series," 2002-2003 art installation, description available online at <http://snibbe.com/scott/screen/index.html>, downloaded on Mar. 16, 2007.
Sparacino, Flavia, et al., "Media in performance: interactive spaces for dance, theater, circus and museum exhibits," Nov. 2000, IBM Systems Journal, vol. 39, No. 3-4, pp. 479-510.
Sparacino, Flavia, "(Some) computer visions based interfaces for interactive art and entertainment installations," 2001, Inter_Face Body Boundaries, Anomalie digital_arts, No. 2, Paris, France, <http://alumni.media.mit.edu/~flavia/publications.html>, cited on Jul. 15, 2005 during opposition of Canadian Application No. 2449300, filed Jun. 4, 2002.
Supreme Particles, "Plasma/Architexture," 1994, available online at <http://www.particles.de/paradocs/plasma/plasma_e.html>, downloaded on May 21, 2007.
Supreme Particles; R111, 1999, available online at <http://www.r111.org>, obtained Jul. 12, 2005, XP-002989704.
Tan, P, et al., "Highlight Removal by Illumination-Constrained Inpainting," Ninth IEEE International Conference on Computer Vision, Oct. 13-16, 2003.
Torr, P.H.S. et al., "The Development and Comparison of Robust Methods for Estimating the Fundamental Matrix," Sep./Oct. 1997, International Journal of Computer Vision, vol. 24, No. 3, pp. 271-300.
Toth, Daniel et al., "Illumination-Invariant Change Detection," Apr. 2-4, 2000, 4th IEEE Southwest Symposium on Image Analysis and Interpretation, p. 3.
Trefzger, Petra, "Vorwerk," 2000, art installation, description available online at <http://www.petracolor.de/> cited on Jan. 17, 2005 during opposition of European Application No. 02739710.8, filed Jun. 4, 2002.
Utterback, Camille, et al., "Text Rain," 1999, art installation, available online at <www.camilleutterback.com/textrain.html>, Mar. 16, 2007.
Vogt, Florian et al., "Highlight Substitution in Light Fields," IEEE International Conference on Image Processing, Sep. 22-25, 2002.
Wang, Junxian, et al., "Specular reflection removal for human detection under aquatic environment," Jun. 27-Jul. 2, 2004 IEEE Conference on Computer and Pattern Recognition Workshop (CVPRW04) vol. 8, p. 130.
Wilson, Andrew, "PlayAnywhere: A Compact Interactive Tabletop Projection-Vision System," ACM Symposium on User Interface Software and Technology (UIST), Oct. 23-27, 2005, Seattle, Washington, U.S.A.
International Preliminary Report on Patentability for PCT/US2008/10750, filed Sep. 15, 2008.
Letter of the opponent O2 dated May 28, 2010 in European Application No. 02739710.8, filed Jun. 4, 2002.
Notice of Opposition in European Application No. 02739710.8 dated Aug. 23, 2010.
Official Report in Australian Application No. 2008299883, dated Dec. 8, 2010.
Extended Search Report for European Application No. 08830473.8, dated Apr. 19, 2011.
Maria Langer, "Mac OS X 10.2: Visual QuickStart Guide," Sep. 17, 2002, Peachpit Press, P. 111.
Office Action in U.S. Appl. No. 10/160,217 (USPN 7,259,747), dated Apr. 22, 2004.
Office Action in U.S. Appl. No. 10/160,217 (USPN 7,259,747), dated Jun. 27, 2006.
Examiner Interview Summary Record in U.S. Appl. No. 10/160,217 (USPN 7,259,747), dated Aug. 15, 2006.
Notice of Allowance in U.S. Appl. No. 10/160,217 (USPN 7,259,747), dated Oct. 18, 2006.
Patent Withdrawal Notice in U.S. Appl. No. 10/160,217 (USPN 7,259,747), dated Mar. 22, 2007.
Notice of Allowance in U.S. Appl. No. 10/160,217 (USPN 7,259,747), dated Jun. 26, 2007.
Office Action in U.S. Appl. No. 10/866,495, dated Apr. 6, 2007.
Office Action in U.S. Appl. No. 10/866,495, dated Oct. 17, 2007.
Office Action in U.S. Appl. No. 10/866,495, dated Jan. 23, 2008.
Office Action in U.S. Appl. No. 10/866,495, dated Sep. 4, 2008.
Office Action in U.S. Appl. No. 10/866,495, dated Aug. 21, 2009.
Examiner Interview Summary Record in U.S. Appl. No. 10/866,495, dated Nov. 18, 2009.
Office Action in U.S. Appl. No. 10/946,084, dated Jul. 10, 2008.
Office Action in U.S. Appl. No. 10/946,084, dated Apr. 9, 2009.
Office Action in U.S. Appl. No. 10/946,08, dated Dec. 7, 2009.
Office Action in U.S. Appl. No. 10/946,084, dated Jun. 28, 2010.
Examiner Interview Summary Record in U.S. Appl. No. 10/946,084, dated Aug. 27, 2010.
Office Action in U.S. Appl. No. 10/946,084, dated Dec. 8, 2010.
Office Action in U.S. Appl. No. 10/946,084, dated Apr. 28, 2011.
Non-Final Rejection in U.S. Appl. No. 10/946,414 (USPN 7,710,391), dated Jan. 29, 2008.
Non-Final Rejection in U.S. Appl. No. 10/946,414 (USPN 7,710,391), dated Aug. 6, 2008.
Final Rejection in U.S. Appl. No. 10/946,414 (USPN 7,710,391), dated May 26, 2009.
Examiner Interview Summary in U.S. Appl. No. 10/946,414 (USPN 7,710,391), dated Jul. 28, 2009.
Notice of Allowance in U.S. Appl. No. 10/946,414 (USPN 7,710,391), dated Nov. 17, 2009.
Notice of Allowance in U.S. Appl. No. 10/946,414 (USPN 7,710,391), dated Feb. 22, 2010.
Non-Final Rejection in U.S. Appl. No. 11/101,900, dated Aug. 6, 2007.
Non-Final Rejection in U.S. Appl. No. 11/507,976, dated Sep. 17, 2007.
Final Rejection in U.S. Appl. No. 11/507,976, dated May 13, 2008.
Non-Final Rejection in U.S. Appl. No. 11/507,976, dated Oct. 29, 2008.
Notice of Allowance in U.S. Appl. No. 11/507,976, dated Sep. 9, 2009.
Notice of Allowance in U.S. Appl. No. 11/507,976, dated Jan. 20, 2010.
Notice of Allowance in U.S. Appl. No. 11/507,976, dated Jul. 13, 2010.
Official Communication in Chinese Application No. 200480034551.4, dated Feb. 19, 2008.
Official Communication in Korean Patent Application No. 2006-7011270, dated Mar. 8, 2011.
Official Communication in European Patent Application No. 04 813 622.0, dated Mar. 4, 2008.
Official Communication in Australian Application No. 2002312346, dated Nov. 14, 2006.
Official Communication in Canadian Patent Application No. 2,449,300, dated Nov. 9, 2009.
Official Communication in Chinese Application No. 02815206.9 dated Dec. 12, 2008.
Official Communication in Chinese Application No. 02815206.9 dated Sep. 25, 2009.
Official Communication in Chinese Application No. 02815206.9 dated Mar. 1, 2010.
Official Communication in Indian Patent Application No. 1582/KOLNP/2003, dated May 22, 2006.
Official Communication in Korean Patent Application No. 10-2003-7015990, dated Nov. 8, 2006.
Non-Final Rejection in U.S. Appl. No. 11/929,778, dated Jul. 27, 2010.
Examiner Interview Summary Record in U.S. Appl. No. 11/929,778, dated Sep. 22, 2010.
Notice of Allowance in U.S. Appl. No. 11/929,778, dated Jan. 3, 2011.
Notice of Allowance in U.S. Appl. No. 11/929,778, dated May 24, 2011.
Non-Final Rejection in U.S. Appl. No. 11/982,290, dated Feb. 15, 2011.

Examiner Interview Summary Record in U.S. Appl. No. 11/982,290, dated Mar. 11, 2011.
Non-Final Rejection in U.S. Appl. No. 11/929,947, dated Oct. 21, 2010.
Examiner Interview Summary Record in U.S. Appl. No. 11/929,947, dated Dec. 14, 2010.
Notice of Allowance in U.S. Appl. No. 11/929,947, dated Apr. 1, 2011.
Non-Final Rejection in U.S. Appl. No. 11/083,851, dated Mar. 8, 2006.
Notice of Allowance in U.S. Appl. No. 11/083,851, dated Sep. 12, 2006.
Non-Final Rejection in U.S. Appl. No. 11/197,941, dated Mar. 8, 2006.
Non-Final Rejection in U.S. Appl. No. 11/197,941, dated Sep. 6, 2006.
Final Rejection in U.S. Appl. No. 11/197,941, dated Mar. 5, 2007.
Notice of Allowance in U.S. Appl. No. 11/197,941, dated Oct. 26, 2007.
Extended Search Report for European Application No. 08830473.8, dated Apr. 19, 2011.
Final Rejection in U.S. Appl. No. 11/982,290, dated Jul. 19, 2011.
Notice of Allowance in U.S. Appl. No. 11/929,947, dated Jun. 30, 2011.
Rekimoto, Jun, "SmartSkin: An Infrastructure for Freehand Manipulation on Interactive Surfaces." vol. No. 4, Issue No. 1, pp. 113-120, Apr. 2002.
Xiao, Yang; "Throughput and Delay Limits of IEEE 802.11," IEEE Communications Letters, vol. 6, No. 8, pp. 355-357, Aug. 2002.
Notice of Allowance in U.S. Appl. No. 11/929,778, dated Jul. 29, 2011.
Examiner Interview Summary Record in U.S. Appl. No. 11/982,290, dated Aug. 5, 2011.

* cited by examiner

BASIC HARDWARE CONFIGURATION

ELIMINATING GLARE THROUGH
POLARIZED FILTERS

FLAT PANEL DISPLAY
CROSS-SECTION

FLAT PANEL DISPLAY TOP
VIEW CUTAWAY

USING A FRESNEL LENS TO CORRECT DISTORTION
IN A SELF-CONTAINED PROJECTED DISPLAY

USING MIRROR STRIPS TO CORRECT FOR DISTORTION

DISPLAY (AND AMBIENT) CHANNEL

ILLUMINATION AND CAPTURE CHANNEL

CROSS SECTION OF SCREEN WITH MICROSCOPIC
SCATTERING RIDGES OR BUMPS
(NOT TO SCALE)

CROSS SECTION OF SCREEN WITH MICROSCOPIC
SCATTERING PITS OR GROOVES
(NOT TO SCALE)

SAMPLE CONFIGURATION FOR EDGE LIGHTING

FLAT PANEL DISPLAY CROSS-SECTION

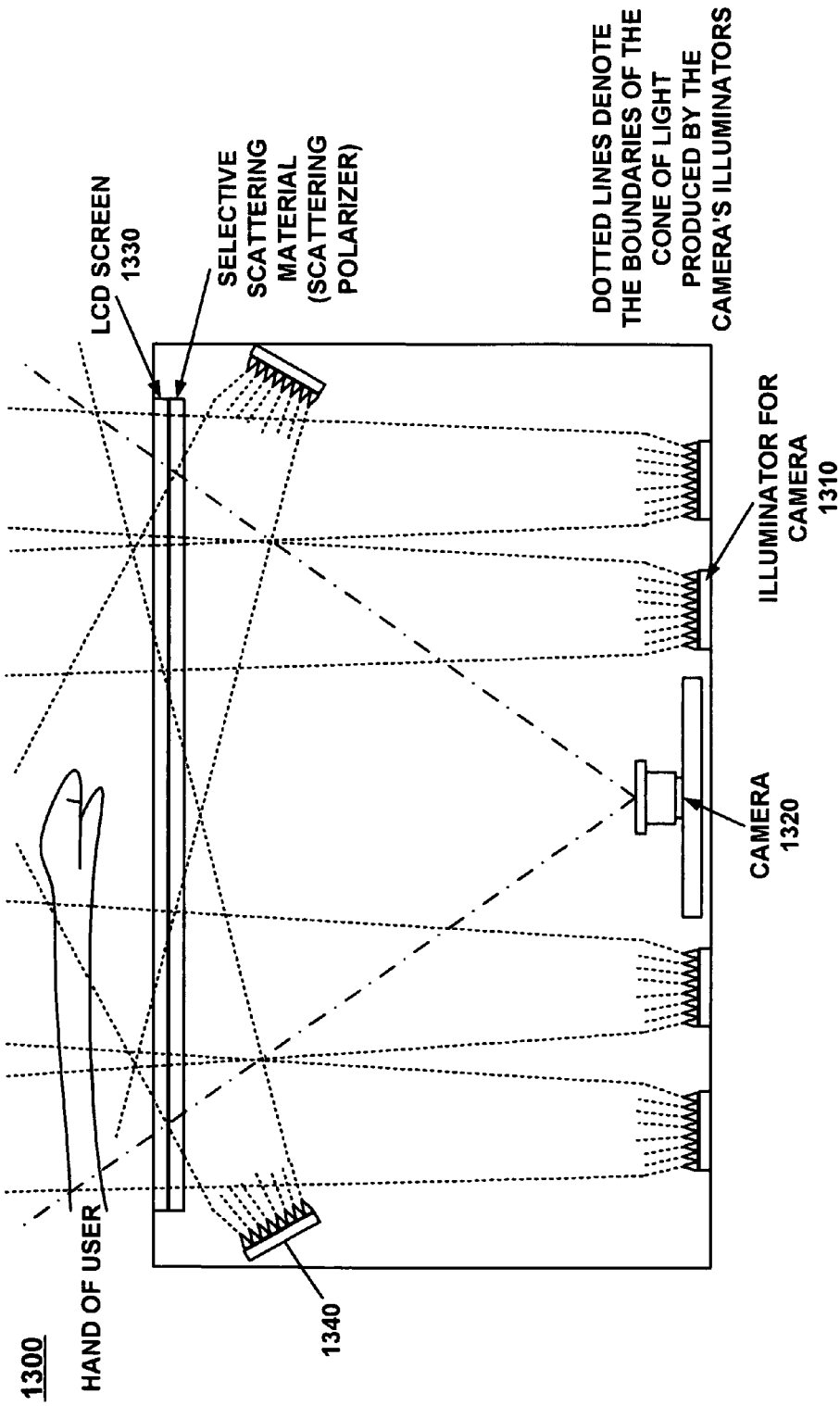

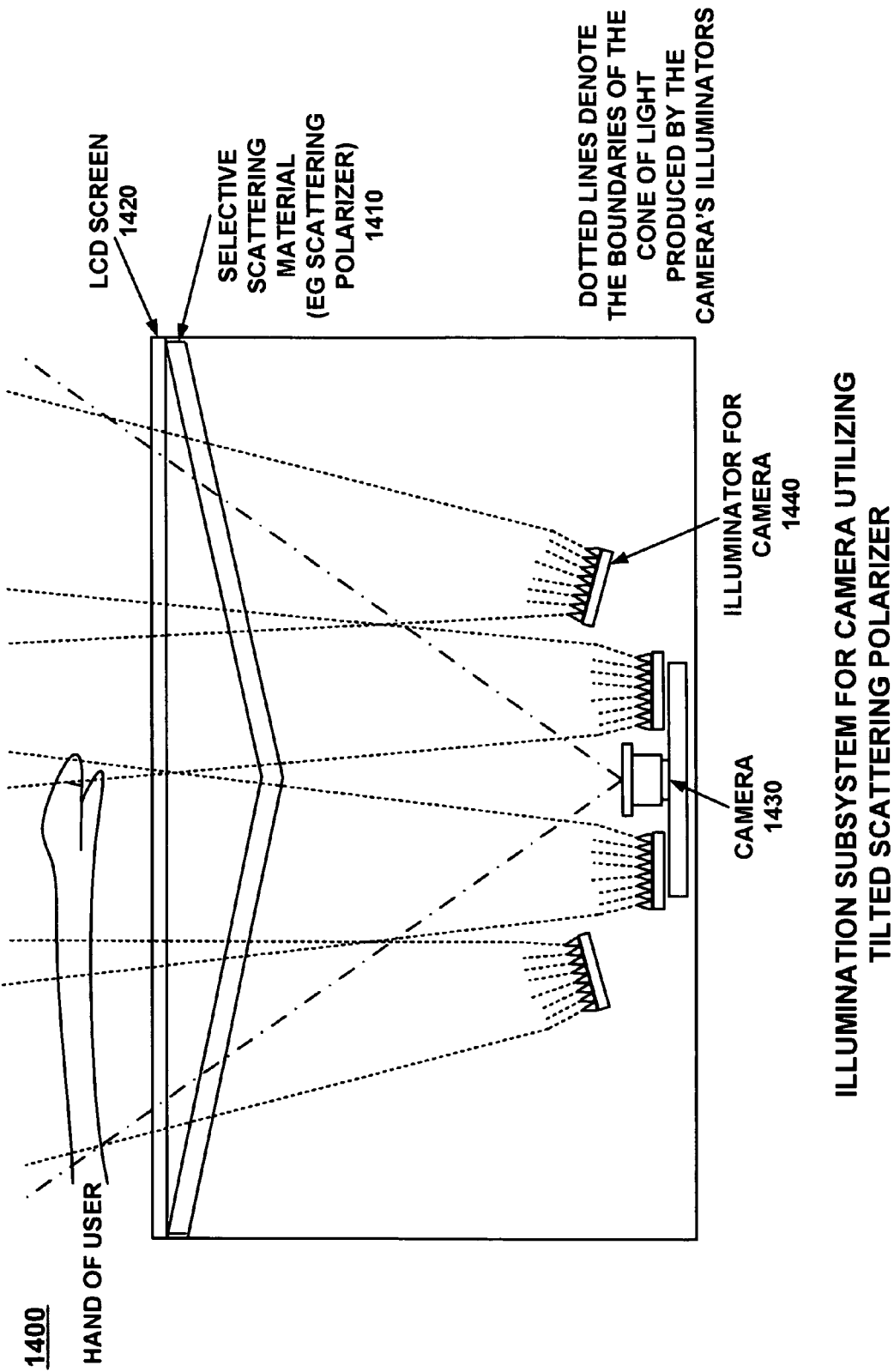

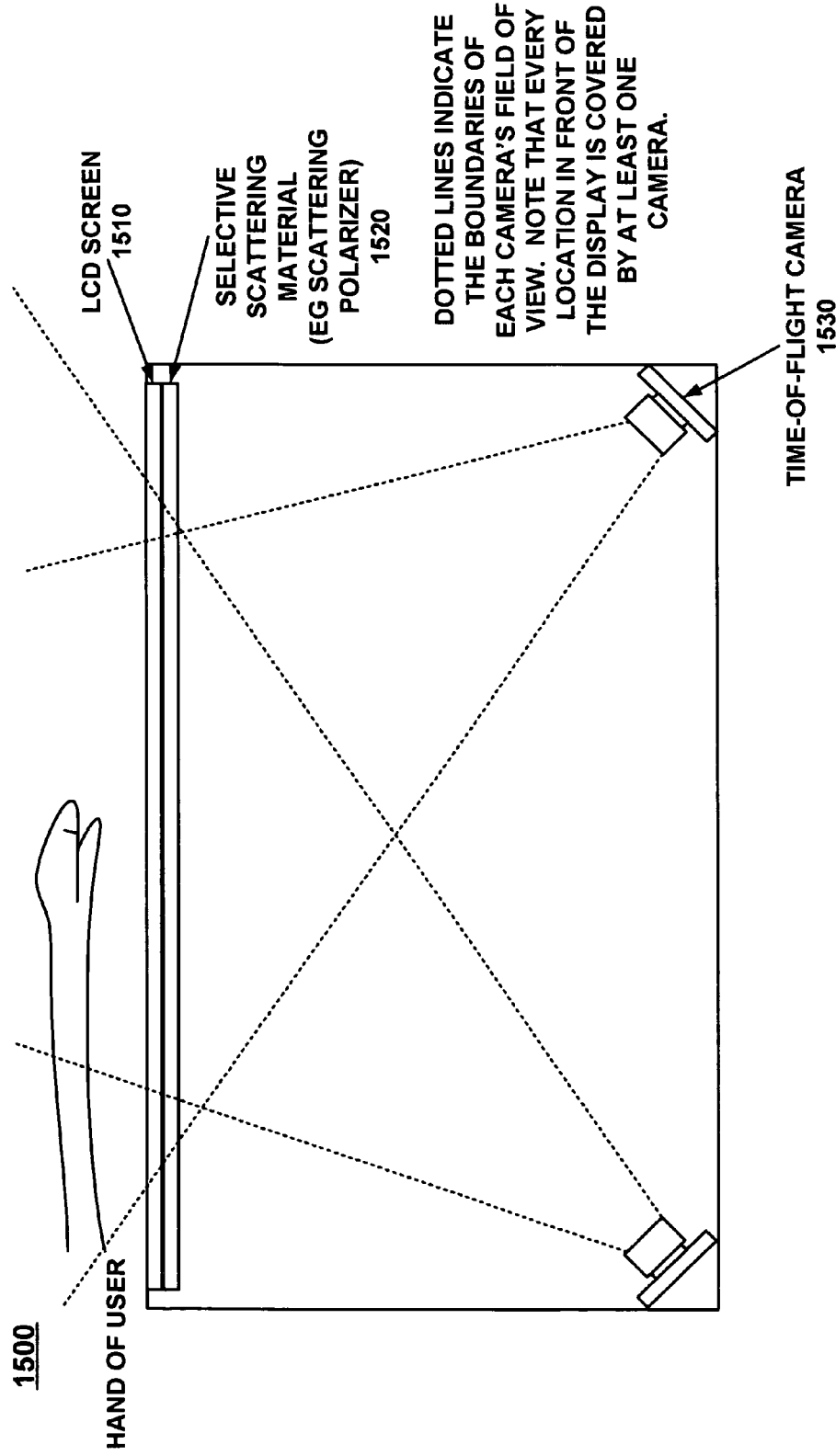

THE PATTERN OF INFRARED LIGHT FALLING ON OBJECT CHANGES RAPIDLY AS OBJECT MOVES TOWARD THE SCREEN, ALLOWING OBJECT'S DISTANCE FROM THE SCREEN TO BE EASILY IDENTIFIED BY THE COMPUTER

PATTERNED LIGHT PROJECTED AT AN ANGLE

IN BOTH THESE CONFIGURATIONS:
OBJECT 1, WHICH IS NOT CLOSE TO THE SCREEN, DOES NOT HAVE EXTRA ILLUMINATION.
OBJECT 2, WHICH IS CLOSE TO THE SCREEN, DOES HAVE EXTRA ILLUMINATION.

METHODS OF HIGHLIGHTING OBJECTS CLOSE TO OR TOUCHING THE SCREEN BY PROVIDING EXTRA ILLUMINATION

SCREEN WHICH LIGHTS UP ON CONTACT

SCREEN CAUSING SLIGHT SCATTERING

CLOSE-UP CROSS-SECTION OF TEXTURED SCREEN.
SCREEN THICKNESS, TEXTURE NOT TO SCALE

HIGH DISTORTION

REDUCED DISTORTION BY DISTANCING CAMERA
FROM DISPLAY SCREEN

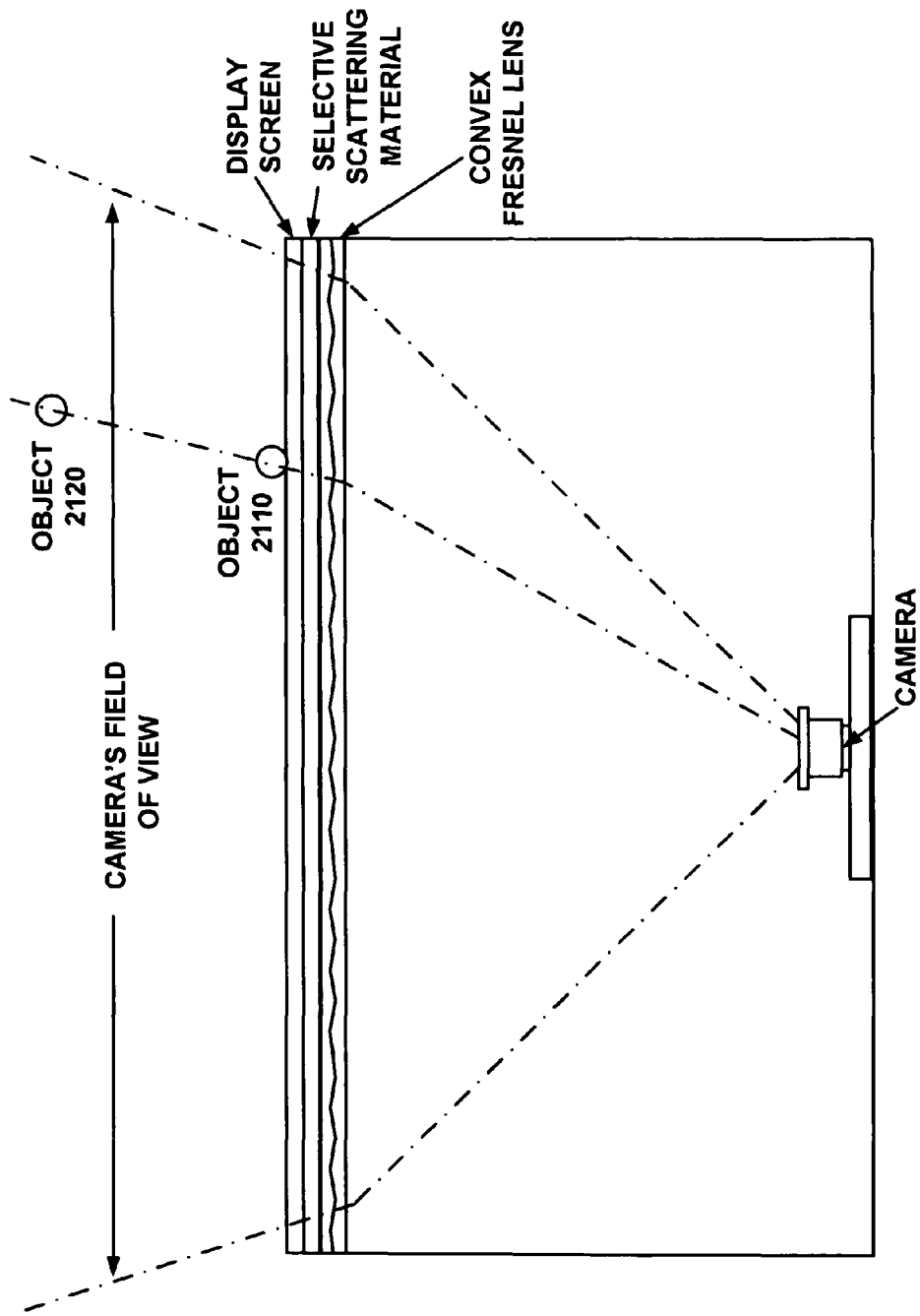

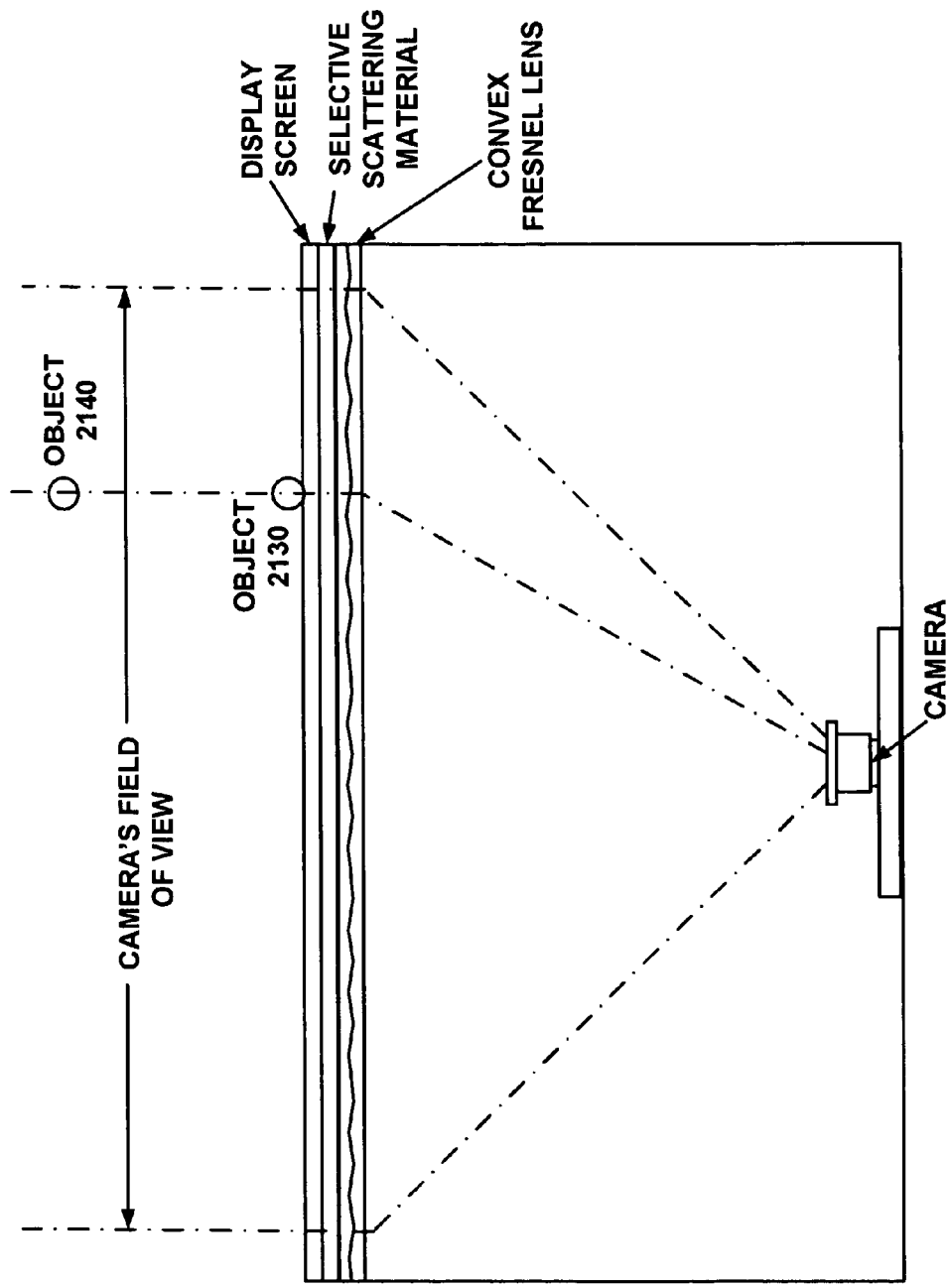

MULTIPLE CAMERAS, MULTIPLE FRESNEL LENSES

INTERACTIVE WINDOW DISPLAY

CROSS-SECTIONS OF SCREEN
MATERIALS THAT ARE CLOSE TO
TRANSPARENT WHEN VIEWED
FROM A PERPENDICULAR ANGLE,
BUT TRANSLUCENT WHEN VIEWED
AT AN OBLIQUE ANGLE

CLOSE-UP OF PLEATED SCREEN SECTION

CLOSE-UP OF MICROLOUVER SCREEN
SECTION

CLOSE-UP OF SECTION OF TRANSPARENT
SCREEN WITH EMBEDDED SHEET-LIKE
TRANSLUCENT MATERIAL

TRANSLUCENT REGION CREATED BY VIEW CONTROL FILM

ONE CONFIGURATION USING VIEW CONTROL FILM IN AN INTERACTIVE WINDOW DISPLAY

CROSS-SECTION OF ONE CONFIGURATION
OF WINDOW DISPLAY USING SCATTERING
POLARIZER

SIMPLIFIED CROSS-SECTION SHOWING THE USE OF A MICRO-PRISM MATERIAL IN A WINDOW DISPLAY

SIMPLIFIED CROSS-SECTION ILLUSTRATING
THE USE OF A MIRROR TO COMPACT THE
SIZE OF THE WINDOW DISPLAY

SELF-CONTAINED INTERACTIVE VIDEO DISPLAY SYSTEM

CROSS-REFERENCE TO RELATED APPLICATION

This application is a Continuation-in-Part Patent Application claiming priority from U.S. patent application Ser. No. 10/160,217, filed on May 28, 2002 now U.S. Pat. No. 7,259, 747, entitled "INTERACTIVE VIDEO DISPLAY SYSTEM," by Bell, and assigned to the assignee of the present application, which is herein incorporated by reference. This application also claims priority from U.S. Provisional Patent Application No. 60/504,375, filed on Sep. 18, 2003, entitled "SELF-CONTAINED INTERACTIVE VIDEO DISPLAY SYSTEM," by Bell, and assigned to the assignee of the present application, from U.S. Provisional Patent Application No. 60/514,024, filed on Oct. 24, 2003, entitled "METHOD AND SYSTEM FOR PROCESSING CAPTURED IMAGE INFORMATION IN AN INTERACTIVE VIDEO SYSTEM," by Bell, and assigned to the assignee of the present application, from U.S. Provisional Patent Application No. 60/528,439, filed on Dec. 9, 2003, entitled "SELF-CONTAINED INTERACTIVE VIDEO DISPLAY SYSTEM AND FEATURES RELATING THERETO," by Bell, and assigned to the assignee of the present application, and from U.S. Provisional Patent Application No. 60/554,520, filed on Mar. 18, 2004, entitled "METHOD AND SYSTEM FOR ALLOWING A CAMERA TO VIEW AN AREA IN FRONT OF A DISPLAY BY IMAGING IT THROUGH THE DISPLAY," by Bell et al., and assigned to the assignee of the present application, all of which are herein incorporated by reference.

FIELD OF INVENTION

The present invention relates to the field of visual electronic displays. Specifically, embodiments of the present invention relate to a self-contained interactive video display system.

BACKGROUND OF THE INVENTION

For many years, information was typically conveyed to an audience by use of static displays. For example, product advertisements were presented using print ads and posters. With the advent of television and movies, information could be presented using a dynamic display (e.g., commercials). While more engaging than static displays, dynamic displays do not typically provide interactivity between a user and the display.

More recently, interactive touchscreens have been used for presenting information on flat surfaces. For example, an image may be displayed on a touchscreen, and a user may interact with the image by touching the touchscreen, causing the image to change. However, in order to interact with the image displayed on the touchscreen, the user must actually come in contact with the touchscreen. Moreover, typically touchscreens can only receive one input at any time, and are not able to discern the shape of the input. Essentially, current touchscreens are only able to receive the input of one finger contact.

In some applications, such as point-of-sale, retail advertising, promotions, arcade entertainment sites, etc., it is desirable to provide an interactive interface for displaying information to a user. This interactivity provides an even more engaging interface for presenting information (e.g., media, advertisements, etc.). By catching the attention of a person, for even a few moments, the person may be more likely to absorb the information presented in the interactive display than in previous displays.

As described above, current interactive displays typically require a user to physically contact a touchscreen surface. By requiring contact with a touchscreen to provide interactivity, a large number of potential users are not interested in or intimidated by current interactive displays. Moreover, since only one user may interact with a touchscreen at a time, more users are excluded. Furthermore, because current touchscreens cannot discern the shape of input, they are limited in the type of information that can be presented in response to interaction.

SUMMARY OF THE INVENTION

Various embodiments of the present invention, a self-contained interactive video display system, are described herein. In one embodiment, a projector projects a visual image onto a screen for displaying the visual image, wherein the projector projects the visual image onto a back side of the screen for presentation to a user on a front side of the screen. In one embodiment, the projector emits polarized light, and a linear polarizing film of perpendicular orientation is placed adjacent to the front side of the screen for eliminating glare. In one embodiment, linear polarizing films of perpendicular orientations are placed adjacent the front side and the back side of the screen. In one embodiment, the projector is an off-axis projector. In one embodiment, the object is a body part of a human user.

In one embodiment, the screen comprises a scattering polarizer, wherein the projector emits polarized light in a polarization scattered by the scattering polarizer, and the camera is sensitive to light of a polarization not scattered by the scattering polarizer. In another embodiment, the screen comprises a material that scatters light of wavelengths emitted by the projector, but not wavelengths detectable to the camera. In another embodiment, the screen comprises a time-based material that can change from substantially translucent to substantially transparent, wherein the screen is substantially translucent when the projector is projecting the visual image, and is substantially transparent when the camera is detecting objects near the front side of the screen. In another embodiment, the screen comprises a material that is substantially translucent at a particular angle and substantially transparent at other angles, wherein the projector projects light onto the screen from the particular angle.

An illuminator illuminates an object near the front side of the screen. In one embodiment, the illuminator is an infrared illuminator for illuminating the object with infrared illumination, and wherein the camera is an infrared camera for detecting infrared illumination. In one embodiment, the illuminator is strobed in time with exposures of the camera. In one embodiment, the illuminator projects illumination through the screen onto the object. In one embodiment, the illuminator is positioned so as to reduce any potential for glare effects on the camera. In one embodiment, the illuminator is located next to the screen such that the illuminator does not project illumination through the screen. In one embodiment, the system comprises a plurality of illuminators, wherein the illuminators are located next to the screen and behind the screen.

A camera detects interaction of an illuminated object with the visual image, wherein the screen is at least partially transparent to light detectable to the camera, allowing the camera to detect the illuminated object through the screen. A computer system directs the projector to change the visual image in response to the interaction.

In one embodiment, the projector, the camera, the illuminator, and the computer system are comprised within an enclosure, and wherein one side of the enclosure comprises the screen. In one embodiment, the system further comprises a mirror for projecting the visual image onto the screen, wherein the projector is pointed indirectly at the screen and the mirror redirects the visual image to the screen. In one embodiment, the system further comprises a Fresnel lens positioned adjacent to the screen to correct distortion of the view of the camera. In another embodiment, the system further comprises a series of mirror strips positioned at a distance from the screen to correct distortion of the view of the camera. In one embodiment, an image of the camera is calibrated to the visual image such that the interaction caused by the object is matched to a physical position of the object near to the screen.

In one embodiment, the self-contained interactive video display system is operable to determine information about the distance of the object from the screen. In one embodiment, the camera is a stereo camera. In another embodiment, the camera is a time-of-flight camera. In one embodiment, the time-of-flight camera is positioned such that the time-of-flight camera does not reflect back onto itself. In one embodiment, the self-contained interactive video display system may be tiled with a second self-contained interactive video display system. In one embodiment, the self-contained interactive video display system further comprises a second camera, a first Fresnel lens for the camera, and a second Fresnel lens for the second camera, allowing spaces viewed by the camera and the second camera to be stitched together.

In one embodiment, the self-contained interactive video display system provides touchscreen functionality when the object is proximate the screen. In one embodiment, the self-contained interactive video display system further comprises a transparent touchscreen adjacent the front side of the screen. In another embodiment, the self-contained interactive video display system further comprises an edge-lit transparent sheet adjacent the front side of the screen, and wherein the camera is operable to distinguish light created when the object comes in contact with the edge-lit transparent sheet.

In another embodiment, the present invention provides a method for presenting an interactive visual image using a self-contained interactive video display system. A visual image is projected on a screen, wherein the visual image is projected onto a back side of the screen for presentation to a user on a front side of the screen. An object near the front side of the screen is illuminated. Interaction of the object with the visual image is detected, wherein the screen is at least partially transparent to light such that the object may be detectable through the screen. The visual image is changed in response to the interaction.

BRIEF DESCRIPTION OF THE DRAWINGS

The accompanying drawings, which are incorporated in and form a part of this specification, illustrate embodiments of the invention and, together with the description, serve to explain the principles of the invention:

FIG. 13 illustrates a camera and illumination subsystem, in accordance with an embodiment of the present invention.

FIG. 14 illustrates an illumination subsystem for camera utilizing tilted scattering polarizer, in accordance with an embodiment of the present invention.

FIG. 15 illustrates a camera and illumination subsystem for time-of-flight cameras, in accordance with an embodiment of the present invention.

FIG. 21A illustrates distortion reduction using Fresnel lens, in accordance with an embodiment of the present invention.

FIG. 21B illustrates distortion elimination using Fresnel lens, in accordance with an embodiment of the present invention.

DETAILED DESCRIPTION

Figure 1:
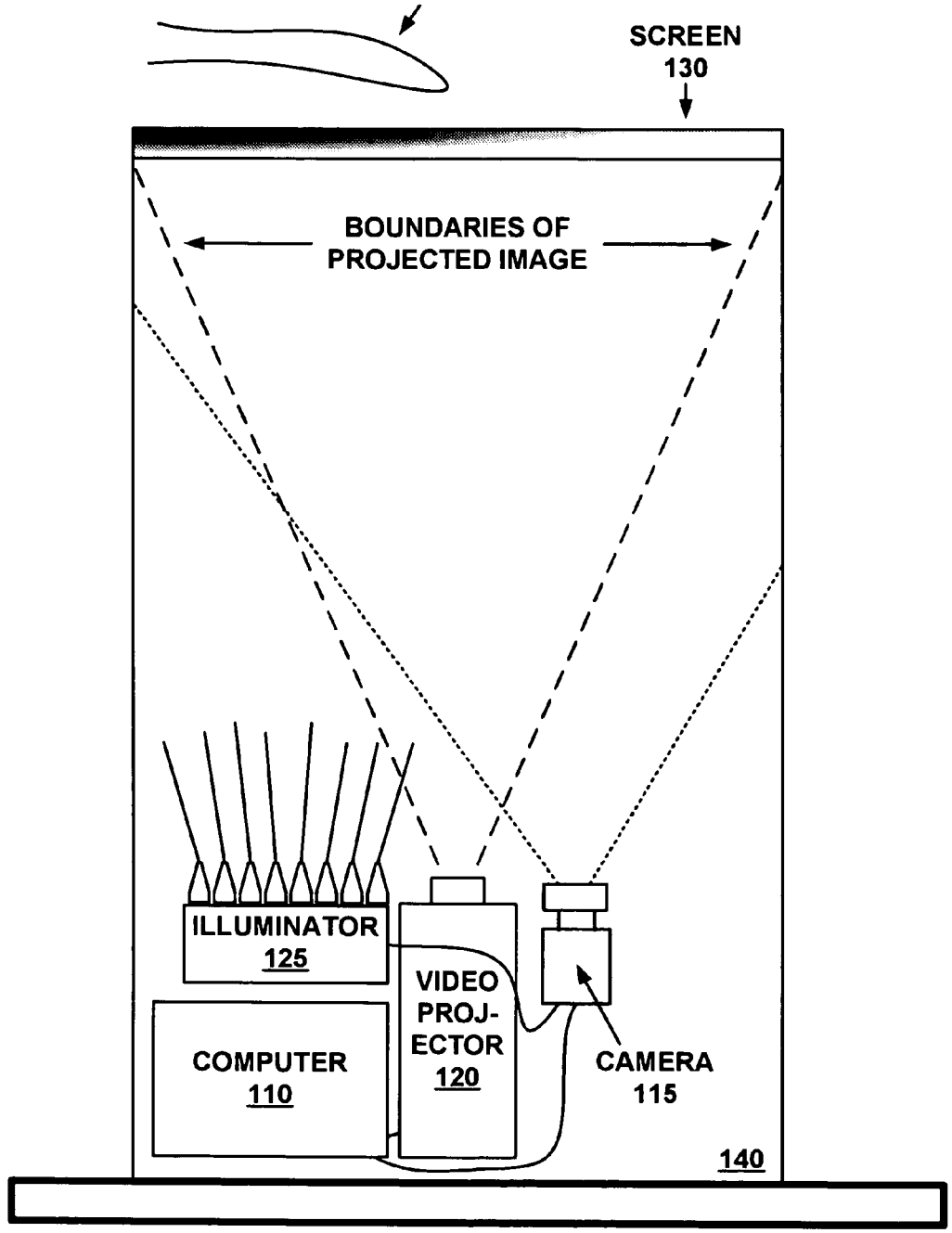
FIG. 1 shows one physical configuration of the components of an interactive video system, in accordance with an embodiment of the present invention.

Reference will now be made in detail to various embodiments of the invention, an electronic device for monitoring the presence of objects around a second electronic device, examples of which are illustrated in the accompanying drawings. While the invention will be described in conjunction with these embodiments, it is understood that they are not intended to limit the invention to these embodiments. On the contrary, the invention is intended to cover alternatives, modifications and equivalents, which may be included within the spirit and scope of the invention as defined by the appended claims. Furthermore, in the following detailed description of the invention, numerous specific details are set forth in order to provide a thorough understanding of the invention. However, it will be recognized by one of ordinary skill in the art that the invention may be practiced without these specific details. In other instances, well known methods, procedures, components, and circuits have not been described in detail as not to unnecessarily obscure aspects of the invention.

Some portions of the detailed descriptions, which follow, are presented in terms of procedures, steps, logic blocks, processing, and other symbolic representations of operations on data bits that can be performed on computer memory. These descriptions and representations are the means used by those skilled in the data processing arts to most effectively convey the substance of their work to others skilled in the art. A procedure, computer executed step, logic block, process, etc., is here, and generally, conceived to be a self-consistent sequence of steps or instructions leading to a desired result. The steps are those requiring physical manipulations of physical quantities. Usually, though not necessarily, these quantities take the form of electrical or magnetic signals capable of being stored, transferred, combined, compared, and otherwise manipulated in a computer system. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise as apparent from the following discussions, it is appreciated that throughout the present invention, discussions utilizing terms such as "projecting" or "detecting" or "changing" or "illuminating" or "correcting" or "eliminating" or the like, refer to the action and processes of an electronic system (e.g., interactive video system 100 of FIG. 1), or similar electronic computing device, that manipulates and transforms data represented as physical (electronic) quantities within the electronic device's registers and memories into other data similarly represented as physical quantities within the electronic device memories or registers or other such information storage, transmission or display devices.

Various embodiments of the present invention, a self-contained interactive video display system, are described herein. In one embodiment, a projector projects a visual image onto a screen for displaying the visual image, wherein the projector projects the visual image onto a back side of the screen for presentation to a user on a front side of the screen. An illuminator illuminates an object near the front side of the screen. A camera detects interaction of an illuminated object with the visual image, wherein the screen is at least partially transparent to light detectable to the camera, allowing the camera to detect the illuminated object through the screen. A computer system directs the projector to change the visual image in response to the interaction.

Interactive Video Projection System

The present invention in the form of one or more exemplary embodiments will now be described. According to one exemplary embodiment, an interactive video system 100 as shown in FIG. 1 is provided. The interactive video system 100 uses an camera 115 fitted with a filter that blocks visible light, an illuminator 125 that illuminates screen 130 being viewed by camera 115, a projector 120 that projects an image onto the interactive space of screen 130, and a computer 110 that takes as input the image of camera 115 and outputs a video image to projector 120. In one embodiment, illuminator 125 is an infrared illuminator and camera 115 is an infrared camera operable to record images illuminated by the infrared light of illuminator 125. It should be appreciated that camera 115 and illuminator 125 can be configured to operate using any form of light that is not visible, and is not limited to infrared light.

Computer 110 processes the camera 115 input to discern on a pixel-by-pixel basis what portions of the volume in front of screen 130 are occupied by people (or moving objects) and what portions of screen 130 are background. Computer 110 accomplishes this by developing several evolving models of what the background is supposed to look like, and then comparing its concepts of the background to what camera 115 is currently seeing. Alternatively, components of computer 110 that process camera 115 input are collectively known as the vision system. Various embodiments of this vision system are described in co-pending U.S. patent application Ser. No. 10/160,217, filed on May 28, 2002, entitled "INTERACTIVE VIDEO DISPLAY SYSTEM," by Bell, and assigned to the assignee of the present application, in U.S. Provisional Patent Application No. 60/504,375, filed on Sep. 18, 2003, entitled "SELF-CONTAINED INTERACTIVE DISPLAY SYSTEM," by Bell, and assigned to the assignee of the present application, and in U.S. Provisional Patent Application No. 60/514,024, filed on Oct. 24, 2003, entitled "METHOD AND SYSTEM FOR PROCESSING CAPTURED IMAGE INFORMATION IN AN INTERACTIVE VIDEO SYSTEM," by Bell, and assigned to the assignee of the present application, all of which are herein incorporated by reference.

The evolving background is an important part of the vision, as it allows the system to be resilient to changes in lighting, scuff marks on the screen, and other disturbances. The output of the vision system is a black and white mask image that feeds into an effects engine, which also runs on computer 110. The effects engine runs the applications that create the interactive graphics on screen 130. Artists can design effects using a large variety of effect components as well as scripting, allowing them to create a wide variety of interactive experiences. Finally, the images created by the effects engine are outputted to projector 120.

It is desirable that all the electronic components of interactive video system 100 (e.g., camera 115, projector 120, computer 110, and illuminator 125) are on one side of screen 130 while the user interaction takes place on the other side of screen 130. In one embodiment, screen 130 is partially translucent for the light of projector 120 to allow an image to form on the surface of screen 130. However, screen 130 is also partially transparent to camera 115 so that camera 115 can see objects on the opposite side of screen 130. It should be appreciated that the terms transparent and translucent as referred to throughout the current specification are defined as meaning at least partially transparent and/or translucent, respectively. It should also be appreciated that the terms "scattered" and "not scattered" as referred to throughout the current specification are defined as meaning "substantially scattered" and "not substantially scattered" respectively. Finally, it should also be appreciated that the terms "diffused" and "not diffused" as referred to throughout the current specification are defined as meaning "substantially diffused" and "not substantially diffused" respectively.

FIG. 1 shows one physical configuration of the components of an exemplary embodiment of the present invention. All sensing and display components, including camera 115, illuminator 125, computer 110, and projector 120, are inside a box 140. In one embodiment, all sides of the box 140 are opaque except for one side. This one side which is not opaque is a screen 130 for displaying the projected image.

In one embodiment, smooth, flat materials that have strong Rayleigh scattering and relatively little scattering of other forms are used for screen 130. If light is scattered by screen 130 (a translucent screen), then that light will be visible as an image on screen 130. If light is not scattered or absorbed by screen 130 (a transparent screen), then the light will pass straight through screen 130 like a pane of glass.

Rayleigh scattering is proportional to $1/(\text{wavelength}^4)$, which means that light with short wavelengths is scattered much more than light with long wavelengths. Thus, infrared light, which has a wavelength greater than 800 nanometers (nm), is scattered much less than visible light, which has a wavelength of 400 nm-700 nm. In the present embodiment, projector 120 uses visible light, while camera 115 uses infrared light, allowing camera 115 to see through screen 130 while light emitted by projector 120 is scattered onto screen 130. In one embodiment, the material of screen 130 is smooth and homogenous down to a scale of preferably around 40 nm, in order to have good Rayleigh scattering but minimal scattering of other kinds In one embodiment, the screen material has a fine-scale structure that causes most visible light to scatter. However, it also is not be too dense or thick; otherwise, most of the infrared light will scatter as well. In addition, the material should not absorb much visible or infrared light; otherwise, this will make the material opaque and therefore a poor screen. One example of a material that satisfies the property of strong Rayleigh scattering is an ordinary white plastic trash bag. In one embodiment, screen 130 is created by sandwiching the bag between two sheets of glass. Another example of a material that satisfies this property is polyethylene sheeting.

Increasing the wavelength of illuminator 125 and camera 115's filter improves the performance of interactive video system 100 because (with the appropriate screen material and thickness chosen) the increased wavelength maximizes the amount of scattering of visible light (which minimizes glare) and minimizes the amount of scattering of infrared light (which improves camera 115's view of objects above the screen). In one embodiment, a 950 nm LED cluster illuminator and a monochrome Charged Coupled Device (CCD) camera with a 40 nm width 950 nm center bandpass filter at the front of its lens are used.

Several features can be added to interactive video system 100 to further enhance its performance.

Reducing Glare on the Camera

There may be reflected glare from illuminator 125 onto camera 115. This glare can interfere with camera 115's ability to see beyond screen 130. In one embodiment, a near-infrared antireflective coating is placed on the bottom and/or top of screen 130 to mitigate this interference and improve the performance of camera 115. In addition, illuminators 125 can be placed at an oblique angle relative to screen 130, preventing any specular reflection from taking place.

Furthermore, in another embodiment, infrared linear polarizing filters are added to the front of illuminator 125 and camera 115 (with the orientation of the polarization of illuminator 125 perpendicular to the polarization of camera 115) to further reduce glare. This glare happens because light that reflects directly off the bottom of screen 130 will still be polarized, while light that hits an object outside screen 130 loses its polarization.

Directional Ambient Infrared

Ambient sources of infrared light can pose a problem for the vision system of interactive video system 100. For example, if a bright external infrared source is shining on the display from one direction, any object between this infrared source and the screen will cast an infrared shadow onto screen 130. The vision system may confuse this with an actual object on screen 130, causing the application to malfunction. Several techniques can be used to reduce the problem of infrared shadows.

In one embodiment, the wavelength of the illuminator 125 can be chosen to be as uniform as possible. A narrow bandpass filter, which only passes light of the wavelengths put out most strongly by illuminator 125, can be added to the front of camera 115.

In another embodiment, the use of a patterned illuminator allows the system to distinguish between infrared shadows and actual objects on screen 130. For additional details, see U.S. patent application Ser. No. 10/160,217, filed May 28, 2002, entitled "INTERACTIVE VIDEO DISPLAY SYSTEM", by Bell, which is herein incorporated by reference.

In another embodiment, illuminator 125 and camera 115 can be strobed. Some illumination sources, such as light emitting diodes (LEDs), can turn on far brighter for brief periods than they can continuously. If illuminator 125 is turned on only during the exposure of camera 115, and the camera exposure is brief enough, the brightness of illuminator 125 is greatly magnified relative to the ambient light. This is true because the image of camera 115 during a short exposure in which illuminator 125 is turned on very brightly will contain much less ambient light but nearly as much light from illuminator 125 as compared to an image from a longer exposure in which illuminator 125 is on continuously but at a lower, continuous-duty brightness.

Camera 115 and illuminator 125 can be synchronized. For example, a microcontroller or other electronic circuit can either read or set the camera exposure sync and trigger pulsed power to illuminator 125 at the appropriate time.

The performance of strobing can be further improved by only turning on illuminator 125 during every second camera exposure. Thus, camera 115 would alternate between an exposure with illuminator 125 on and one with illuminator 125 off. Since the goal is to remove the ambient infrared light, computer 110 can continuously generate an image with no ambient light by taking the difference between the current image and the previous image. Because illuminator 125 is lit only on every second frame, one image will have only ambient infrared light while the other will have the ambient infrared light plus the light of illuminator 125. By taking the pixel-wise difference between the current and previous images, the ambient infrared can be canceled out, leaving only the light of illuminator 125.

In the case of an interlaced CCD camera, flashing illuminator 125 on during alternate exposures would produce camera output images in which the even-numbered lines have illuminator 125 on and the odd-numbered lines have illuminator 125 off. Thus, instead of comparing two images, computer 110 can take the difference between the odd numbered lines and the even numbered lines to subtract out the ambient light. The strobing could be performed using two cameras 115, timed so that the first and second cameras take their exposures at slightly different times, and the illuminator 125 is only on for one of the two exposures. Alternately, the two cameras could be sensitive to slightly different wavelengths, and the illuminator 125 only emits light at the second wavelength.

In another embodiment, in an environment with no ambient infrared light, strobing illuminator 125 for only every second exposure reduces the system's reaction time. Any movement when illuminator 125 is off will not be noticed during the second exposure. However, this can be improved by turning only part of illuminator 125 off, or simply reducing the power pf illuminator 125, during every second exposure. Then, illuminator 125 alternates between "all the way on" and "partly on". When computer 110 takes the difference between the current exposure and the previous exposure, the result will contain no ambient infrared and part of the light of illuminator 125. This configuration will provide the fastest possible reaction time for the user in both environments with no ambient infrared and some ambient infrared.

Projector Glare

Because the screen material is not completely translucent, some of the light from projector 120 may pass directly through screen 130. As a result, projector 120 may cause glare in the user's eye. In one embodiment, by making the wavelength of illuminator 125 longer and using a screen 130 that causes more scattering, camera 115 is still able to see through screen 130 while the amount of visible light glare is reduced.

Figure 2:
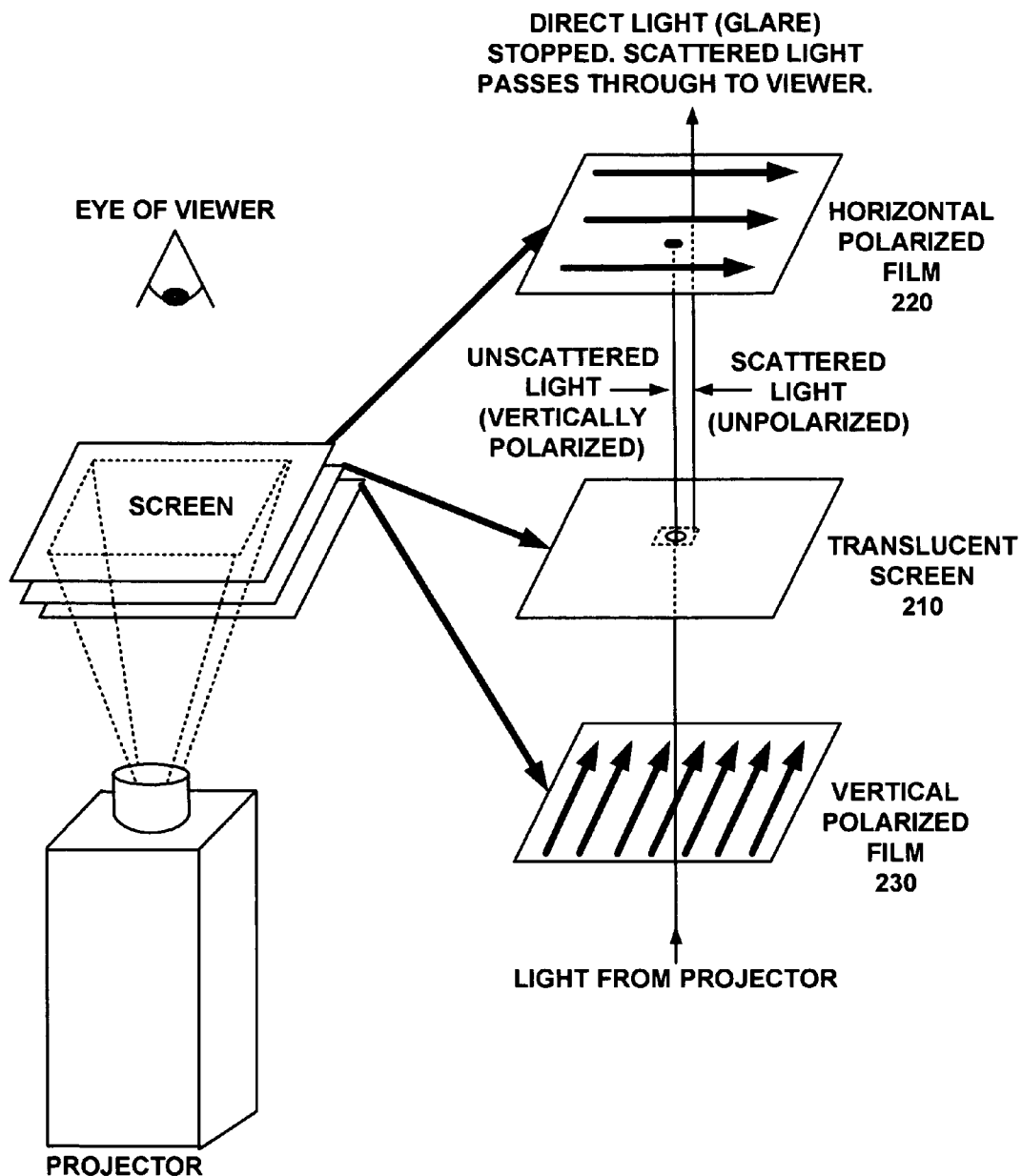
FIG. 2 shows one arrangement of a screen where linear polarizer sheets are used to eliminate or reduce glare, in accordance with one embodiment of the present invention.

In another embodiment, linear polarizer sheets can be used to eliminate or reduce the glare. FIG. 2 shows one arrangement where linear polarizer sheets are used to eliminate or reduce the glare. A vertically polarized sheet 230 and a horizontally polarized sheet 220 are placed immediately below and above screen 210, respectively. As the projected light passes through vertically polarized sheet 230, it becomes vertically polarized. Since scattering depolarizes the light, much of the scattered light on screen 210 is still visible to the viewer. However, the light not scattered by screen 210 (which causes the glare) is absorbed almost entirely by horizontally polarized sheet 220 because the light is vertically polarized. Thus, the glare is eliminated while screen 210 remains bright. Note that if the camera is sensitive to infrared light, a linear polarizing material can be chosen that does not polarize infrared light.

In another embodiment, if the projector is a liquid crystal display (LCD) projector, the light will already be polarized. For some LCD projectors, red, green, and blue light are all polarized in the same direction. In this case, a polarizing film is not needed under the screen. In some LCD projectors, red and blue are polarized in one direction, while green is polarized 90 degrees off from that direction. In this case, in one embodiment, the polarized sheets are present and should be polarized to 45 and 135 degrees off from the red-blue direction. In another embodiment, a color selective polarization rotator can be placed on or inside the projector to get the red, green, and blue light polarized in the same direction. In this case, only one linear polarizer in front of the screen is needed. A color selective polarization rotator, such as the retarder stack "ColorSelect" technology produced by the ColorLink Corporation, is used to rotate the polarization of green light by 90 degrees. Alternatively, the polarization of red and blue light can be rotated by 90 degrees to achieve the same effect.

Physical Configurations

There are multiple potential physical configurations of the interactive video display system. One configuration is the tabletop display, as shown and described in FIG. 1. The interactive video display system sits on a surface, has all of the electronics contained inside of a box, is several feet tall, and has a horizontal screen on top of the box. However, the interactive video display system can also be used to create diagonal, vertical, or curved displays.

A portion of the physical space taken up by the interactive video display system is simply dead space—in order to have a reasonably large image on the screen, the projector needs to be a significant distance away from the screen. This distance can be decreased through the use of mirrors; this allows the projector's beam to be redirected and fit into a more compact space. In one embodiment, the camera can be mounted at different points in the box and may view the screen through a mirror, so long as it has a clear view of the screen. In one embodiment, the infrared illuminator can be mounted anywhere in the box, or even on the surface of the box, so long as it illuminates objects above the box.

Figure 3:
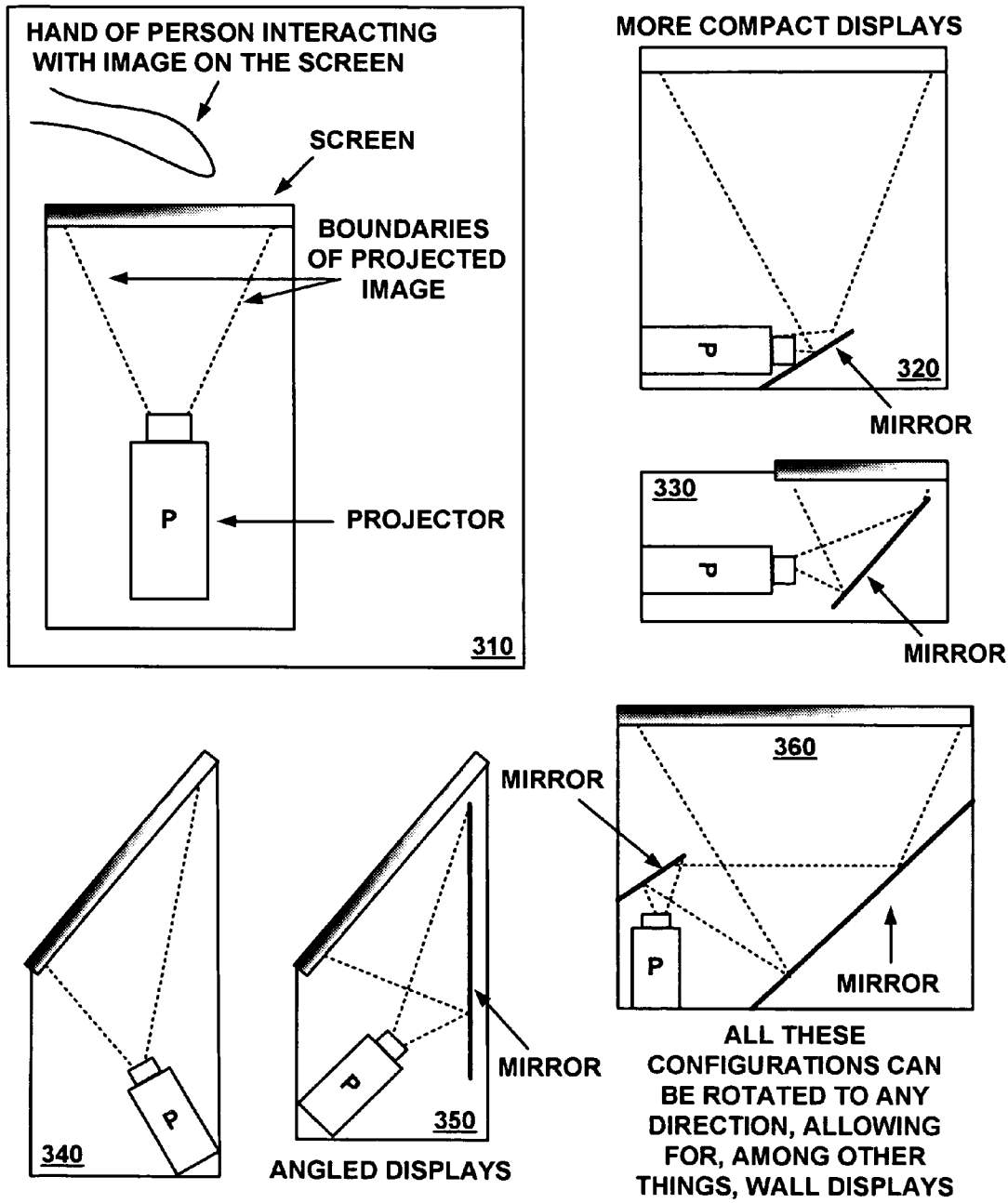
FIG. 3 shows cross sections of several other configurations of the interactive video system, in accordance with various embodiments of the present invention.

FIG. 3 shows cross sections of several other potential configurations of the system. As all parts can be easily secured, the designs shown can be rotated to any direction. Display 310 illustrates the interactive video display described at FIG. 1. Displays 320 and 330 illustrate interactive video displays that are more compact using mirrors to redirect the projector's beam. Displays 340 and 350 illustrate interactive video displays that are angled, using an angled camera (display 340) and using a mirror to redirect the projector's beam (display 350). Display 360 illustrates an interactive video display using multiple mirrors to redirect the projector's beam.

Additional Configurations of an Interactive Video Display

According to one aspect of the present invention, a number of exemplary methods for lighting an area in front of a screen are provided. In a self-contained interactive video display, an infrared camera, infrared illuminator, and a visible-light projector are all on one side of a screen while the user is on the other. In order to provide the desired functionality, the screen material that is used is mostly translucent (but may also be slightly transparent) to visible light, and is also preferably mostly transparent to infrared light (referred to hereinafter as "IR-Transparent VIS-Translucent screen" or "Main screen"). Light emitted by the infrared illuminator scatters to a certain degree when it passes through the screen. This light is picked up by the camera and may cause the camera's image to be low contrast and washed-out. As a result, the camera's view of the objects beyond the screen may be impeded, which results in reduced performance characteristics.

Figures 4A, 4B:
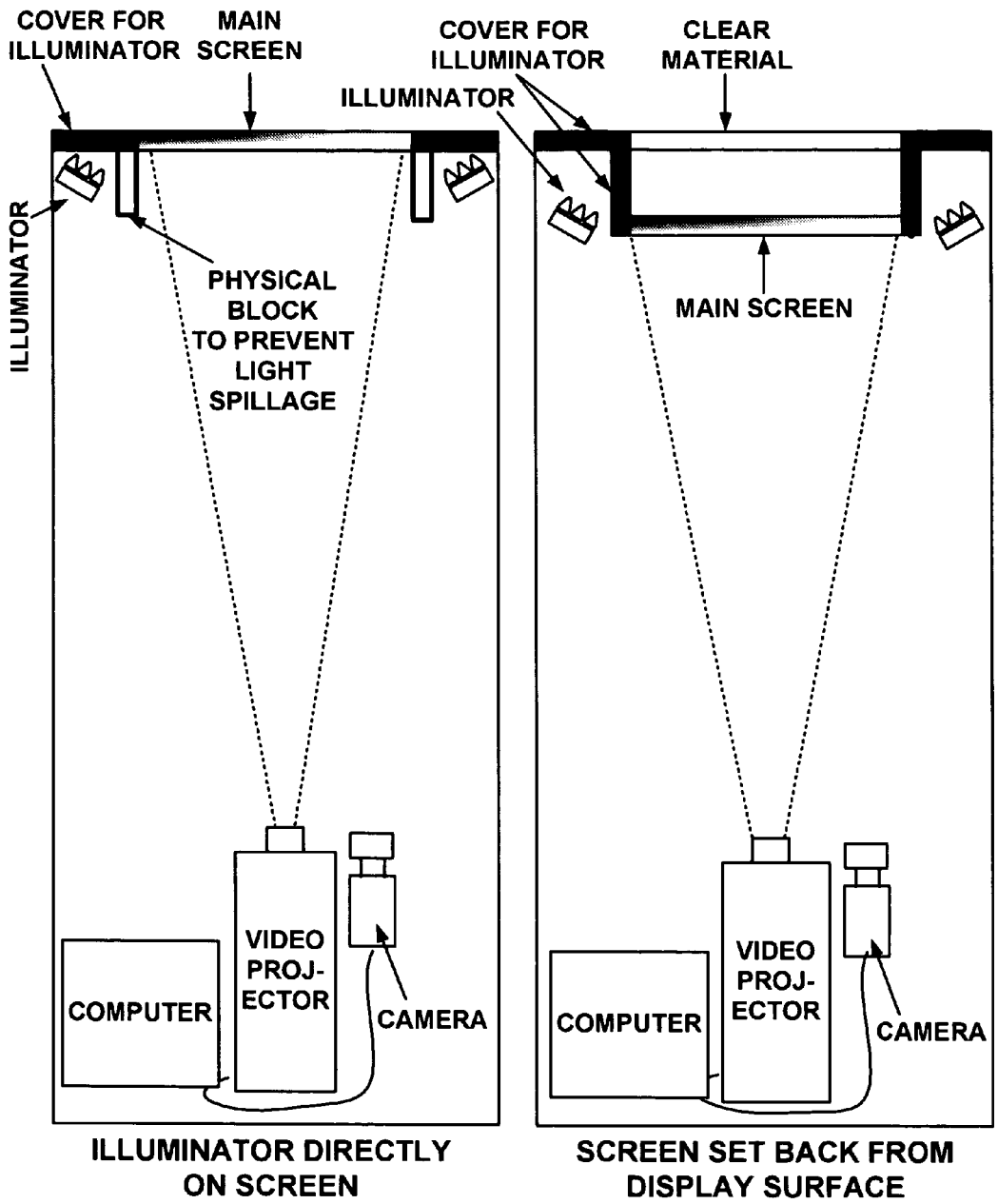
FIGS. 4A and 4B are schematic diagrams respectively illustrating embodiments of an interactive video system, in accordance with embodiments of the present invention.

The present invention addresses the foregoing problem in a number of ways. In one embodiment, the infrared illuminator can be placed as close to the screen as possible. For example, the illuminators may be placed directly against the screen along the border. This configuration is shown in FIG. 4A. The material in front of the illuminators (referred to as "cover for illuminator 402" in FIG. 4A) may include any material that is at least somewhat translucent or transparent to infrared. Options for cover for illuminator 402 material include the main screen material, a clear transparent material, or a black opaque material that is transparent to infrared. References to cover for illuminator in subsequent figures have similar meaning. A physical block may be used to prevent infrared light spillage onto the main screen.

However, the above embodiment may result in poor illumination of objects that are close to the screen and near the center of the screen. This is because light shined on most materials at an oblique angle tends to reflect off of the material's surface rather than pass through, e.g., the material's transparency is functionally reduced. One way of addressing this is to simply move the screen back from the surface of the display, thus allowing the infrared illuminators to shine through the screen from a less oblique angle. This configuration is shown in FIG. 4B.

Figures 5A, 5B:
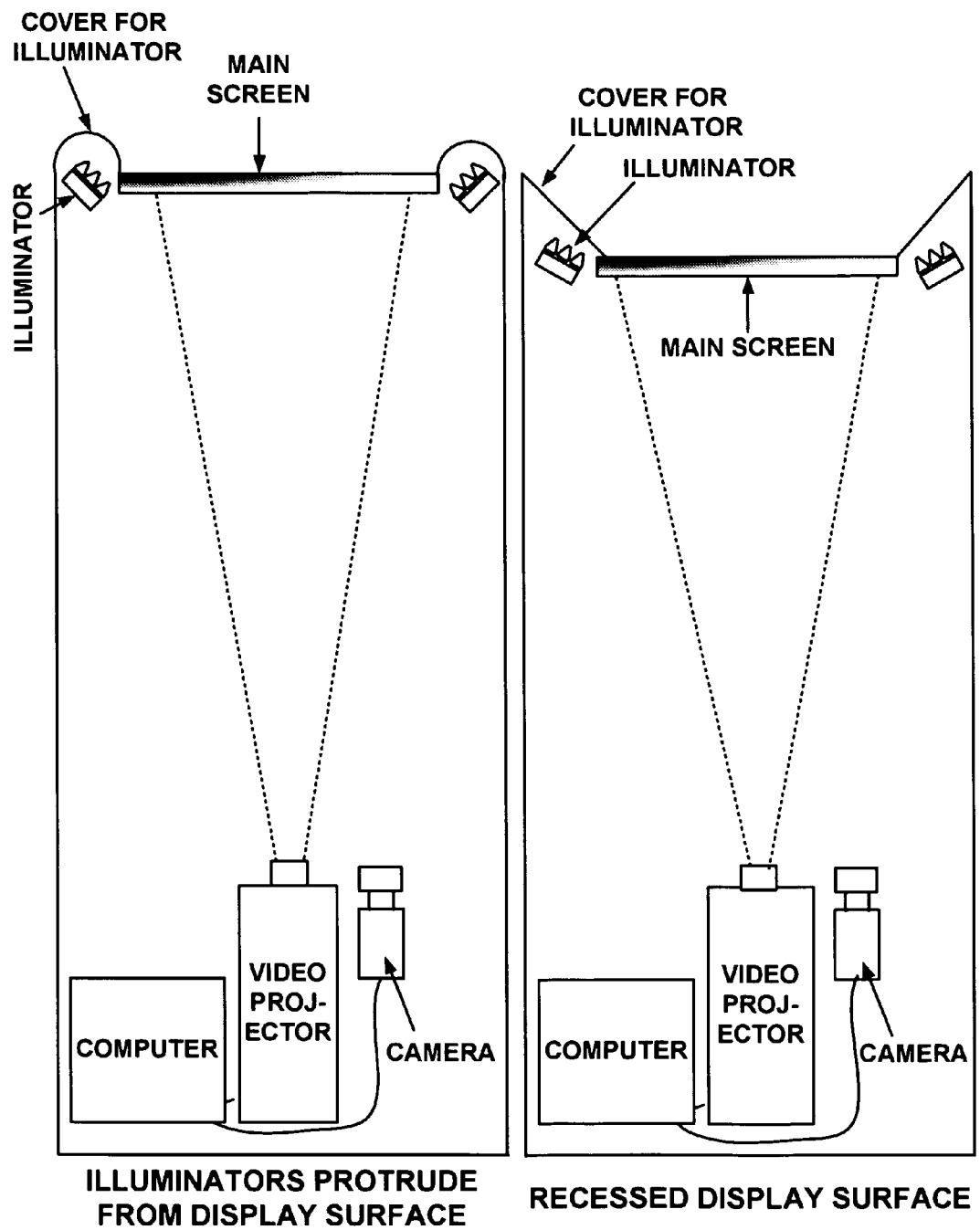
FIGS. 5A and 5B are schematic diagrams respectively illustrating embodiments of an interactive video system, in accordance with embodiments of the present invention.

In another embodiment, the illuminators can be placed in front of the screen in a way that allows them to easily illuminate all locations in front of the screen. One configuration, in which the illuminator protrudes from the front of the screen, is shown in FIG. 5A; another configuration, in which the display surface is recessed, is shown in FIG. 5B. In the embodiments described in FIGS. 4A, 4B, 5A and 5B, the illuminators may be placed at regular intervals around the screen, in a continuous line, or at strategic locations. These illumination strategies shown in FIGS. 4A, 4B, 5A, and 5B can also be combined with illuminators that are behind the screen and shine through the screen.

Off-Axis Projection

According to another aspect of the present invention, off-axis projection is used to improve the performance of the self-contained interactive video display system. Off-axis video projectors are capable of projecting a rectangular video image onto a flat surface at an oblique angle. These off-axis projectors are extremely important for interactive displays, as they allow the size of the overall system to shrink dramatically and they allow the glare to be reduced.

Figure 6A:
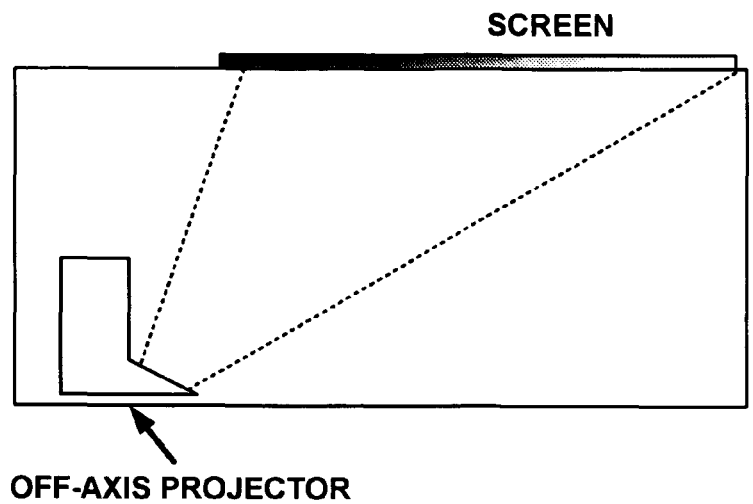
FIGS. 6A and 6B are schematic diagrams respectively illustrating two configurations of off-axis projection, in accordance with embodiments of the present invention.
Figure 6B:
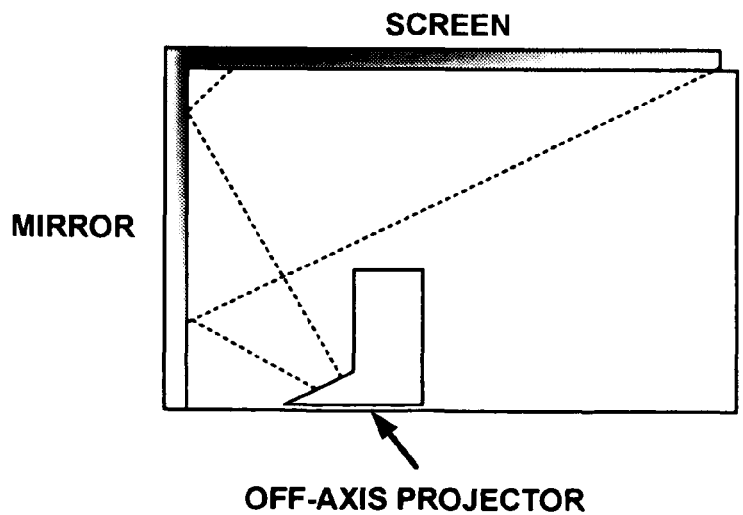

FIGS. 6A and 6B show two configurations of a self-contained interactive video display using an off-axis projector. Glare is reduced when using an IR-transparent, VIS-translucent screen with an off-axis projector. Since the screen is not perfectly translucent to visible light (nor perfectly transparent to infrared light), some visible light will pass straight through the screen. If the screen is thickened, then more of the remaining visible light will be scattered, reducing the glare. Making the screen thicker also makes the screen less transparent to infrared since the screen is not perfectly transparent to infrared. However, if the visible light passes through the screen at an oblique angle instead of a perpendicular angle, then the light has to travel through the screen for a greater distance, reducing the amount of glare. For example, light passing through the screen at 30 degrees from parallel to the screen has to pass through twice as much screen material as light passing through at a perpendicular angle to the screen. Thus, if the infrared camera views the screen directly while the visible light projector shines light on the screen from an oblique angle, maximum transparency for the infrared camera and maximum translucency for the visible-light projector can be obtained.

Transparent Flat-Panel Displays

The self-contained interactive video display can be implemented with display technologies other than video projectors. Any flat-panel display that is at least partially transparent to light visible to the camera may be implemented if it is used in place of the main screen. For example, the Transparent Imaging Matrix, a form of LCD panel sold by Provision, can be used as a display in an embodiment where the camera is a near-infrared camera. This form of LCD panel is clear and transparent when the color being displayed is white. It is also transparent in near-infrared, no matter what color is being displayed. Many types of LCD panels, including the transmissive LCD panels used in laptop monitors, flat-panel LCD computer monitors, and flat-panel LCD TV screens, also have the property that they are transparent in near-infrared.

The flat-panel display that is at least partially transparent to light visible to the camera will be referenced in this text as the "transparent flat-panel display." Although the examples described herein involve transparent flat-panel displays that are completely transparent in infrared and an infrared camera, the implementation applies equally well to a camera that functions in a different wavelength range and a transparent flat-panel display that is completely transparent to light detectable by that camera.

Using a transparent LCD panel or other flat-panel display technology that is at least partially transparent to infrared, an interactive flat-panel display can be constructed using an infrared camera. Transparent LCDs typically lack their own illumination, so they may have to be illuminated by an external source. In one embodiment, this external source includes a white visible-light illuminator behind the LCD panel. In one embodiment, a screen that is transparent to the camera but scatters the visible-light illuminator is placed immediately behind the LCD panel so as to diffuse the light of the illuminator more easily.

Figure 7A:
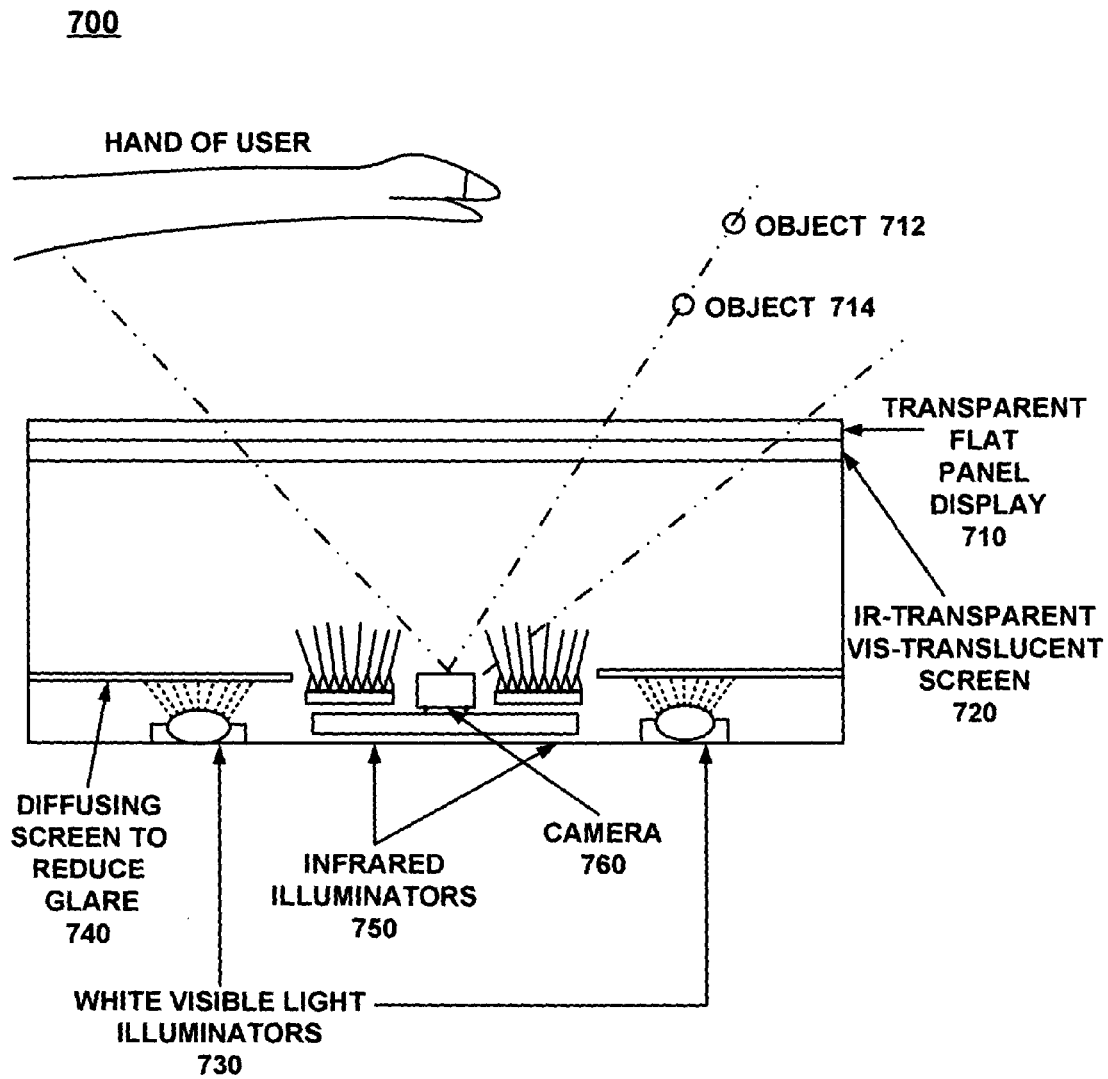
FIGS. 7A and 7B are schematic diagrams illustrating an interactive flat-panel display system, in accordance with one embodiment of the present invention.
Figure 7B:
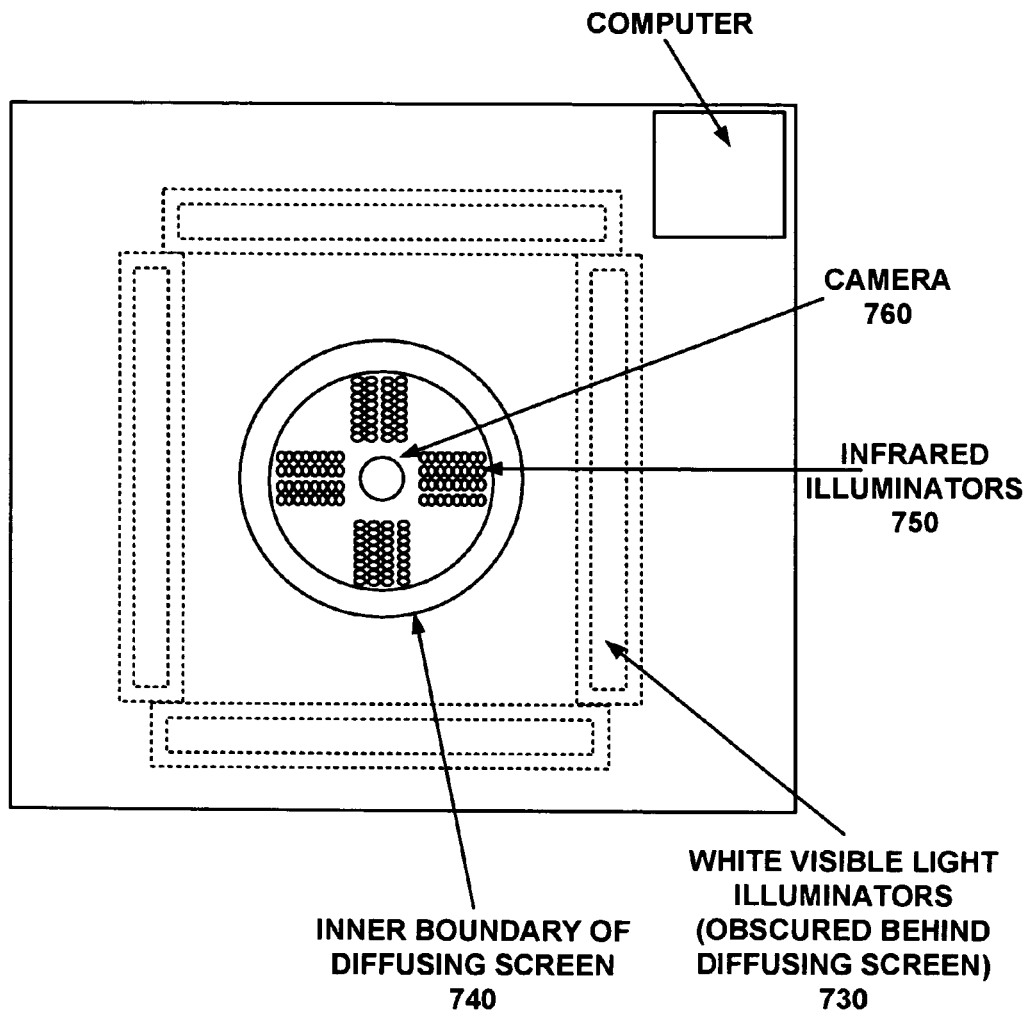

FIG. 7A illustrates an exemplary transparent interactive flat-panel display system 700, in accordance with a an embodiment of the present invention. In one embodiment, the appearance of display 700 is improved by placing an IR-transparent VIS-translucent screen 720 material behind the transparent flat-panel display 710. Then, shining any light onto screen 720 will illuminate the display 710 in a more diffuse manner. In order to make the lighting of screen 720 maximally diffuse, system 700 may use lights 730 that shine onto the screen from an oblique angle or lights 730 that have separate diffusers 740 in front of them. Note that diffusers 740 do not block the view of camera 760. FIG. 7B shows the same configuration in a cutaway top view, with transparent flat-panel display 710 and screen 720 removed. The visible light illuminator 730 may include any lighting technology capable of producing visible light, including LEDs, fluorescents, neon tubes, electroluminescent wire or sheeting, halogen lights, and incandescent bulbs. The infrared illuminator 750 may include any lighting technology capable of producing infrared light visible to the camera, including LEDs, heat lamps, halogen lamps, or incandescent lamps. The infrared and visible light may both be produced by the same light source. Alternately, for greater control of the infrared light, a film that is transparent to visible light but opaque to infrared light may be placed over visible illuminators 730.

The improvements noted for the projector based system, including the strobing techniques mentioned in the section titled "Directional Ambient Infrared", the physical arrangements mentioned in the section titled "Physical Configurations", and the illuminator arrangements mentioned in the section titled "Additional Configurations of an Interactive Video Display", are all applicable to the transparent flat-panel display based systems described in this section.

The use of a transparent flat-panel display rather than a projector allows the interactive video display to be significantly reduced in size. However, this poses a problem for the computer vision system, which must be able to see through the screen. If there is only a small distance between the screen and the back of the display box, then camera 760 would have to be extremely wide-angle in order to view the full area in front of screen 720, the location of objects that the system should detect, such as the hand of a user. This may pose issues because of the difficulties in looking through the screen at an oblique angle.

One way of resolving the issue of illumination at an oblique angle is the use of polarizing material around camera 760 to eliminate infrared light that is reflected off screen 720 without affecting the light that passes through screen 720. Light reflecting off the screen surface tends to be strongly polarized parallel to the screen surface, so a polarizer that encircles camera 760 in a manner perpendicular to the screen surface and with its polarization perpendicular to the screen surface should eliminate most or all stray reflected light from infrared illuminator 750 behind screen 720.

Dealing with Distortion

The problem of camera view distortion may be present in all self-contained interactive video displays described herein (e.g., projection systems and transparent flat-panel display-based systems). In many cases, the camera's two-dimensional view of the area above the screen may have strong distortion. For example, in FIG. 7A, object 712 and object 714 are seen as being in the same location by camera 760 even though they are at very different positions in front of screen 720. In order for interactions above screen 720 to feel accurate, this distortion would need to be corrected.

Figure 8A:
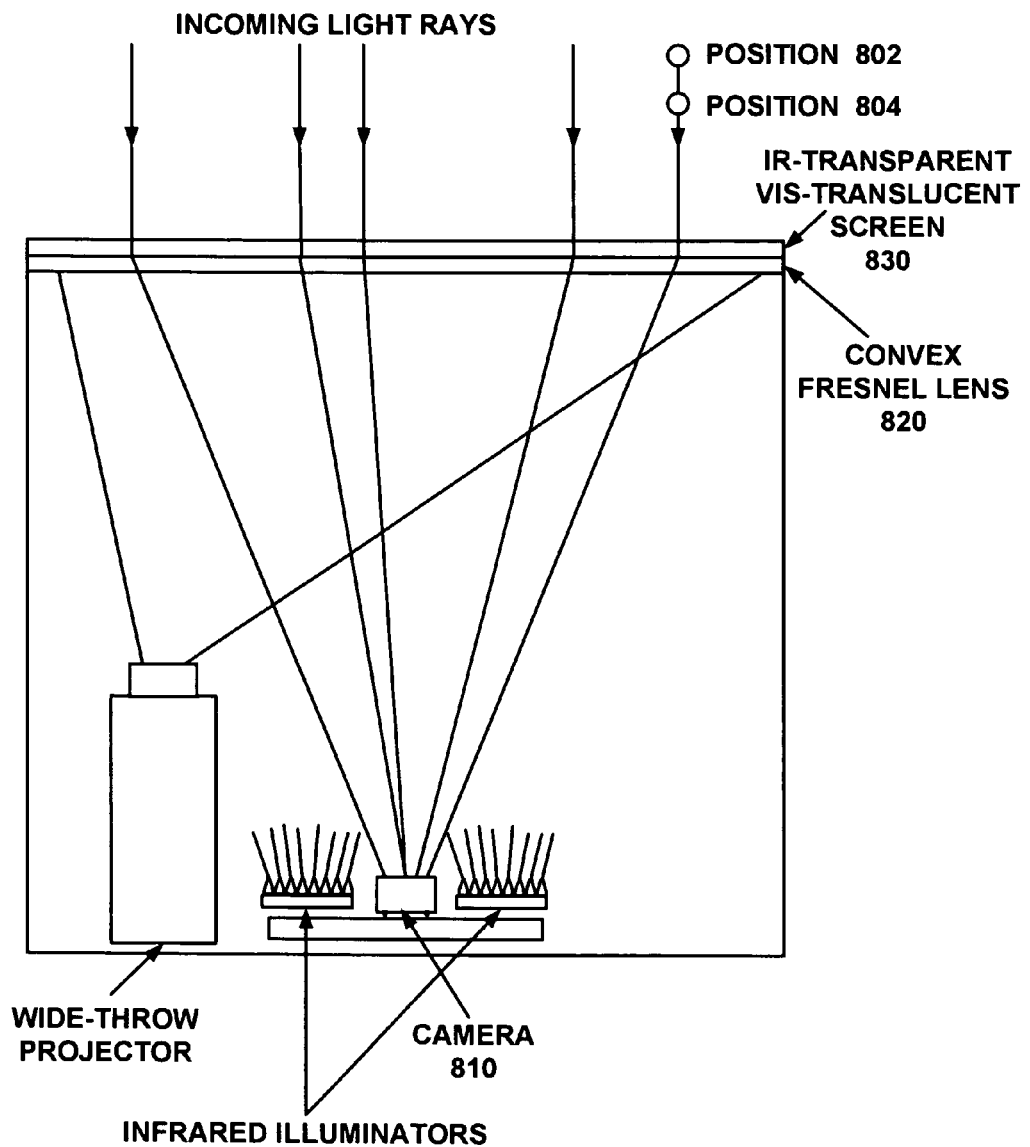
FIG. 8A is a schematic diagram illustrating a technique for reducing image distortion using a Fresnel lens, in accordance with one embodiment of the present invention.

In a distortion-free environment, the virtual position on screen 720 corresponding to a physical object is the perpendicular projection of that object's outline onto screen 720. Flat corrective optics such as Fresnel lenses can be placed on or near screen 720 so as to redirect the incoming light that is perpendicular to the screen toward camera 760. Thus, camera 760 views objects in their correct position relative to the surface of screen 720. FIG. 8A shows an exemplary embodiment of this configuration for a projector-based interactive video display system 800 in cross-section. Camera 810 is placed at the focal distance of Fresnel lens 820, causing light rays that shine onto screen 830 from a perpendicular direction to be redirected at camera 810. As a result, if an object moves from position 802 to position 804, its apparent position to camera 810 may not change. Thus, a desired effect is achieved, that is, an object above screen 820 has a virtual position that is the perpendicular projection of the object's outline on screen 820. Note that the optics of the camera's lens deserve special consideration; a pinhole lens gives ideal depth of focus and image clarity, while a wide-angle lens with the ability to focus past infinity would allow a brighter image at some expense to depth of focus and clarity. It should be appreciated that the Fresnel lens method of eliminating distortion may be used with both projected and transparent flat-panel display based interactive systems.

In the case of using the Fresnel lens with a self-contained projector display, the Fresnel lens does not affect the projected image because the IR-transparent, VIS-translucent screen in front of it scatters the projector's light, and the distance between this screen and the Fresnel lens is almost zero, so there is no distortion of the projected image.

In the case of using the Fresnel lens with a transparent flat-panel display, the transparent flat-panel display may be placed in front of the IR-transparent VIS-translucent screen and Fresnel lens, closest to the viewer. The Fresnel lens would not affect the illumination of the display because the white light backlighting is either already diffused or is diffused by a material between the Fresnel lens and transparent flat-panel display.

Figure 8B:
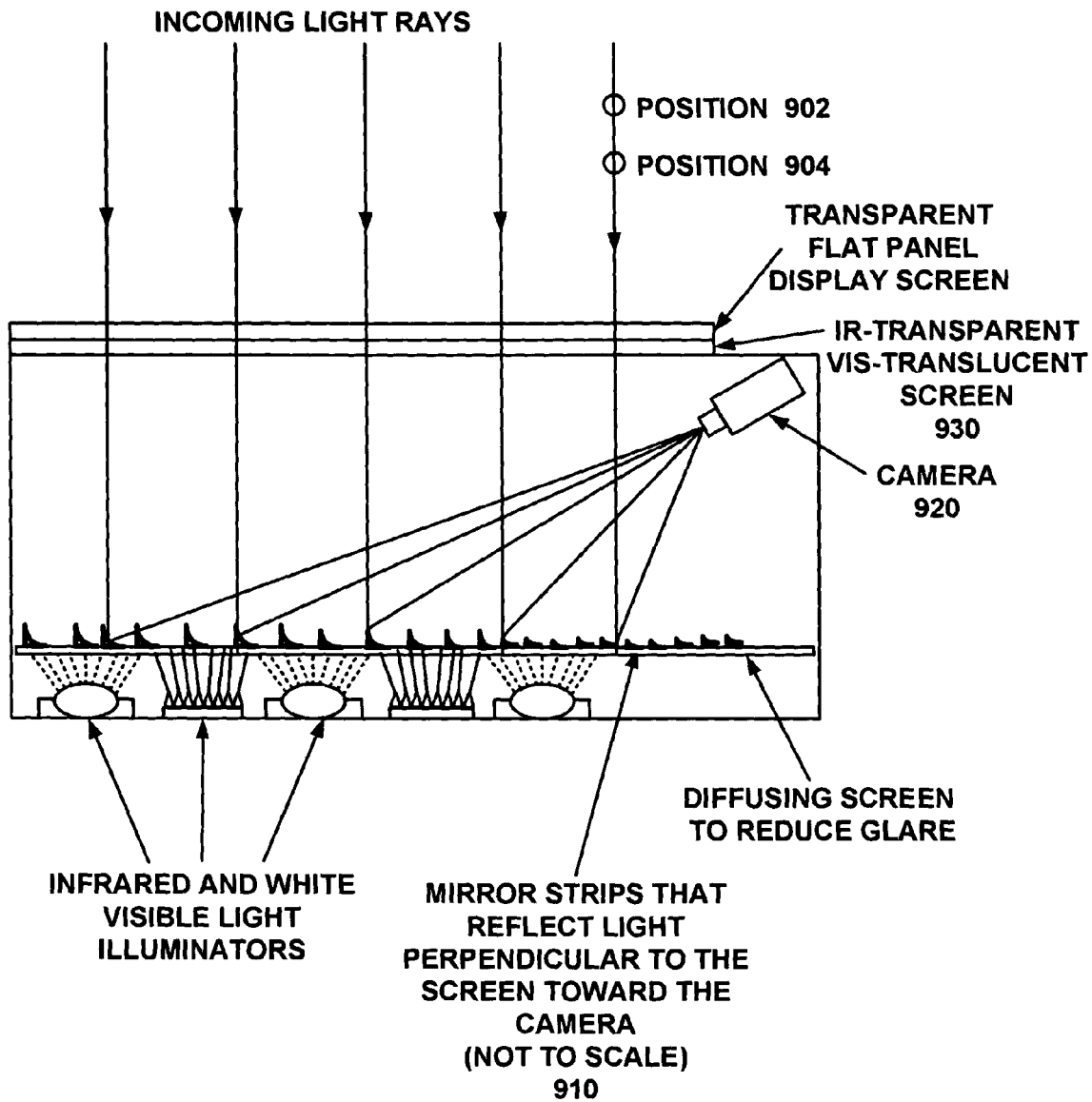
FIG. 8B is a schematic diagram illustrating a technique for reducing image distortion using a series of mirror strips, in accordance with one embodiment of the present invention.

Alternatively, the distortion may be eliminated by using a series of mirror strips on the back of the display, as shown in FIG. 8B. These mirror strips 910 are designed to redirect light shining perpendicularly onto the display toward camera 920. The camera is located to the side of the display so as not to interfere with the light. The actual number of mirror strips 910 may be very large and the strips themselves may be very thin. In one embodiment, enough space between the mirror strips 910 to allow lights from the back of screen 930 to shine through is provided. However, camera 920 cannot see these lights; due to its perspective, camera 920's view of this area is entirely of the mirror strips 910. When viewed in a direction perpendicular to screen 930, mirror strips 910 form circular curves in which the center of each circle is at the position of camera 920.

Since a projector cannot easily shine through the mirror strips 910, the present embodiment may be more usable with a transparent flat-panel display or an off-axis projection display in which the projector projects through the space between the mirror strips and the screen onto the screen. However, this does not preclude the use of a projector shining through the mirror strips; although some light will be lost, the projector's light is very unfocused at this point, and thus the final projected image may be unaffected.

Alternatively, if depth information about the scene being viewed (the distance from the camera to the object seen in each pixel) can be obtained, then the x-y-z coordinates of the position above the screen occupied by every pixel of every object viewed by the camera can be reconstructed (through a simple coordinate transform) and thus the camera's distorted view can be corrected. Such depth information can be obtained using a variety of means, including but not limited to stereo cameras, time-of-flight cameras, and patterned illumination.

The ability to reconstruct an undistorted three-dimensional (3D) view, with x-y-z coordinates for each pixel of the camera's image, would also allow the combination of data from multiple cameras into a single unified view of the objects in front of the screen by simple superposition of data. The use of multiple cameras (or multiple pairs of cameras if stereo vision is used for 3D) would allow the display to be made even flatter, with a narrower field of view for the cameras. In this case, the cameras or pairs of cameras would be ideally placed in a way such that they evenly cover the area behind the screen. For example, the cameras may be placed in a grid behind the screen.

Image Projection and Capture Using Scattering Polarizer Screen

Another screen material will now be described. This screen material serves as an alternative to the "IR-transparent VIS-translucent screen" used in the projector-based and transparent flat-panel display-based systems described earlier in the current application. Since the screen is disposed between the objects and the interactive display system, the screen should transmit the projected image while allowing the illumination source and camera to see through the screen clearly. In one embodiment, the screen acts as a transmission diffuser for the display image channel while behaving as a window for the camera capturing channel. An additional requirement for the screen is to prevent viewer from glare, that is, the uncomfortable visual stimulus from the direct or insufficiently scattered projector light.

In certain instances, while small particle scattering has a $\lambda^{-4}$ wavelength dependence for single-particle scattering, most diffusers employ multiple scattering to effect adequate diffusion. In multiple scattering the wavelength dependence of the scattered light is far more neutral, as is demonstrated by the color of milk. The intensity of light coherently scattered by small particles is also known to be proportional to $(n-1)^2$, where n is the relative index of refraction between the particle and the host matrix. In the present invention it is this property of scattering that is exploited to allow transparency in the capture channel and haze in the display channel. The method used here is compatible with but is not limited to the use of IR in the capture channel. The dispersion of normal polymer materials is inadequate to create contrast between the visible and near IR. Instead, we label the capture channel with one state of polarization state and the display channel with the orthogonal state. We also employ a screen which has the property of index matching (n=1) between the matrix and the dispersed particles for one state of polarization and index mismatching (n≠1) for the orthogonal state. In this way, the screen will have substantial haze for the display channel and substantial transparency in the capture channel. Materials may be tuned to effect a near-perfect index match at the capture channel which may have a very narrow spectrum (20 nm or so). Two primary metrics can be used to define the performance of this type of screen: the single piece transmission (Tsp) and the polarizer efficiency (PE). These quantities are defined as follows in Equations 1 and 2:

$$T_{sp}=(T_{\parallel}+T_{\perp})/2 \quad (1)$$

$$PE=|(T_{\parallel}-T_{\perp})/(T_{\parallel}+T_{\perp})| \quad (2)$$

where $T_{\parallel}$ and $T_{\perp}$ are the direct (e.g., unscattered or small-angle scatted) transmittances in for the two states.

For a perfect polarizer $T_{sp}$=0.5 and PE=1. For a real polarizer as the screen thickness or particle concentration increases over a certain useful range, $T_{sp}$ will decrease and PE will increase due to multiple scattering. These two performance metrics can be optimized for a given application by adjusting the materials and processing parameters of a given scattering system. A high $T_{sp}$ leads primarily to greater resolution at the camera and a high PE leads primarily to lower glare.

Figure 9A:
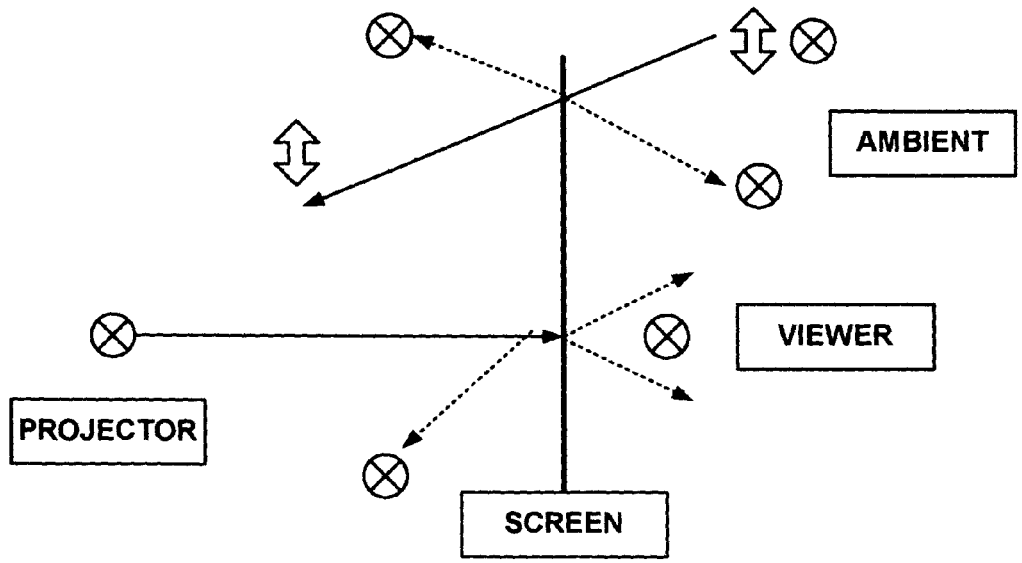
FIGS. 9A and 9B illustrate a schematic layout of an interactive video display system having a scattering polarizer screen, in accordance with an embodiment of the present invention.
Figure 9B:
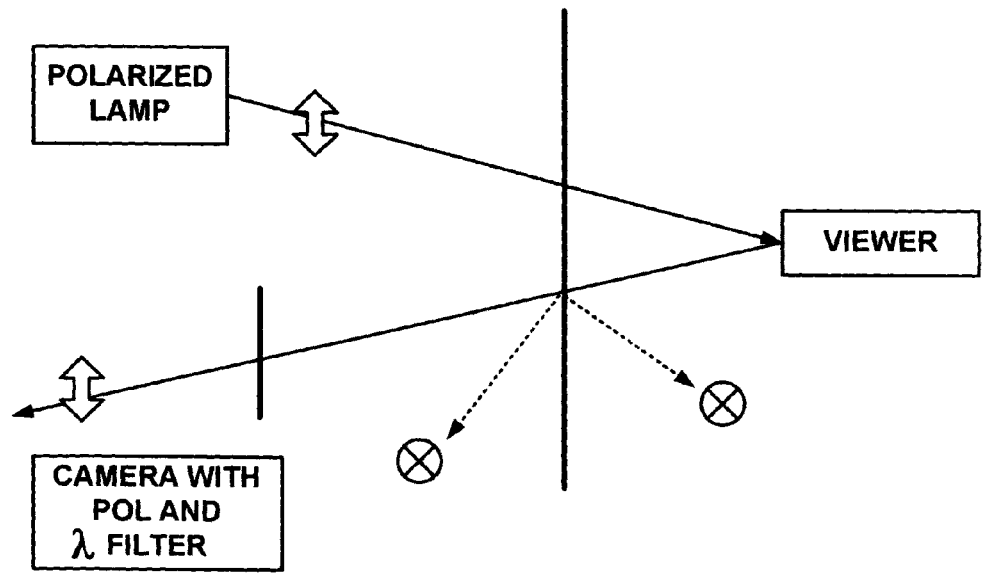

In one embodiment the projector light is polarized in the translucent state of the screen. For an LCD projector this can be arranged with very low loss. Part of the projected image light will be backscattered and part will be preferentially scattered in the forward hemisphere. The illumination used for the camera is preferentially polarized to avoid stray light. This can easily be accomplished with a film-type absorption polarizer. Illuminated objects will diffusely reflect the light, and roughly equal portions will be produced in the polarization states corresponding to transparency and scattering (e.g., polarization will not be preserved). The camera is fitted with an absorption-type polarizing filter so that only the direct light from the object is imaged. The camera may also be fitted with a narrow-band filter matching the lamp spectrum to avoid video feedback as well as interference from ambient light. If the scattering polarizer has the further property that the scattered light maintains the polarization of the incident light then ambient light reflections will be reduced, resulting in higher contrast. FIGS. 9A and 9B illustrate a schematic layout of an interactive video display system having a scattering polarizer screen, in accordance with an embodiment of the present invention. The cross and bi-directional arrows indicate states of polarization.

A typical LCD projector emits polarized light from its projection lens. However, in the case of the most common type of triple panel LCD projector, the polarization of the green primary is orthogonal to that of the red and blue primaries. (This is a result of the X-cube combiner design). Therefore, in order to project all three primaries in the same polarization the green must conform to the other two. This can be achieved with very low loss by employing a retarder stack (available, for example from Polatechno Corp. of Japan), which adds a half-wave of retardance to the green channel relative to that of the red and blue. This stack component can be deployed between the combiner cube and projection lens or between the lens and the screen. In order to maintain high lumen output and avoid image artifacts it is necessary to use a projection lens assembly which is polarization preserving.

Alternative Configuration of Self-Contained Interactive Projected Display

Screen materials that are partially transparent but translucent when light is shined on it at a particular angle, such as the HoloClear, a holographic screen manufactured by Dai Nippon Printing, can be used in the self-contained interactive display in a way that the interior of the display container is completely dark to the user. This can be accomplished by making all inside faces of the container black, with a black window that is transparent to infrared in front of the infrared camera and illuminator. Since the screen material is partially transparent, the camera is able to see objects beyond it. However, since the projector is offset at the appropriate angle (e.g., 35 degrees in the case of HoloClear), the light from the projector is completely diffused, eliminating the glare. Users of the display may not see anything behind the partially transparent screen because the interior is completely blacked out.

In another embodiment, a screen material can be used that can switch from clear to translucent almost instantly when an electric current is applied, such as the "Privacy Glass" product currently being marketed to interior designers. This material is referred to herein as a time-based material (e.g., transparent or translucent dependent on time). This material may be used instead of the wavelength or polarization selective screen. The camera exposures are very brief (e.g., approximately 100 microseconds, 30 times a second). When the camera is exposing, the screen material turns clear, allowing the camera to see through the screen. In the case of a projector system, an electronic (e.g., high speed liquid crystal shutter) or mechanical shutter can block the projector's light output, ensuring that the projector does not shine in the user's eyes during this time. When the camera is not exposing, the screen material turns translucent, allowing the projector's or backlight's light to be scattered. It should be appreciated that the term backlight refers to the illumination source for illuminating the flat-panel display with visible light.

General Description of Interface

Although described implicitly by the text herein, this system describes an interface to a self-contained display system. This interface allows the sensing of the position, outline, and potentially the distance of objects (including human users) in front of the display, and the display of real-time effects based on this sensing. These real-time effects may include a mapping of actions in the physical space in front of the display to effects of those actions in a corresponding location in the virtual space of the display. In other words, the system may be calibrated so that interaction with a virtual object on the display happens when a physical object such as a user's hand is placed at the location of the virtual object on the display. This display has the physical property that there is no visible sign of any sensing equipment; only the display screen itself is visible. In the case of a window display system, described later in the present application, the interface is the same as described for the self-contained display, but the display takes the form of a window display in which no apparatus is placed on the same side of the window as the user.

In a number of embodiments of the present invention, a video camera is used as the sensing apparatus. The camera's images serve as input to a computer vision system that separates foreground objects (such as people) in the camera's images from static background in real-time. This foreground-background distinction serves as an input to an interactive video display application that generates the images that are displayed on the display screen. These images can be calibrated such that the effects of an object on the displayed image of the interactive application are in the same physical location as the object. This creates the illusion of an augmented reality, in which a person can interact with images or objects on the screen through natural body motions such as picking up, pushing, or pulling, allowing the illusion of manipulating real objects or images Transparent Display Screen In one embodiment of the system, an LCD screen or other such transparent screen is used as the display apparatus. The camera is used for sensing the motion of human users is placed behind the screen. Thus, the camera views the area in front of the screen by looking through the screen. This area in front of the screen, where human users and objects can be detected by the camera, is called the interactive area. Therefore, the screen is at least partially transparent to the wavelengths of light viewed by the camera.

In order to prevent the content being displayed on the screen from affecting the camera's image of objects beyond the screen, the camera operates at a wavelength of light for which the screen is partially transparent no matter what content (including the color black) is being displayed. Ideally, the content on the screen should have no effect on the optical properties of the screen at the wavelengths of light viewed by the camera. In the case of the LCD monitors used in laptops and flat-panel computer displays, the LCD screen typically achieves this property when the camera viewing through it is only sensitive to wavelengths of light of 920 nm or longer. However, a few LCD panels also achieve this property at wavelengths closer to visible light, such as 800 nm. In addition, the polarizers in the LCD screen do not polarize light at these wavelengths.

The LCD or other transparent display screen is illuminated so as to allow the viewer to see the content on it. Ideally, this light should be bright and evenly spread across the screen. Typical LCD displays use any one of a variety of backlighting and edge-lighting solutions. However, because these solutions typically involve putting several layers of scattering, reflective, or opaque material behind the screen, they do not allow a camera behind the screen to view the area in front of the screen. However, the present invention describes several selective scattering materials that allow the camera to view the area in front of the screen while still providing bright and even illumination of the area in front of the screen.

In the following solutions, the illumination source for backlighting or edge lighting is preferably a long-lifetime efficient white visible light emitter, such as, a fluorescent lamp or white LED, but can be any source of visible light.

1. Rayleigh Scattering Material

One solution involves placing a sheet of material with strong Rayleigh scattering on the back surface of the screen, using white backlighting or edge lighting to illuminate the display screen, and using a near-infrared-sensitive camera to view through the screen. Since Rayleigh scattering is proportional to the inverse fourth power of the wavelength of light being scattered, almost all the white light is scattered by the Rayleigh material, providing even illumination of the screen. However, relatively little of the infrared light viewed by the camera will be scattered because infrared is of a longer wavelength than visible light.

2. Textured Material

Figure 10A:
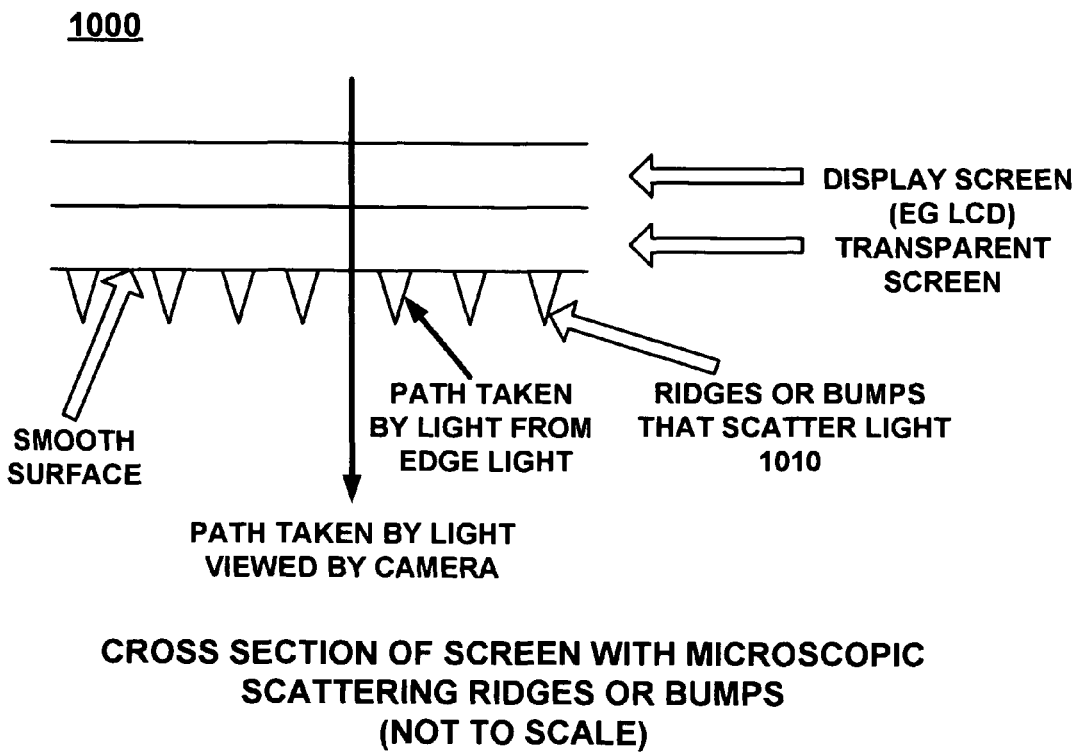
FIG. 10A illustrate a cross-section of a screen with microscopic scattering ridges or bumps, in accordance with an embodiment of the present invention.
Figure 10B:
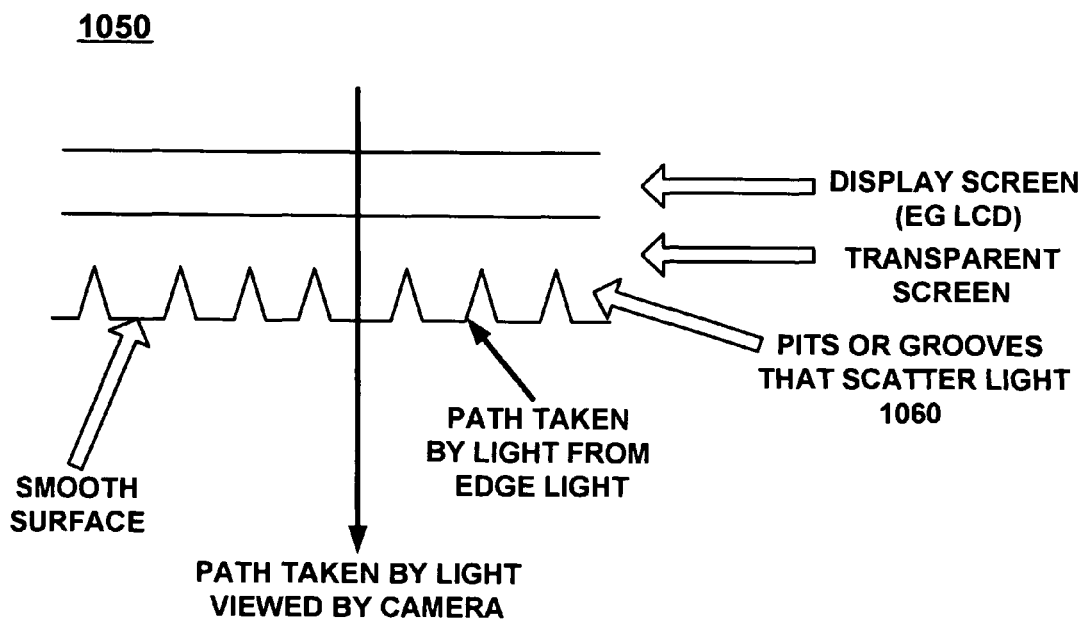
FIG. 10B illustrate a cross-section of a screen with microscopic scattering pits or grooves, in accordance with an embodiment of the present invention.

Another solution involves creating a flat sheet of material with a physical texture of bumps, ridges, pits, or grooves interspersed between flat areas. This material can then be placed on the back surface of the display screen. This material can have the effect of scattering all light that passes through it at a glancing angle, while only scattering a small portion of light that passes through it perpendicularly. Some such materials are shown in FIGS. 10A and 10B. FIG. 10A shows a simplified cross-section of a material 1000 that has microscopic bumps or ridges 1010 that scatter light. The scattering may be accomplished by texturing the surface of the ridges or bumps 1010, by making the ridges or bumps out of a material that scatters light, or through other methods. FIG. 10B shows a simplified cross-section of a material 1050 that has microscopic grooves or pits 1060 that scatter light. The scattering may be accomplished by texturing the surface of the grooves or pits 1060, by filling in the grooves or pits 1060 with a material that scatters light, or through other methods. In all cases, a significant portion of light that passes through near perpendicular to the surface of the material will not be scattered, while nearly all of the light that passes at a glancing angle to the surface will be scattered.

Figure 11:
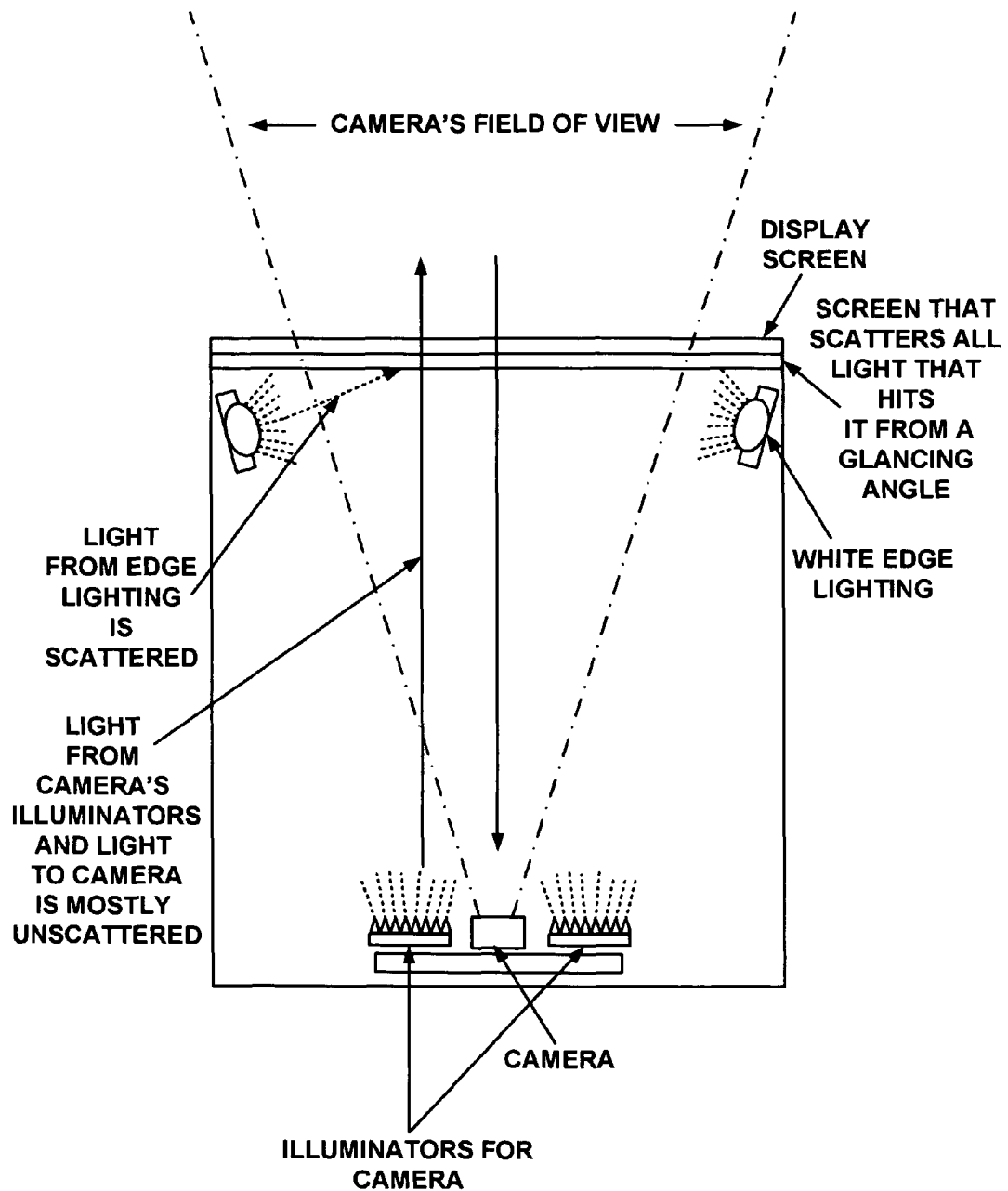
FIG. 11 illustrates a sample configuration for edge lighting, in accordance with an embodiment of the present invention.

Thus, if the screen is illuminated through edge lighting, the display screen can be evenly and brightly lit while allowing the camera to see through the screen. FIG. 11 illustrates a simplified schematic diagram of a self-contained edge-lit interactive display in cross section, in accordance with an embodiment of the present invention. Edge lighting 1110 provides visible illumination for illuminating display screen 1140 (e.g., an LCD). Screen 1150 is placed adjacent to display screen 1140, and is operable to scatter light that hits it from a glancing angle (e.g., the angle of edge lighting 1110. Illuminators 1120 illuminate object in the field of view of camera 1130. Light from illuminators 1120 hits display screen 1140 at a perpendicular or near-perpendicular angle, and is not scattered.

3. Scattering Polarizer

In another embodiment, a scattering polarizer, as described in the section "Image Projection and Capture Using Scattering Polarizer Screen" is placed on the back of the display screen. This scattering polarizer scatters light of one polarization, while leaving light of the opposite polarization unscattered. The display screen can be evenly illuminated using backlighting by linearly polarizing the backlight in the same direction as the scattering direction on the scattering polarizer. Thus, all of the backlight is scattered before it passes through the display screen.

Alternatively, the backlight can be unpolarized and a linear polarizer may be placed between the scattering polarizer and the display screen, with the polarizer's polarization oriented in the same direction as the direction in the scattering polarizer that scatters the light. Thus, any light from the backlight that is not scattered by the scattering polarizer is of opposite polarization to the linear polarizer, causing it to be absorbed. This causes the illumination on the display screen to be even and annoying glare in the user's eyes is eliminated.

If the display screen is an LCD screen, then the backlight does not need to be polarized because there is a linear polarizer built in to the back surface of the LCD screen. In this case, even illumination can be achieved from an unpolarized backlight simply by placing the scattering polarizer on the back of the LCD screen, oriented such that the direction of maximal scattering in the scattering polarizer is parallel to the polarization of the linear polarizer on the backside of the LCD screen. Thus, only light that is scattered by the scattering polarizer is allowed to pass through the LCD screen.

Flat-Panel Display Screen

Figure 12:
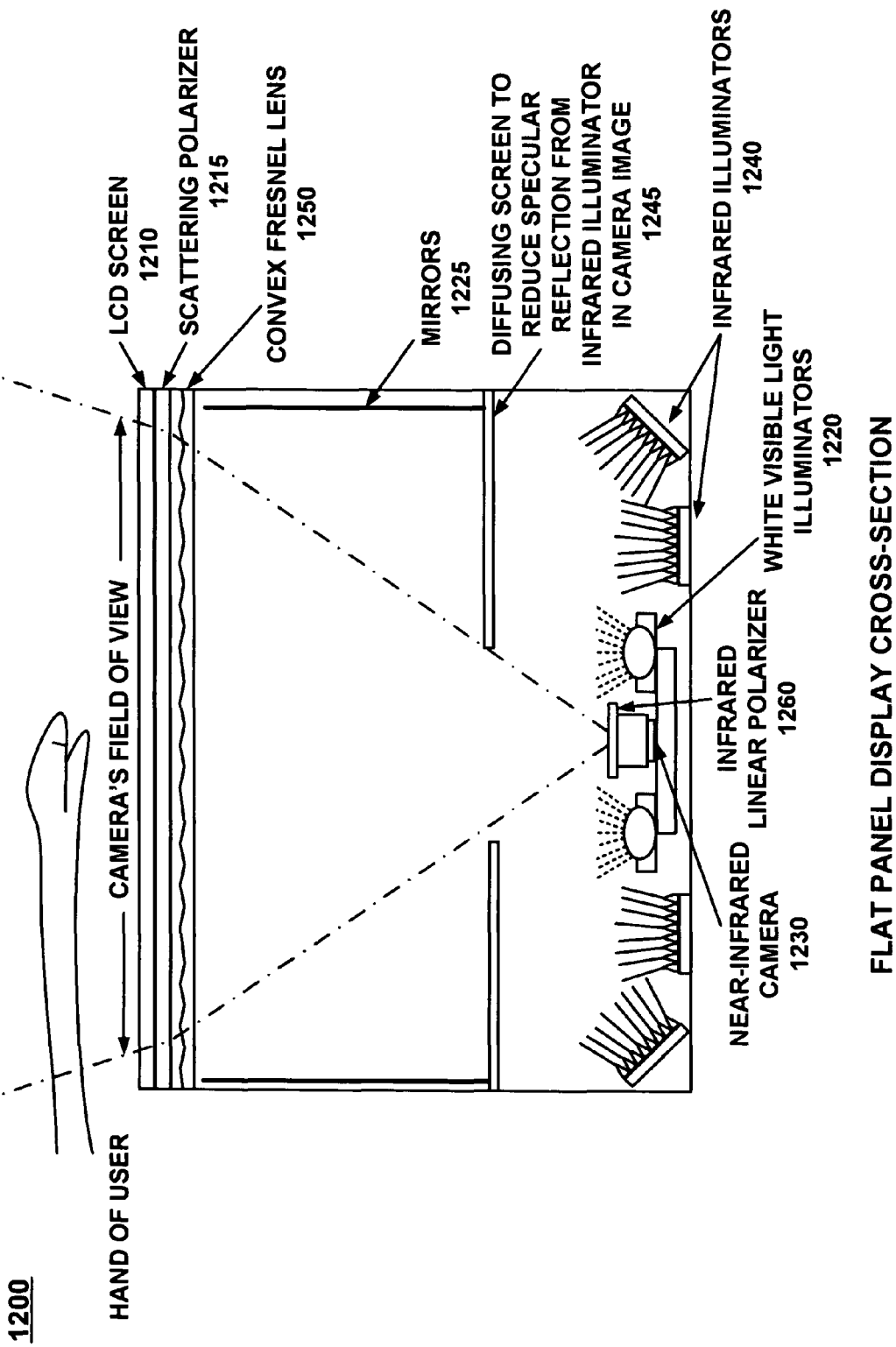
FIG. 12A illustrates a flat-panel display cross-section, in accordance with an embodiment of the present invention.
FIG. 12B illustrates a flat-panel display cross-section, in accordance with another embodiment of the present invention.

A simplified cross-sectional diagram of an exemplary embodiment of a self-contained display 1200 utilizing a display screen is shown in FIG. 12A. The display is created using an LCD screen 1210 that is backlit by a white visible light 1220. The scattering polarizer 1215 scatters all this light, providing even illumination for the viewer. Mirrors 1225 on the side of the self-contained unit reflect stray white light from the lights 1220 back towards the display screen 1210, increasing its brightness. A video camera 1230 sensitive to only near-infrared light from 920 nm to 960 nm views the area in front of LCD screen 1210, referred to as the "camera's field of view". Objects within this field of view will be visible to camera 1230. Illumination for the camera's field of view comes from sets of infrared LED clusters 1240, which produce light in wavelengths viewable by camera 1230, on the back side of the box. The light from these LEDs 1240 is slightly scattered by a diffusing screen 1245 before it reaches LCD screen 1210 to prevent bright specular highlights from the LEDs 1240 from showing up on the camera's image. A Fresnel lens 1250 is used to reduce the distortion of the camera's view of the area in front of LCD screen 1210.

The paths of visible and infrared light through the exemplary embodiment in FIG. 12A will now be described. We will refer to the two perpendicular polarizations of light as polarization A and polarization B.

Visible light from the white light illuminators 1220 starts unpolarized, and may be scattered by a diffusing material 1245, redirected by a Fresnel lens 1250, or reflected off the mirrors 1225 on its path toward screen 1210. Next, this light passes through scattering polarizer 1215, which scatters all the light of polarization A and none of the light of polarization B (where A and B refer to two perpendicular polarizations). The scattered light retains its polarization after being scattered. This light then passes through LCD screen 1210, which absorbs all the light of polarization B and transmits all the light of polarization A. Thus, LCD screen 1210 is illuminated using only scattered light, and the viewer sees an evenly illuminated screen.

The infrared light emitted from the infrared illuminators 1240 may begin unpolarized. Optionally, for improved clarity, this light can first pass through an infrared linear polarizer 1260 to polarize it in polarization B so that less of it will be scattered by the scattering polarizer 1215. Next, the infrared light may be scattered by a diffusing material 1245, redirected by a Fresnel lens 1250, or reflected off the mirrors 1225 on its path toward screen 1210. If the light is unpolarized, some of it will be scattered as it passes through scattering polarizer 1215, but the light of polarization B will pass through scattering polarizer 1215 unscattered. Since the wavelength of the infrared light is sufficiently long, it passes unaffected through LCD screen 1210 and can illuminate objects in front of the screen, such as a human hand.

Infrared light returning from in front of the display screen toward camera 1230 will be unaffected by LCD screen 1210. However, as the light passes through scattering polarizer 1215, the light of polarization A will be scattered while the light of polarization B will remain unscattered. Next, the light passes through Fresnel lens 1250, but it does not significantly affect polarization. Camera 1230 has an infrared linear polarizer 1260 immediately in front of it; this polarizer 1260 absorbs light of polarization A and transmits light of polarization B. Thus, camera 1230 only views light of polarization B, which was left unscattered by scattering polarizer 1260. This gives camera 1230 a clear, high-contrast image of the area in front of the screen.

Figure 12B:
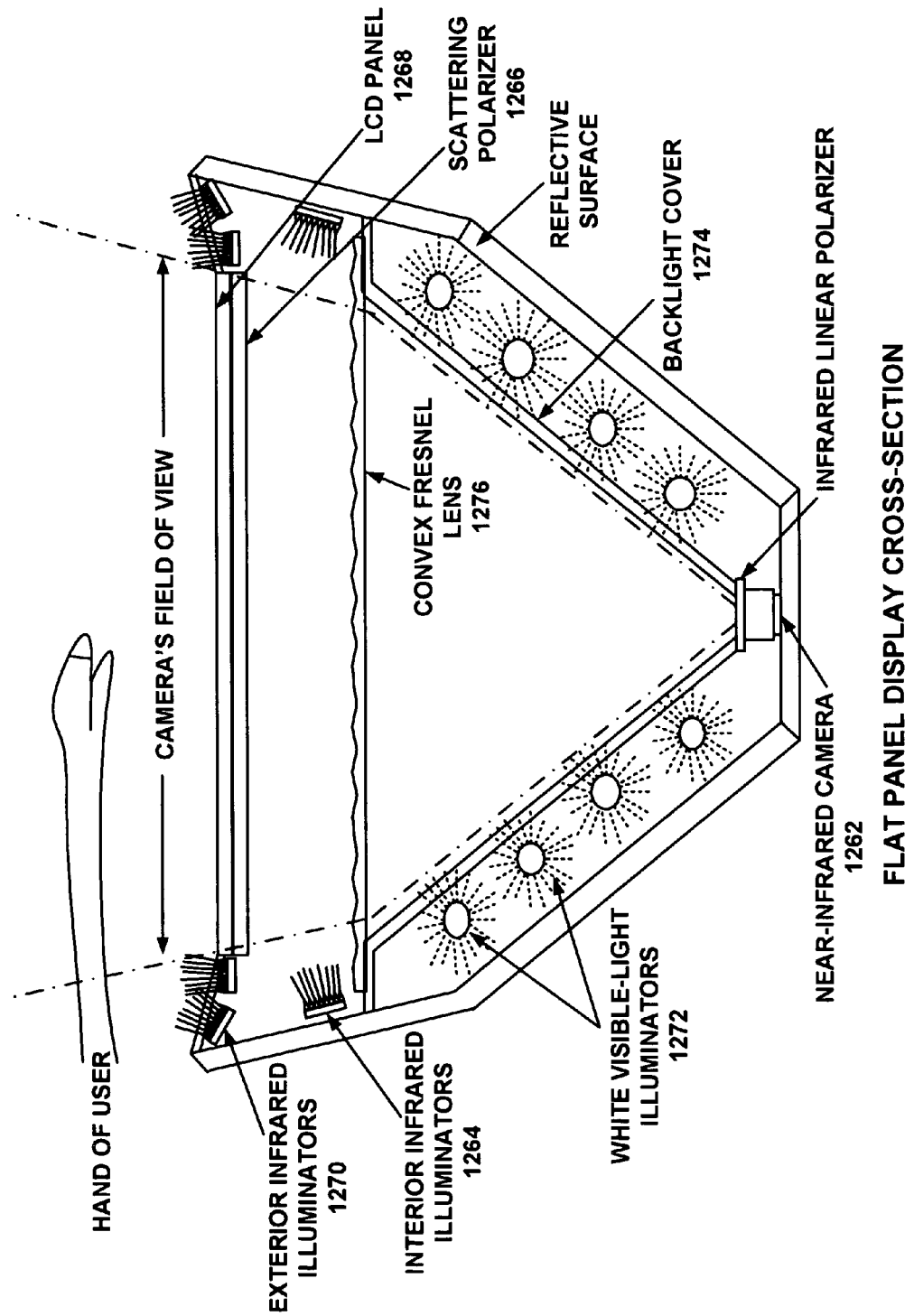

Another exemplary embodiment of an LCD-based interactive display is shown in cross section in FIG. 12B. The overall system is wedge-shaped. The system design is similar to the design as shown and described around FIG. 12A. However, the infrared illuminators have been positioned to minimize glare into the camera 1262. Objects on and near the screen are illuminated by the interior infrared illuminators 1264, which shine through the scattering polarizer 1266 and the LCD panel 1268. However, they do not shine through Fresnel lens 1276 in order to reduce glare effects on the camera 1262. The Fresnel lens 1276 is set back from the surface of the LCD panel 1268 and the scattering polarizer 1266 in order to provide room for interior infrared illuminators 1264. Exterior infrared illuminators 1270 illuminate objects that are further away from the screen. Infrared illuminators 1270 shine around (rather than through) LCD panel 1268 or scattering polarizer 1266, allowing glare to be further reduced. The white visible light illuminators 1272 are arranged along the sides of the system's base, and are covered by backlight cover 1274. Backlight cover 1274 may consist of a material that absorbs near-infrared but transmits visible light in order to reduce the presence of ambient infrared on the screen, and therefore improve the contrast of the image captured by camera 1262.

Projected Display Screen Using a Scattering Polarizer

In another embodiment of the interactive video display system, a projector and projection screen are used as the display apparatus. The camera used for sensing the motion of human users is placed behind the screen. Thus, the camera views the area in front of the screen by looking through the screen. Therefore, the screen is at least partially transparent to the wavelengths of light viewed by the camera. The scattering polarizer can serve as the projection screen in this system.

It should be appreciated that the scattering polarizer may not operate perfectly. A small amount of light in the polarization that is supposed to be scattered may not be scattered. Because of the extreme brightness of projector light when it is viewed directly, the bright light source inside the projector's lens may still be directly visible through the scattering polarizer, even though the projector's light may be polarized in the appropriate direction for maximum scattering. This bright spot of glare can be eliminated by using a linear polarizer in front of the scattering polarizer in order to ensure that unscattered projector light is absorbed. In addition, if the projector's light is not completely polarized, a similar problem will appear. This problem can be reduced by using a linear polarizer behind the scattering polarizer. In both cases, these polarizers are oriented parallel to the projector's light. If the camera is near-infrared or another non-visible light wavelength, the visible-light polarizer can be chosen such that the camera is unaffected by it. Thus, the camera is able to view through the screen.

Eliminating Specular Reflections

In addition, specular reflections from the camera's illuminators can adversely affect the camera's image. These effects can be mitigated by applying antireflective coatings to one or both surfaces of the display screen as well as any surfaces behind the screen, including the Rayleigh scattering material, textured material, scattering material, or Fresnel lens. These effects can also be mitigated by angling the light coming out of the illuminators so that there is no specular reflection from the camera's illuminators back into the camera.

One example of such a configuration is shown in FIG. 13. This configuration employs spot illuminators 1310 that are distant from camera 1320 and shine perpendicular to screen 1330, preventing any specular reflection into camera 1320. Areas not covered by these illuminators are lit by illuminators 1340 that shine at a glancing angle to screen 1330, preventing the reflected light from shining back to camera 1320.

In another embodiment, the scattering polarizer 1410 or other selective scattering material can be slightly bent so that specular reflections of the camera's illuminators 1440 are bounced away from camera 1430, as shown in FIG. 14. As shown, specular reflections from illuminators 1440 are redirected toward the sides of the box. In another embodiment, a diffusing material can be placed in front of the camera's illuminators to soften any specular reflections into camera. Light from these illuminators could also be diffused by bouncing their light off the back of the display.

FIG. 15 illustrates an exemplary configuration of an interactive video display system 1500 using time-of-flight cameras 1530, in accordance with an embodiment of the present invention. Specular reflections pose a particular problem for time-of-flight cameras 1530 because, in typical designs, the camera and the camera's illuminators must be placed immediately adjacent to each other, and the light from illuminators cannot be scattered. Thus, the aforementioned approaches will not work in an implementation that uses time-of-flight cameras due to the camera's illuminator causing severe glare from its reflection off of the screen back into the camera. However, because the computer vision system can use the 3D camera information to perform a coordinate transform to the desired coordinate system, the camera need not be placed behind the center of the screen, and data from multiple cameras could be merged. Thus, for example, two time-of-flight cameras 1530 could be used to view the area in front of screen 1510 at an angle so as to avoid any specular reflection from their illuminators, as long as the two cameras 1530 took their exposures at different times. In this configuration, neither camera would be able to view the specular reflection of its built-in illuminator.

Adding a Touchscreen Interface

Although the described system is able to recognize objects and gestures several inches away from the screen, touchscreen behavior can be provided as well, in which users have to literally touch the screen to cause an action to take place. This will allow the system to support additional varieties of user interfaces. For example, this interface could allow users to "gather" virtual objects on the screen by cupping their hands together above the screen, but also "pick up" a virtual object by touching its image and then "drop" the object by touching another point on the screen.

This touchscreen behavior can be implemented in one of several ways. The touchscreen examples described in this section and subsequent sections are compatible with both projector-based and transparent flat-panel display based interactive video systems. An existing touchscreen technology can be integrated with the system's screen so long as the portion covering the display screen is transparent to the camera. This includes resistive touchscreens, capacitive touchscreens, infrared grid touchscreens, and surface acoustic touchscreens. However, all of these screens have the drawback that they can only detect one finger touching the screen at a time; some cannot even detect a continuous touch as opposed to a brief tap. There are several solutions which overcome the foregoing drawback, many of which also allow the system to collect information about the distance between an object and the screen. This 3D data is useful for higher-level vision processing such as gesture recognition.

Multi-User Touchscreens and 3D Data: Stereo Camera

A multi-user touchscreen can be created, which allows multiple people to use the screen simultaneously, by making some slight modifications to this system. In one embodiment, a stereo camera can be used in place of a single camera. The stereo camera would have the same wavelength sensitivity and filter setup as the single camera system. However, the computer could take the two images from the stereo camera, and, using any one of several well-known stereopsis algorithms, such as the Marr-Poggio algorithm, deduce distance information for any objects seen on-screen. Since the distance to the screen is known, the computer can identify whether any object is touching the screen by comparing the object distance information to the distance to the screen.

Multi-User Touchscreens and 3D Data: One-Camera Stereo

Figure 16:
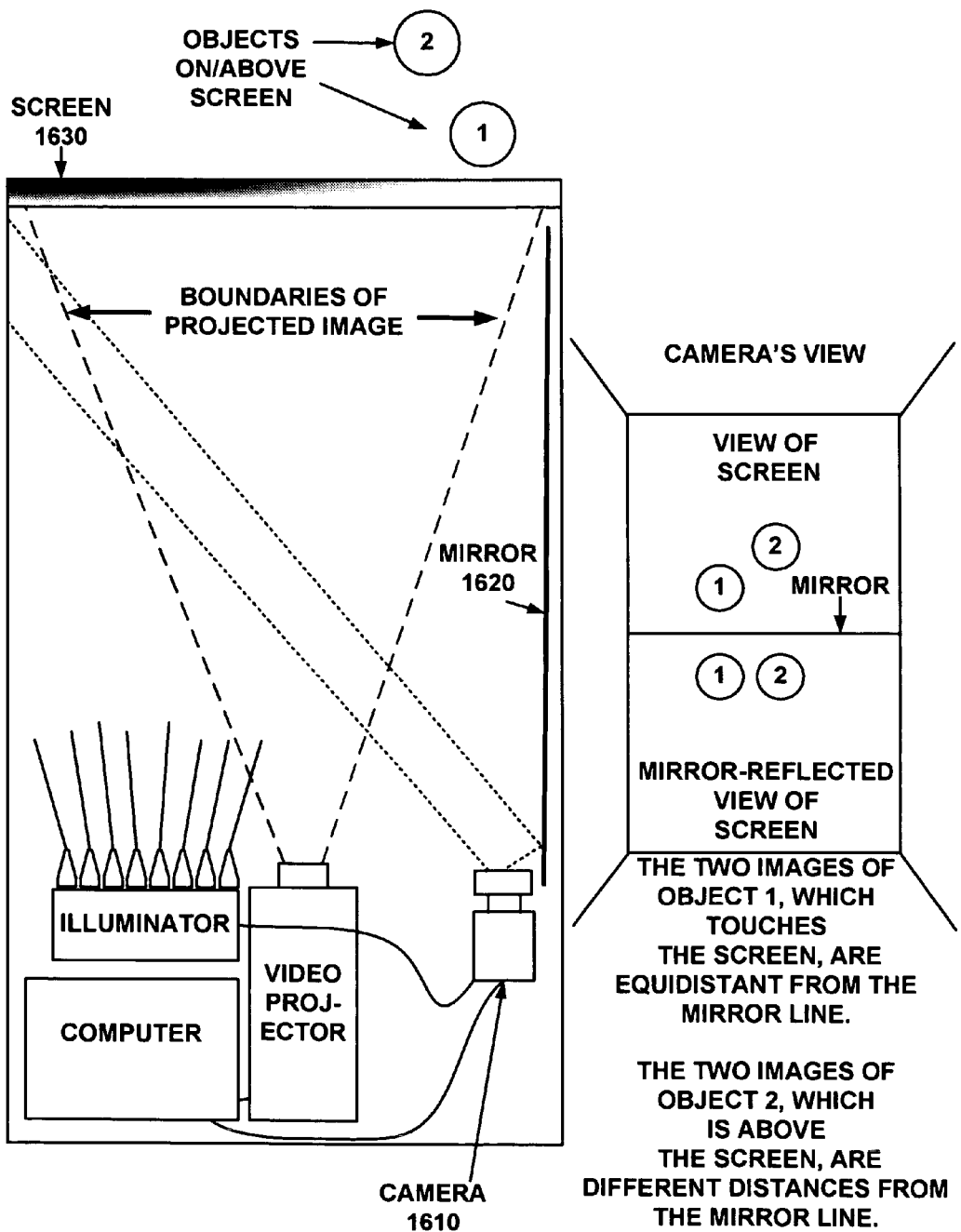
FIG. 16 shows a first configuration for capturing 3D data, in accordance with an embodiment of the present invention.

FIG. 16 illustrates a configuration 1600 for using a mirror to get 3D information, in accordance with an embodiment of the present invention. Stereo data can be acquired using only one camera 1610 by placing a mirror 1620 on the inside side of the box. Thus, camera 1610 would see screen 1630 both directly and at an angle. An object that is touching screen 1630 will appear the same distance from the edge of mirror 1620 in both the camera's main image and reflected image. However, an object above screen 1630 will be at different distances from the edge of mirror 1620 in the main and reflected images. By comparing these images, the computer can deduce whether each object is touching screen 1630.

Multi-User Touchscreens and 3D Data: Patterned Illumination

Figure 17:
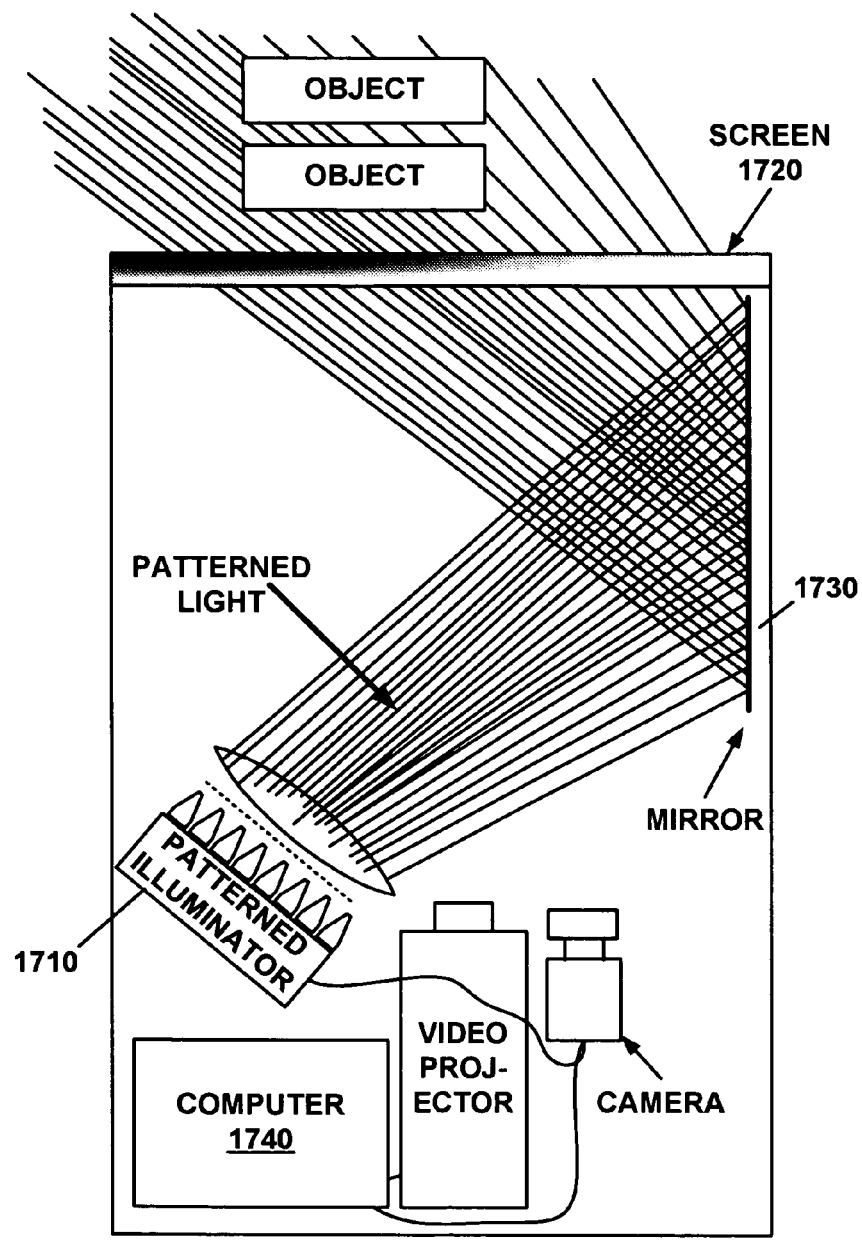
FIG. 17 shows a second configuration for capturing 3D data, in accordance with an embodiment of the present invention.

FIG. 17 illustrates another configuration 1700 for using patterned illumination to get 3D information, in accordance with an embodiment of the present invention. A patterned infrared illuminator 1710, which projects a light pattern, can also be used in place of the regular infrared illuminator. This system could distinguish between objects on screen 1720 and above screen 1720. However, the precision of this system could be improved by having the patterned infrared illuminator 1710 shine on screen 1720 at an angle, perhaps by bouncing it off a mirror 1730 on the interior side of the box. The position of the patterned light on an object would change dramatically as it is moved even a short distance away from or towards screen 1720, allowing the distance between the object and screen 1720 to be more easily determined by computer 1740.

Multi-User Touchscreens and 3D Data Time of Flight System

The camera could be a time-of-flight infrared camera, such as the models available from Canesta and 3DV systems. This camera has a built-in capability to detect distance information for each pixel of its image. If this sort of camera is used, then it will be crucial to eliminate all infrared glare from the screen; otherwise, the camera will mistake the illuminator's reflection on the screen for an actual object. Methods for eliminating infrared glare are described above.

Multi-User Touchscreens: Multiple Wavelengths

Touchscreen behavior can also be achieved by having two cameras and two illuminators, with each camera-illuminator pair at a different infrared frequency. For example, one camera-illuminator pair could use 800 nm light while the other could use 1100 nm light. Since the screen's scattering is proportional to the inverse fourth power of the wavelength, the 800 nm camera would have far less ability to see what is beyond the screen than the 1100 nm camera. As a result, only objects that are touching or almost touching the screen would be visible to the 800 nm camera, while the 1100 nm camera would be able to see objects several inches away from the screen. Both cameras would input their data to the computer and run through separate vision systems. The 800 nm data would be the input to the touchscreen interface, while the 1100 nm camera would be used for gesture input because it can detect objects above the screen.

Multi-User Touchscreens: Narrow Beam on Display Surface

Figure 18A:
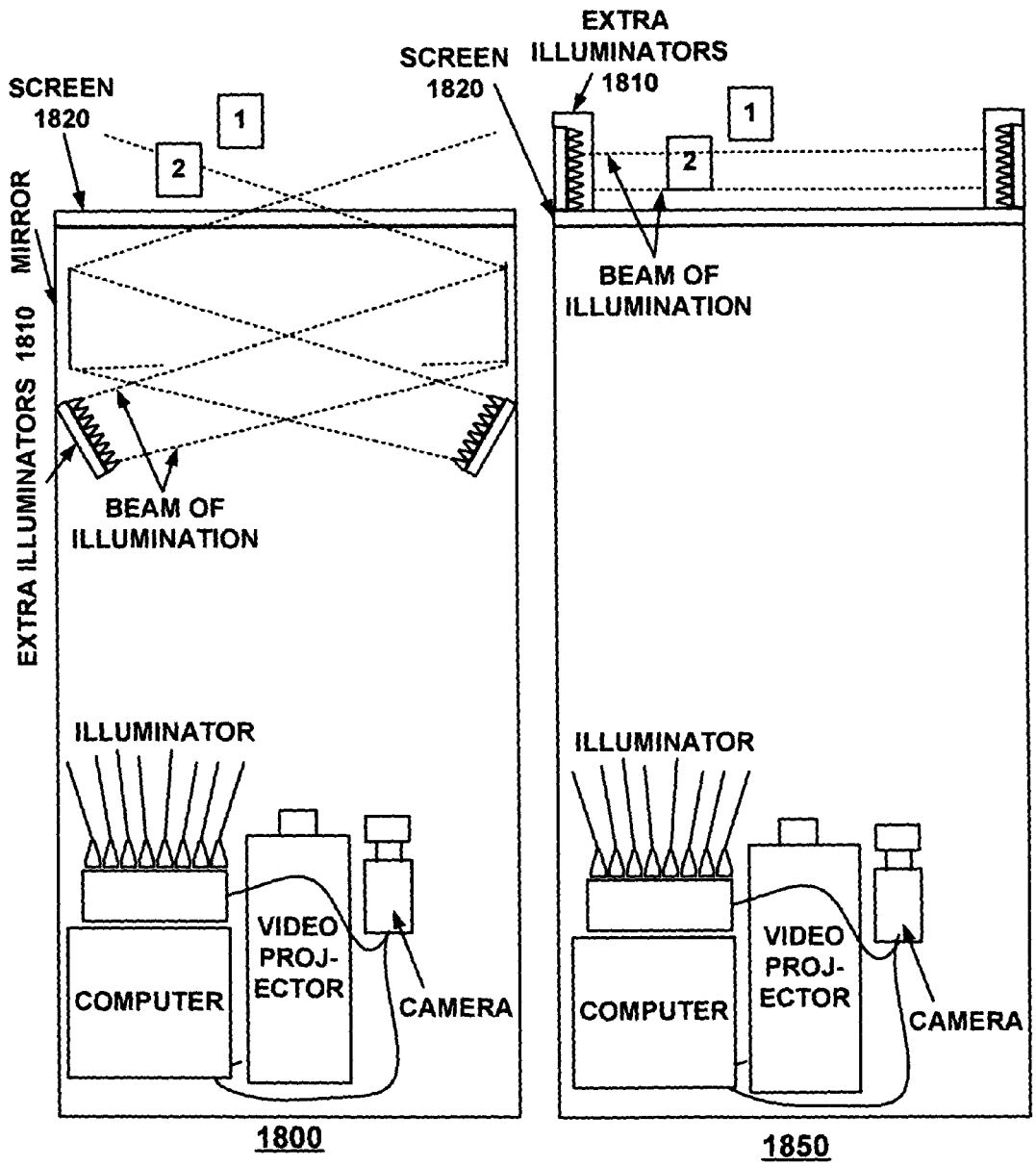
FIG. 18A shows two additional configurations for capturing 3D data, in accordance with an embodiment of the present invention.

FIG. 18A illustrates configurations 1800 and 1850 for using additional illuminators to get 3D information, in accordance with an embodiment of the present invention. A second illuminator 1810 can be used to light only objects that are on or very close to the display surface. For example, if a narrow-angle illuminator, such as an LED or laser, is placed just inside or outside screen 1820, pointed nearly parallel to screen 1820, then objects next to screen 1820 will show up very bright in the camera's image. Cylindrical lenses or other means may be used to spread the illuminators' light horizontally but not vertically, allowing it to cover the full area of the screen. The vision system can then deduce that very bright objects are either very close to or touching screen 1820.

Figure 18B:
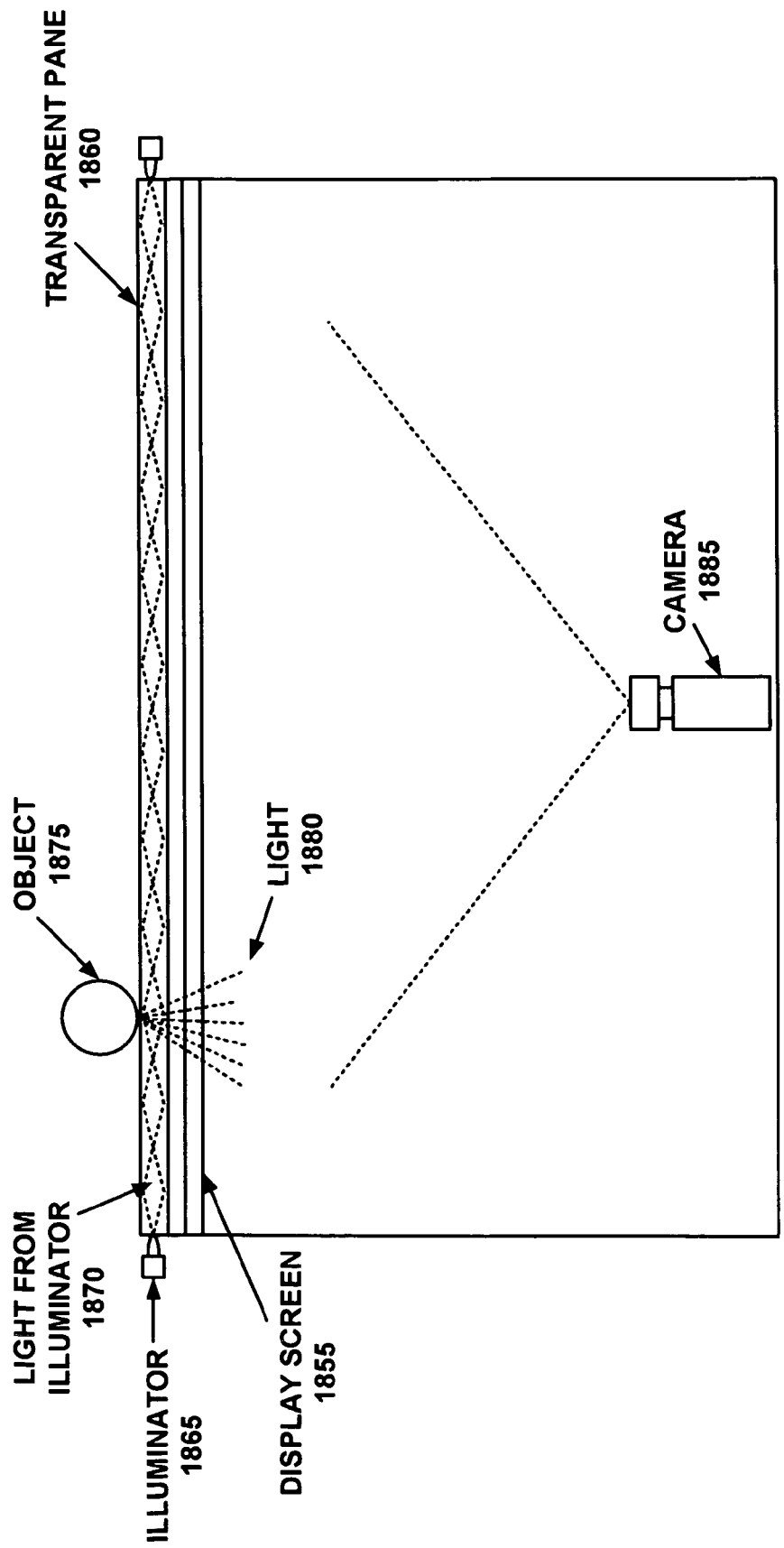
FIG. 18B shows another configuration for capturing 3D data, in accordance with an embodiment of the present invention.

In another embodiment, the beam can be shined inside the display surface. The illumination system of such an embodiment as shown in FIG. 18B. A transparent pane 1860 is placed in front of the main display screen 1855. An illuminator 1870 shines a narrow beam into the edge of transparent pane 1860. Because of the steep angle of incidence, the light 1870 reflects completely within the confines of transparent pane 1860. However, if an object 1875 is touching the screen, the light 1870 is able to scatter, allowing it to escape the confines of transparent pane 1860. This light 1880 is then able to be detected by the camera 1885. This allows the camera 1885 to detect when an object 1875 or user is touching the screen.

For these approaches, which utilize a second set of illuminators at or near the surface of the screen, these are several designs which allow the system to distinguish between light from the main illuminators and light from the secondary illuminators. This distinction is important as it allows the system to detect objects touching the screen separately from objects that are merely in front of the screen.

First, the two sets of illuminators could turn on during alternate camera exposures, allowing the system to see the area in front of the screen as lit by each illuminator. Alternately, the system could use two cameras, with each camera-illuminator pair operating at a different wavelength. In addition, the system could use two cameras but have each camera-illuminator pair strobe on at different times.

Multi-User Touchscreens and 3D Data; Brightness Ratios

Touchscreen behavior can be achieved by placing different illuminators at different distances to the screen. Suppose that illuminator A is two feet away from the screen and illuminator B is one foot away from the screen. The brightness of an illumination source is proportional to the inverse square of the distance from the illumination source. Thus, the ratio of light from A and B on an object changes as its distance changes. This ratio allows the computer to determine whether an object is on the screen. Table 1 shows an example of how the ratio between light from A and B can differentiate between an object on the screen and an object even an inch above the screen.

TABLE 1

| Object position | Light from illuminator A (relative to 1 ft away) | Light from illuminator B (relative to 1 ft away) | Ratio of light from B to light from A |
|---|---|---|---|
| Touching screen | 0.25 | 1 | 4 to 1 |
| 1 inch above | 0.23 | 0.85 | 3.7 to 1 |
| 1 foot above screen | 0.11 | 0.25 | 2.3 to 1 |

The ratio holds true no matter what color the object is so long as it is not completely black. In addition, because the LED light is nonuniform, the ratio of an object touching the screen may vary depending on what part of the screen the object is touching. However, that ratio can be established during the calibration process and reaffirmed over time by recording the maximum ratios recently observed at each point on the screen.

Illuminator A and illuminator B can be distinguished. In one embodiment, two cameras and illuminators are used and tuned to different wavelengths, as described above under the heading "Multi-user touchscreens: Multiple wavelengths". Thus, illuminator A is only visible to camera A, and illuminator B is only visible to camera B.

In another embodiment, illuminator A and illuminator B have the same wavelength, but are turned on at different times. If there is one camera, illuminators A and B can alternate turning on during the camera exposures so that all even-numbered camera exposures are taken while A is on and B is off, and all odd-numbered camera exposures are taken while A is off and B is on. This lowers the effective frame rate by a factor of 2, but allows one camera to capture images lit by A and B separately. The computer can then compare the two images to compute the brightness ratio at each point and determine when an object is touching the screen. It is easy to synchronize the illuminators to the camera by creating a circuit that reads or generates the camera's sync signal.

In another embodiment, two separate cameras can be linked to illuminators A and B (with both at the same wavelength), so long as the illuminators are strobed to turn on only when the corresponding camera is taking an exposure, and the exposures of the two cameras are staggered so that they do not overlap.

In all cases, the computer can compare the images of the screen lit by A and the screen lit by B to determine the brightness ratio at each point, and thus the distance of any objects from the screen. The example with A two feet from the screen and B one foot from the screen is simply one embodiment; other distance ratios or arrangements also work.

Tiling

Because the system is in a self-contained box and the screen can take up an entire side of that box, screens can be stacked together in a grid, with all their screens on the same side, to create a much larger screen. If the computer in each system is networked together, the systems can share information about their real-time vision signals and content, allowing the screens to function as one large seamless screen. For aesthetic reasons, the screens of the individual tiled units may be replaced with one very large screen.

Getting Distance Information from Amount of Blur

Figure 19A:
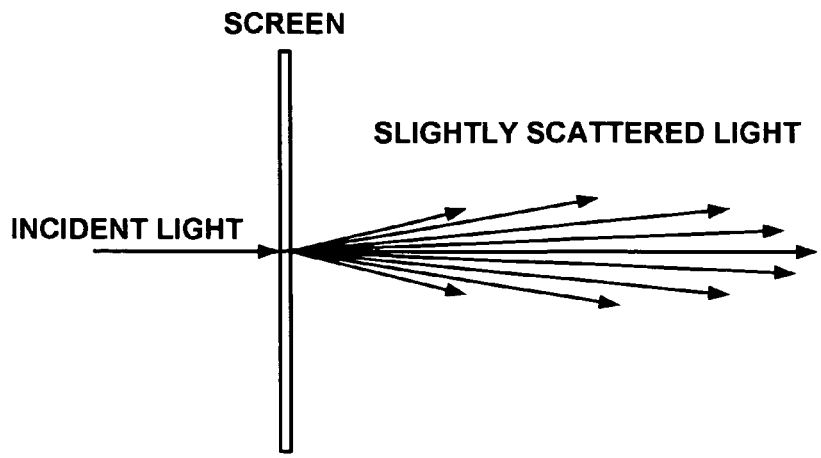
FIGS. 19A and 19B are schematic diagrams illustrating light scattering, in accordance with an embodiment of the present invention.

Some screen materials and structures can cause scattering of incident light such that the typical angle of scattering is small. Thus, the majority of light passing through the screen material changes direction slightly. FIG. 19A shows a conceptual example of slight scattering; the length of the arrow for each scattered ray of light represents the portion of light scattered in its direction; although a finite number of arrows are shown, the distribution of scattering angles is continuous.

Figure 19B:
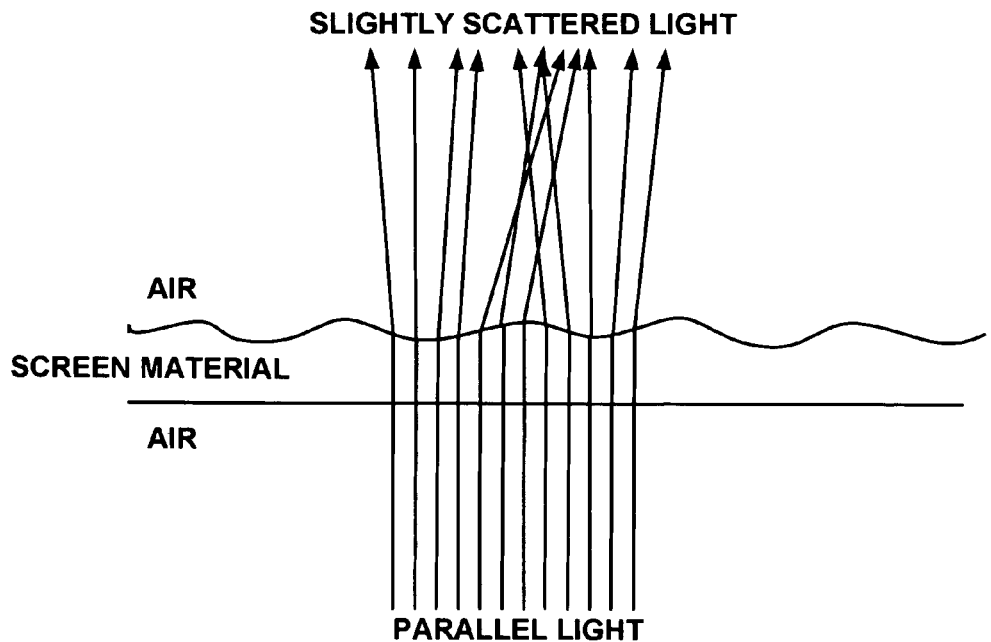

This form of scattering can be achieved in several ways. Materials with strong Mie scattering exhibit this property. In addition, materials that have textured surfaces also redirect light slightly in the desired manner. Ideally, the texture would only cause a small average and probabilistically smooth deviation in the light's path. FIG. 19B shows an example of such a texture. The size of the texture would be small enough to not detract from the viewing of the projected image. This scattering effect may be accomplished by altering the main screen material to have either strong Mie scattering or a textured surface. Alternately, these properties may be added to a second screen material that is sandwiched together with the main screen material.

The use of such a material as part of the screen would affect the way the camera views the scene. All objects viewed by the camera would be blurred due to the material's scattering property. However, the amount of blurring would depend on the distance. Objects touching the screen would remain unblurred, but ones further away would be progressively more blurred. This is because scattering a light ray by a given angle at the screen's surface translates to a physical distance of scattering that is proportional to the distance from the screen to the light ray. For example, scattering a light ray horizontally by 45 degrees causes it to deviate in its horizontal position by 1 foot at a distance of 1 foot from the screen, but the deviation is 2 feet at a distance of 2 feet from the screen.

The vision system can then use this blurred image to reconstruct the distance by many methods, including the use of edge detection techniques that detect both sharp and blurry edges and can make estimates of the amount of blur for each edge. The Elder-Zucker algorithm is one such edge detection technique. Once the amount of blur is known, the distance of the object's edge from the screen can be determined, giving the vision system 3D information about that object since the amount of blurriness is proportional to the distance.

The task of the vision system can be simplified by using a patterned illumination source, which projects an infrared pattern visible to the camera, instead of or in addition to the regular infrared illuminators. This pattern may include dots, lines, or any other texture with sharp edges. The pattern may be projected from several directions, including through the screen. If the pattern is projected through the screen, the amount of scattering will be doubled, but the effect of distance-dependent scattering will not change.

By illuminating all objects on the screen with a pattern, the vision system's performance is increased. Without the patterned illumination, it is difficult to determine 3D information at any location in the image where there are no edges, such as the middle of an object of uniform brightness. However, with all objects covered in this projected pattern, it is easy to get blur information at any point in the image.

With a projected texture, different methods can be used to estimate the amount of blur. Image convolutions such as Sobel filters or pyramid decompositions can be used to get information about signal strengths and gradients on different scales. If the texture is a dot pattern, places in the image that correspond to the dots can be located by looking for local maxima. Then, by examining the strength of the gradient of the area around each local maximum, it can be determined how much blurring has taken place. The gradient at the edge of the dot is roughly inversely proportional to the amount of blurring. Hence, the gradient at each dot can be related to the distance from the screen.

Camera Configurations

In one embodiment of the system, the camera is sensitive to light of a wavelength that is not visible to the human eye. By adding an illuminator that emits light of that invisible wavelength, the camera can take well-illuminated images of the area in front of the display screen in a dark room without shining a light in the users' eyes. In addition, depending on the wavelength of light chosen, the content of the display screen may be invisible to the camera. For example, a camera that is only sensitive to light of wavelength 920 nm-960 nm will see an LCD screen as transparent, no matter what image is being displayed on it.

In another embodiment of the system, the camera is only sensitive to a narrow range of wavelengths of near-infrared, where the shortest wavelength in the range is at least 920 nm. The area in front of the screen is illuminated with clusters of infrared LEDs that emit light in this wavelength range. The camera is a near-infrared-sensitive monochrome CCD fitted with a bandpass filter that only transmits light of the wavelengths produced by the LEDs. For further image quality improvement and ambient light rejection, the camera and LEDs can be strobed together.

Figure 20A:
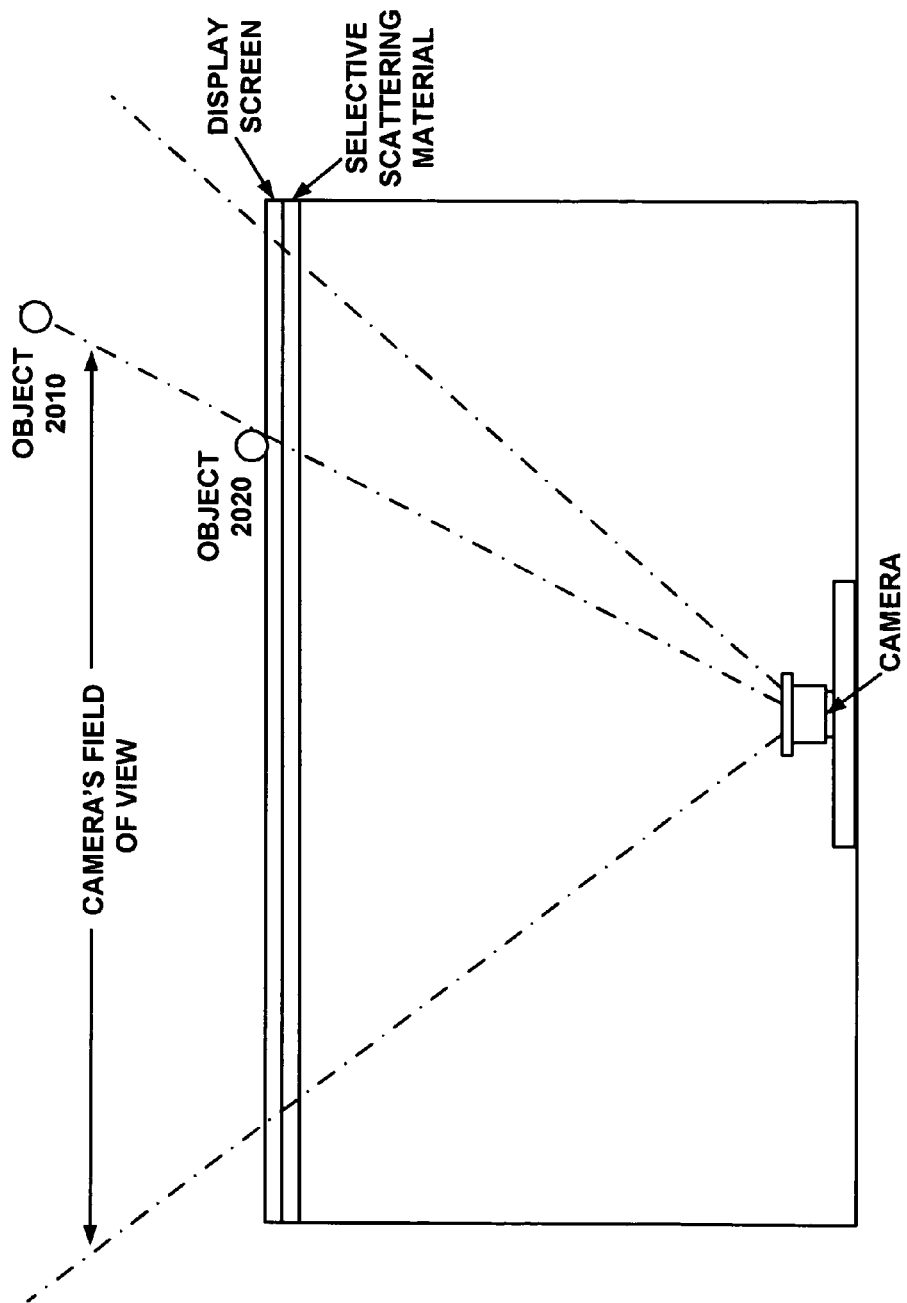
FIG. 20A illustrates high distortion, in accordance with an embodiment of the present invention.
Figure 20B:
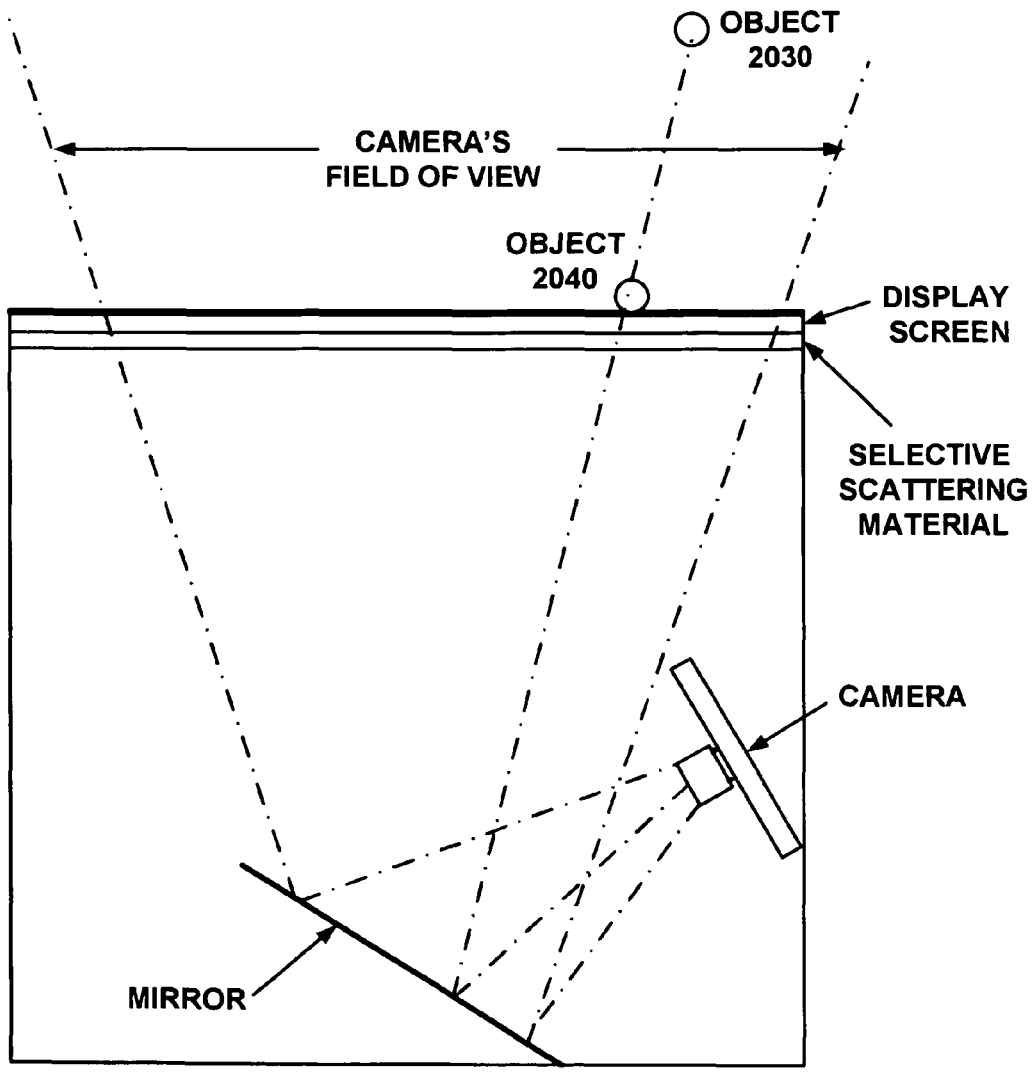
FIG. 20B illustrates reduced distortion by distancing camera from display screen, in accordance with an embodiment of the present invention.

In one embodiment of the system, the camera has a relatively undistorted view of the area in front of the screen. In order to reduce distortion, the camera can be placed at a significant distance from the screen. Alternatively, the camera can be placed closer to the screen, and a Fresnel lens can be placed on or behind the screen. FIG. 20A shows a high distortion configuration, with the camera very close to the screen. Note that in FIG. 20A, Object 2010 and Object 2020 appear to be in the same position from the camera's perspective, but are over very different parts of the screen. FIGS. 20B, 21A and 21B show several configurations in which distortion is reduced. FIG. 20B shows a low distortion configuration in which the camera is far from the screen; the overall display can be kept compact by reflecting the camera's view. Note that in FIG. 20B, Object 2030 and Object 2040 appear to be in the same position from the camera's perspective, and occupy similar positions above the screen. FIGS. 21A and 21B show the use of Fresnel lenses to reduce or eliminate distortion respectively.

Figure 21C:
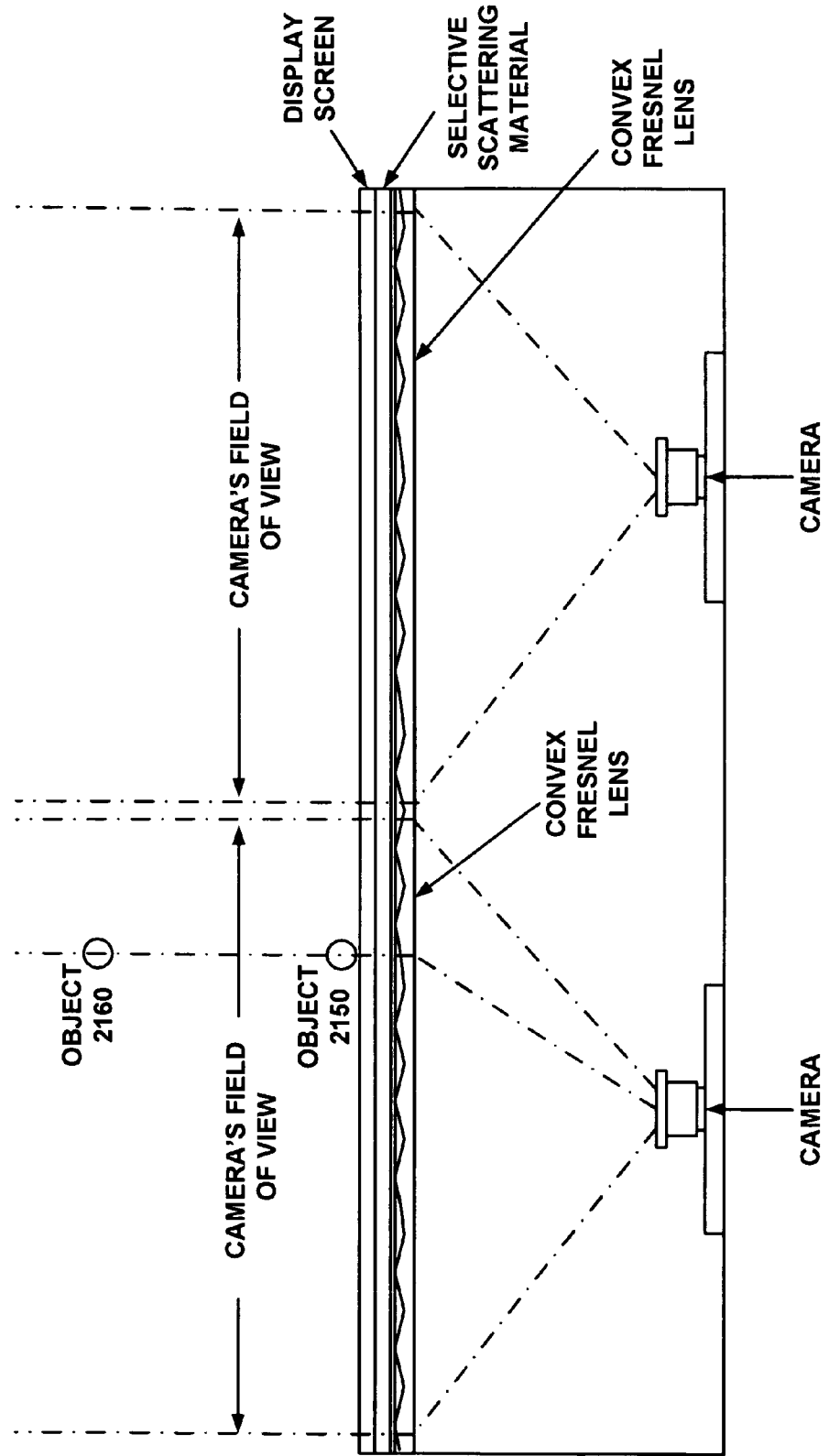
FIG. 21C shows the use of Fresnel lenses to eliminate distortion in a two-camera system, in accordance with an embodiment of the present invention.

Fresnel lenses can also be used to allow multiple cameras to be used in the system. FIG. 21C shows the use of Fresnel lenses to eliminate distortion in a two-camera system. Each camera has a Fresnel lens which eliminates distortion for that camera's view. Because the fields of view of the two cameras just barely touch without intersecting, objects will be able to pass seamlessly from one camera's view to the other camera's view. This technique extends to larger numbers of cameras, allowing a grid of cameras to be placed behind the screen. This technique allows the interactive display to be very shallow, giving it a form factor similar to a flat-panel display. In a similar way, the use of a Fresnel lens to eliminate distortion allows multiple self-contained displays to be tiled together in a way that allows the cameras from all the displays to be seamlessly tiled together.

If a technique is used to acquire a 3D image from the camera, the camera's position becomes less important, as the distortion can be corrected in software by performing a coordinate transformation. For example, the camera's depth reading for each pixel can be transformed to an (x,y,z) coordinate, where x and y correspond to a position on the display screen nearest to the point, and z corresponds to the distance from the position (x,y) on the screen to the point. A 3D image can be obtained in hardware by using a time-of-flight camera, among other software-based and hardware-based approaches. Manufacturers of 3D time-of-flight cameras include Canesta and 3DV Systems. The aforementioned approaches are fully compatible with placing a time-of-flight camera behind the screen, since most time-of-flight cameras use infrared illuminators.

Illuminators for the Camera

Illuminators that illuminate the interactive area in front of the screen in light of the camera's wavelength can be placed either around the screen, behind the screen, or both.

If these illuminators are placed around the screen, they shine directly onto the interactive area, allowing their brightness to be put to maximal use. However, this configuration is unreliable; users may block the illuminator's light path, preventing some objects in the interactive area from being illuminated. Also, this configuration makes it difficult to illuminate objects that are touching the screen.

The aforementioned problems with illuminators placed around the screen are solved by placing illuminators behind the screen; with illuminators near the camera, any object visible to the camera will be illuminated. However, the light from these illuminators may be backscattered by the Rayleigh scattering material, textured material, or scattering polarizer behind the screen. This backscattering significantly reduces the contrast of the camera's image, making it more difficult for the vision system to decipher the camera's image.

If the light is being scattered by a scattering polarizer, the camera is sensitive to near-infrared light, and the illuminator emits near-infrared light, then the aforementioned contrast loss can be reduced through the use of infrared linear polarizers, which linearly polarize infrared light. Placing an infrared linear polarizer in front of the camera, with the polarization direction parallel to the direction at which the scattering polarizer is transparent, will significantly reduce backscatter and improve contrast. Placing an infrared linear polarizer in front of the infrared illuminator, with the polarization direction parallel to the direction at which the scattering polarizer is transparent, will also reduce backscatter and improve contrast.

Window Display

According to another aspect of the present invention, the self-contained interactive video displays can be used with a window display. Self-contained interactive video displays can be deployed in a variety of physical configurations, for example, placing the screen horizontal, vertical, or diagonal. However, when deploying such a display on a window, there are several additional possible physical configurations.

Figure 22:
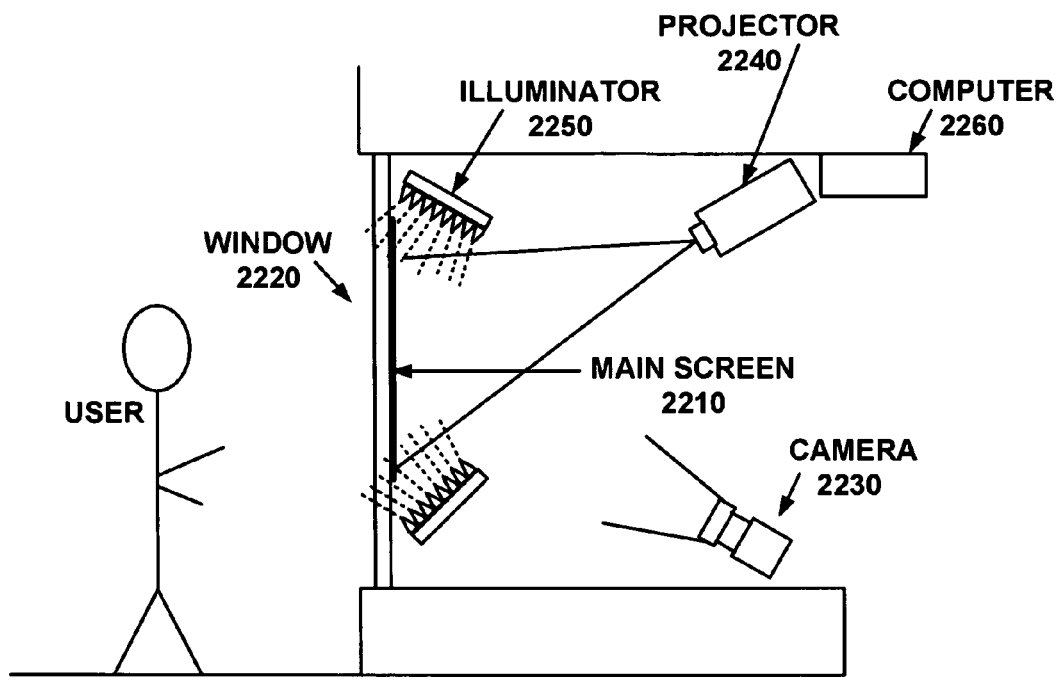
FIG. 22 is a schematic diagram illustrating a window display, in accordance with one embodiment of the present invention.

FIG. 22 illustrates an exemplary configuration of an interactive window display 2200, in accordance with an embodiment of the present invention. In one embodiment, instead of being self-contained, the components can be physically separated. The screen 2210 can be affixed directly to the window 2220 surface or mounted separately behind the window 2220. The camera 2230, projector 2240, and illuminators 2250 can be placed either in nearby or separate locations, and may be mounted on the floor, ceiling, or anywhere in between at various distances from the window 2220. Optionally, the infrared illuminators 2250 can be placed to the side of the screen 2210 so that they shine directly onto the subject instead of through the screen 2210. Also optionally, the communication between the camera 2230 and computer 2260, or between the computer 2260 and projector 2240, may be wireless.

The camera in window displays is generally aimed horizontally. Consequently, the camera usually views people at an arbitrary distance from the screen. While the vision software, screen material, or other systems can be used to identify and remove objects at an excessive distance, it is also possible to tilt the camera upwards so that more distant objects may need to be of a certain minimum height in order for the camera to see them. Thus, only people within a few feet of the screen are able to interact with it. Users approaching such a display will notice their virtual presence first appear at the bottom of the screen and then gradually rise up as they come closer to the screen. FIG. 22 shows a camera 2230 tilted upward in this manner.

Glare is an issue in window displays. However, users of a window display are limited in the angles that they typically to view the screen. They will be unlikely to look at the screen from an oblique angle in general because they will probably maintain a distance of at least a few (e.g., two) feet from the display so as to have room to point at objects on the display with their arms and hands. For a display at and below eye level, people are especially unlikely to look up at the display from an oblique angle. If the projector is placed extremely close to the screen but above the top of the screen, with its beam projecting downward at an oblique angle, then this low-glare situation will be realized. Alternatively, if the display is set up to be at or above eye level, then a similar glare reduction can be achieved by placing the projector below and close to the screen, projecting upward at an oblique angle. Note that off-axis projectors are especially useful for these sorts of configurations.

Window Unit: Alternative Configuration

Visible-light transparency of the screen is more desirable in a window unit than in a self-contained unit. Thus, window displays can be built with a partially transparent screen that is translucent to light that is shined on it at a particular angle. One material that can be used to build the partially transparent screen is marketed under the trade name "HoloClear" and manufactured by Dai Nippon Printing; such material is translucent to light shined onto it at a 35 degree angle. This screen takes the place of the IR-transparent VIS-translucent screen or the scattering polarizer screen. If the projector shines light onto the screen from that angle, then there will be no glare from the projector. As long as the camera is at a significantly different angle (to the screen) from the projector, the system will be able to function properly.

Interface to Window Unit

The interface to the window unit can be made distance-dependent with the same methods as the self-contained unit, including the use of stereo cameras, time-of-flight cameras, and the techniques described in the "Touchscreen" sections of this patent. In one embodiment, the interactions with the window unit include a mix of full-body interactions and more precise gestures, such as pointing.

With a vision system that extracts depth information, it is possible to isolate pointing gestures and other hand motions through several methods. First, the camera image can be divided up into distance ranges, with one distance range for full-body interaction and another (presumably closer) distance range for pointing gestures. The objects in the latter distance range would be tracked as pointers, with their locations serving as input to the application running on the display. Alternatively, all objects less than a particular distance from the screen could be analyzed to find the point within them that is closest to the screen. If that point is closer to the screen from the rest of the object by at least a particular threshold, then it could become an input for pointing gestures. Visual feedback on the screen could be provided to show the position of any detected hand motions.

Techniques for Reducing Glare

Figure 23A:
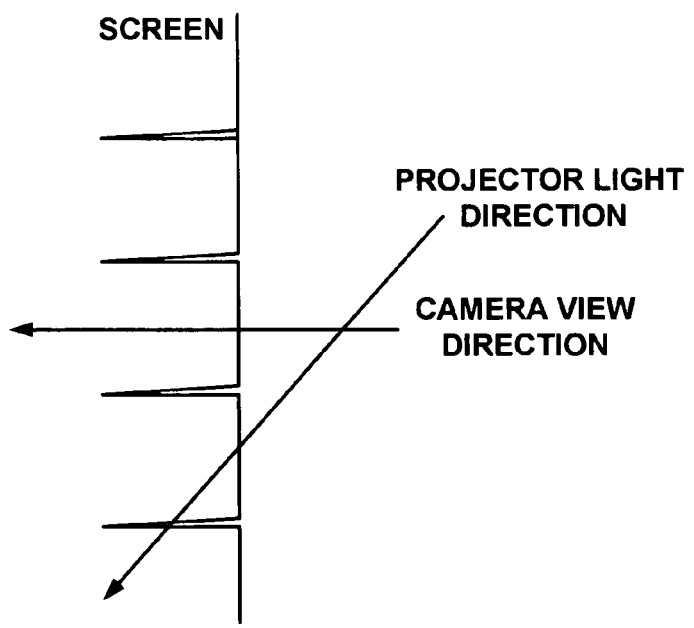
FIGS. 23A, 23B, and 23C are schematic diagrams respectively illustrating various techniques for reducing glare, in accordance with different embodiments of the present invention.
Figure 23B:
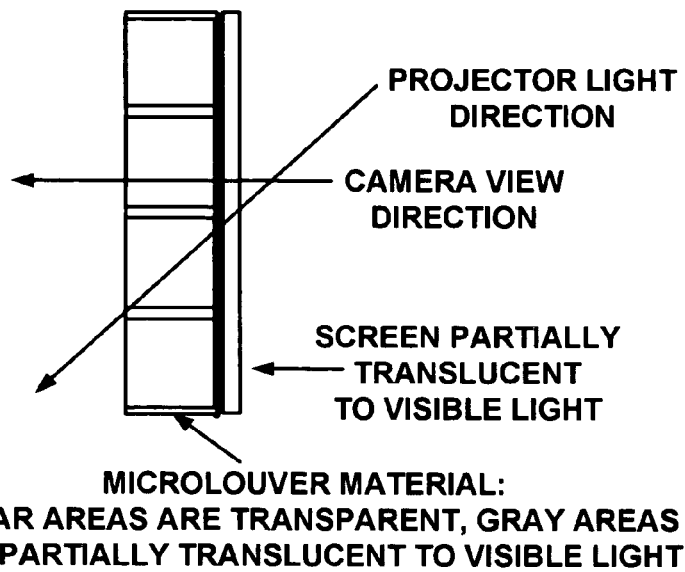
Figure 23C:
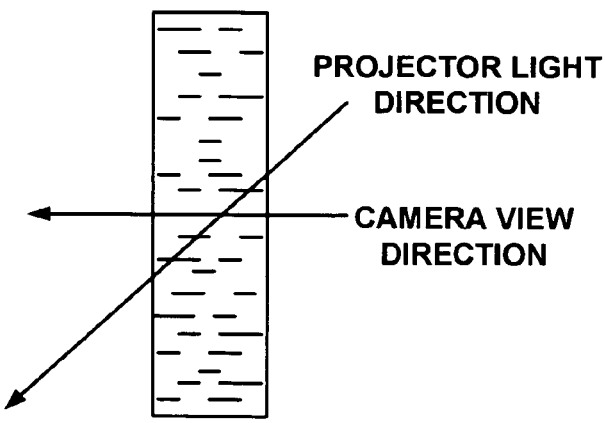

If it can be ensured that the viewer always sees the projector glare from a specific range of angles, then the glare can be further reduced without adversely affecting the camera's view of the scene. FIGS. 23A, 23B and 23C are simplified schematic diagrams respectively illustrating various techniques for reducing glare in accordance with different embodiments of the present invention. FIG. 23A illustrates a pleated screen material. Suppose that the screen is pleated so that a light ray coming from an oblique angle would have to go through several layers of screen, while a light ray coming close to straight through would usually only go through one layer. If the projector's light comes from an oblique angle while the camera views the screen closer to parallel, then the amount of scattering of the projector's light would be greatly increased without adversely affecting the camera's view. In FIG. 23A, the majority of the camera's view only goes through one screen layer, while all of the projected light goes through multiple layers.

There are several ways of achieving the desired effect. Instead of a pleated screen, a flat screen could be supplanted with a microlouver material to create the same effect as a pleated screen, as shown in FIG. 23B. Alternatively, small, flat sheetlike particles of screen material could be added (all oriented horizontally) to a transparent substrate, as shown in FIG. 23C. In all cases, a typical light ray approaching the screen from an oblique angle encounters far more scattering material than a typical light ray that is perpendicular to the material.

The texture of the screen in all cases should be small enough that the viewer would not notice it. This technique is most useful when using an off-axis projector; however, it is useful in any situation where the projector and camera are viewing the screen from different angles.

It is important to prevent the infrared light source from shining on the screen and reducing the contrast. Thus, if the infrared illuminator is placed behind the screen, it is advantageous to place the infrared illuminator at an angle for which the screen's scattering is minimized.

Alternatively, view control film products (such as Lumisty), which are translucent at a narrow range of viewing angles and transparent at all other angles, can help reduce glare in some cases.

Figure 24A:
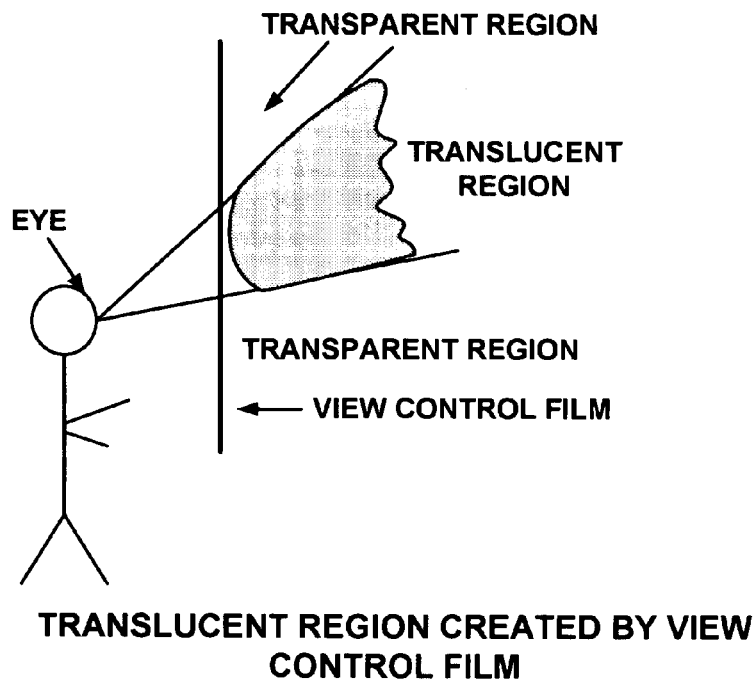
FIGS. 24A and 24B are schematic diagrams illustrating a technique for reducing glare using view control film, in accordance with embodiments of the present invention.
Figure 24B:
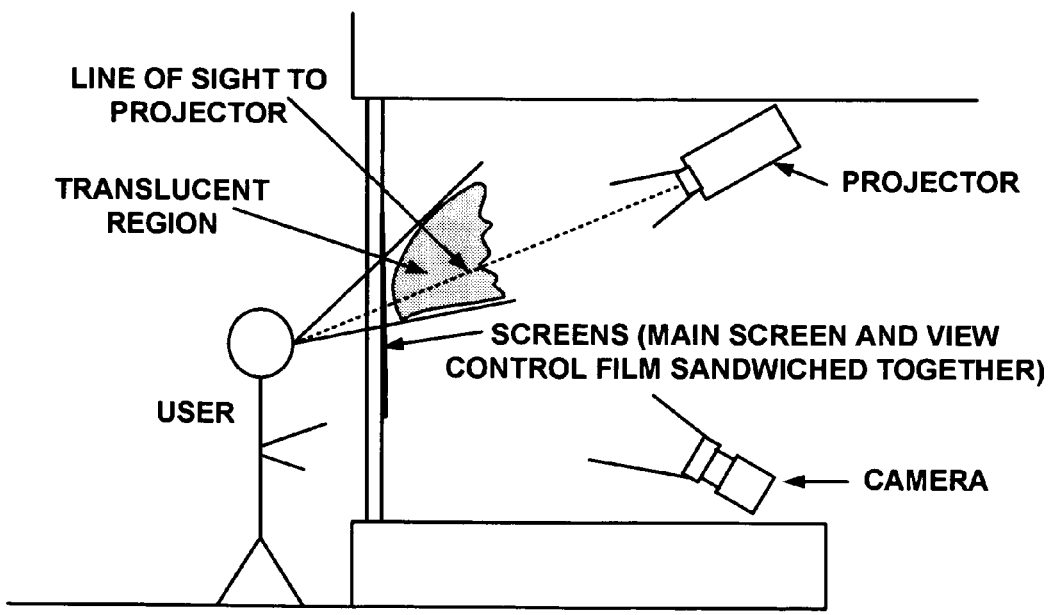

By placing the projector at a particular angle to the screen, it can be ensured that anyone looking directly into the projector's beam will be looking at the screen at an angle for which the view control film is translucent. FIGS. 24A and 24B show one method by which view control film can reduce glare. FIG. 24A shows the experience of a person (or camera) viewing light through one kind of view control film. Light coming from the translucent region is diffused, reducing or eliminating any glare from light sources in this region. Light sources from the two transparent regions will not be diffused, allowing the person or camera to see objects in these regions. The boundaries of the region of view control film are often defined by a range of values for the angle between a light ray and the view control film's surface along one dimension. FIG. 24B shows the view control film in a sample configuration for reducing glare on an interactive window display. The view control film is used in conjunction with the IR-transparent VIS-translucent screen. Because of the angle of the projector, it is impossible to look directly into the projector's beam without being at an angle at which the view control film diffuses the light. However, the camera is able to view objects through the view control film because the camera is pointed at an angle at which the view control film is transparent. Thus, glare is reduced without affecting the camera's ability to view the scene.

Exemplary Configuration

Figure 25:
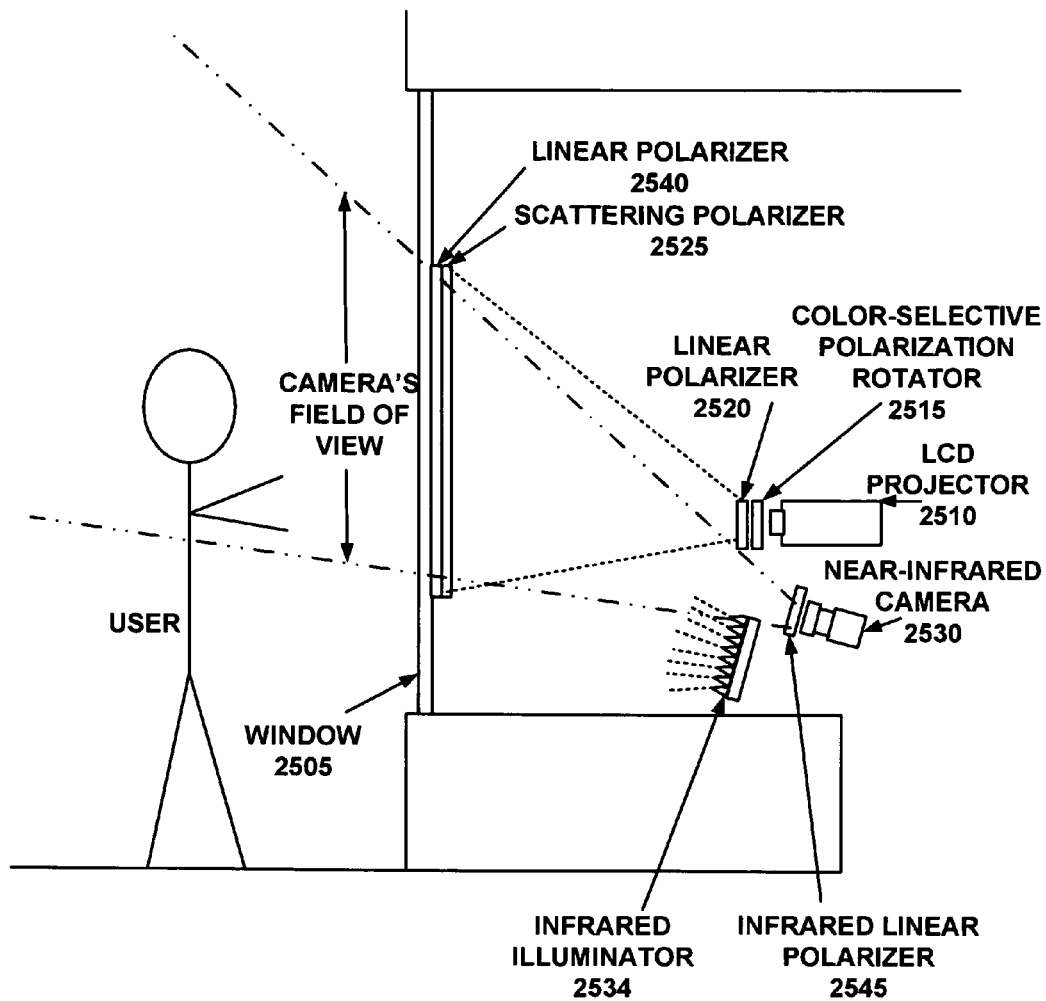
FIG. 25 illustrates a cross-section of one configuration of window display using scattering polarizer, in accordance with an embodiment of the present invention.

One exemplary embodiment of a window-based display 2500 utilizes a scattering polarizer as a screen, as shown in FIG. 25. This embodiment is an interactive window display 2500 in which all the sensing and display components necessary to make the display work are placed behind the window 2505. The window display 2500 allows users in front of the window 2505 to interact with video images displayed on the window 2505 through natural body motion.

In one embodiment, the displayed image is generated by an LCD projector 2510. In most LCD projectors, red and blue light are polarized in one direction, while green is polarized in a perpendicular direction. A color selective polarization rotator 2515, such as the retarder stack "ColorSelect" technology produced by the ColorLink Corporation, is used to rotate the polarization of green light by 90 degrees. Alternatively, the polarization of red and blue light can be rotated by 90 degrees to achieve the same effect. By placing color selective polarization rotator 2515 in front of projector 2510, all the projector's light is in the same polarization. The scattering polarizer 2525 is oriented so that the direction of maximum scattering is parallel to the polarization of the projector's light. Thus, when this projector's light reaches scattering polarizer 2525, it is all scattered, providing an image for the user on the other side of the screen.

A video camera 2530 sensitive to only near-infrared light views the area in front of the screen, referred to as the "camera's field of view". Objects within this field of view will be visible to camera 2530. Illumination for the camera's field of view comes from sets of infrared LED clusters 2535, which produce light in wavelengths viewable by camera 2530, on the back side of the screen. Note that the camera's field of view is slanted upward so that only people who are near the screen fall within the field of view. This prevents objects distant from the screen from affecting the interactive application that uses camera 2530 as input.

The paths of visible and infrared light through the exemplary embodiment in FIG. 25 will now be described. The two perpendicular polarizations of light are referred to as polarization A and polarization B.

Visible light emerges from LCD projector 2510, with red and blue light in polarization A and green in polarization B. This light first passes through color selective polarization rotator 2515, which leaves the red and blue light unaffected, but rotates the polarization of green light such that it is in polarization A. Next, this light passes through a linear polarizer 2520, which transmits light in polarization A and absorbs light in polarization B. This linear polarizer 2520 "cleans up" the light—it absorbs any of the projector's light which is still B-polarized. Next, the light passes through scattering polarizer 2525, which is oriented to scatter light in polarization A and transmit light in polarization B. Thus, nearly all of the projector's light is scattered. Note that this scattered light retains its polarization A. Optionally, the light may then pass through a linear polarizer 2540 which transmits light in polarization A and absorbs light in polarization B. This polarizer tends to improve image quality.

The infrared light emitted from infrared illuminators 2535 may begin unpolarized. Optionally, for improved clarity, this light can first pass through an infrared linear polarizer to polarize it in polarization B so that less of it will be scattered by scattering polarizer 2525. If the light is unpolarized, some of it will be scattered as it passes through scattering polarizer 2525, but the light of polarization A will pass through scattering polarizer 2525 unscattered. Since the wavelength of the infrared light is sufficiently long, it passes unaffected through any visible-light linear polarizers 2540 and can illuminate objects in front of the screen, such as a human user.

Infrared light returning from in front of window 2505 toward camera 2530 will be unaffected by linear polarizer 2540. However, as the light passes through scattering polarizer 2525, the light of polarization A will be scattered while the light of polarization B will remain unscattered. The camera 2530 has an infrared linear polarizer 2545 immediately in front of it; this polarizer 2545 absorbs light of polarization A and transmits light of polarization B. Thus, camera 2530 only views light of polarization B, which was left unscattered by scattering polarizer 2545. This gives camera 2530 a clear, high-contrast image of the area in front of the screen.

Using Prismatic Films

Figure 26:
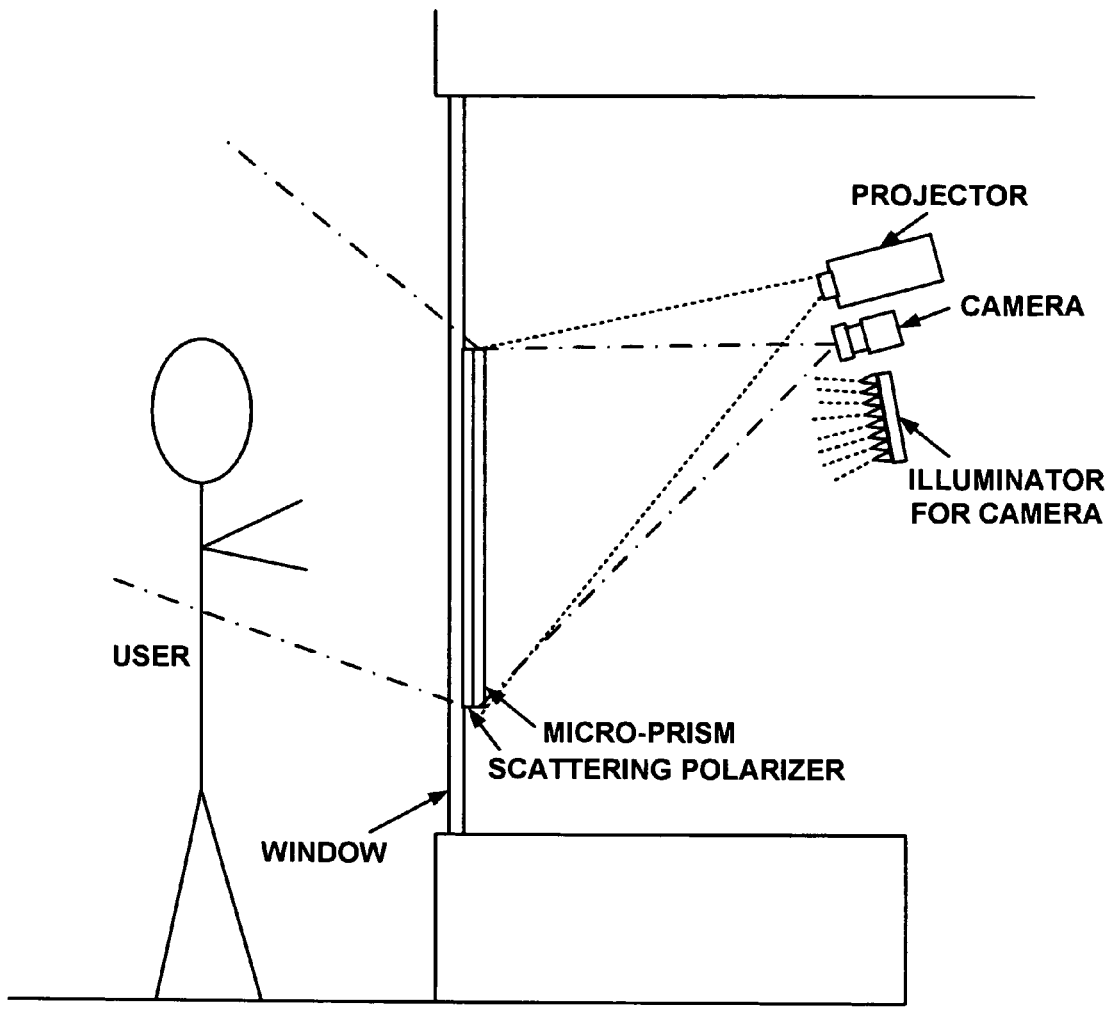
FIG. 26 illustrates a cross-section of one configuration of window display using scattering polarizer and a micro-prism material, in accordance with an embodiment of the present invention.

In interactive projected window displays in general, it is often desirable to have the area under the window display clear, but position the camera so that the area it views slopes upward. This situation can be achieved with the use of prismatic films that redirect all light that pass through them by a specific angle. For examples, the Vikuiti IDF film made by 3M redirects incoming light by 20 degrees. By placing one or more of these films on either side of the projection screen to redirect light upward, the camera can be placed higher relative to the screen, as shown in FIG. 26.

Compaction

Figure 27:
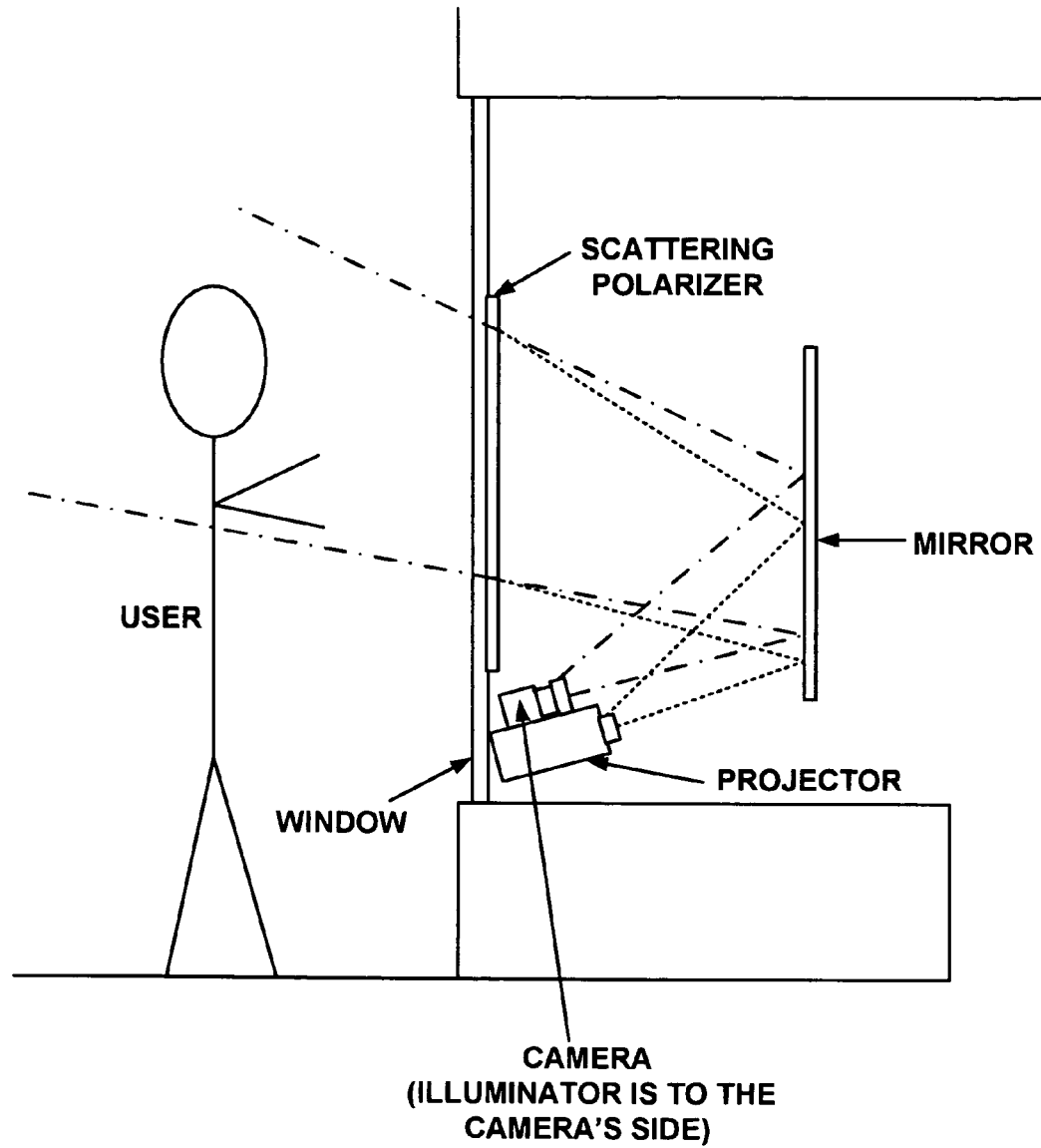
FIG. 27 illustrates a cross-section of one configuration of window display using a mirror for compaction purposes, in accordance with an embodiment of the present invention.

The overall size of the system can be compacted using a mirror. FIG. 27 shows a configuration in which the camera and projector are placed next to the window, pointing away from it, and a mirror reflects their light beams back toward the window.

Camera Improvements

For further image quality improvement and ambient light rejection, the camera and camera's illuminators can be strobed together. This approach is fully compatible with the use of various software and hardware approaches for 3D imaging. In particular, the camera and illuminator in this design can be replaced with a time-of-flight camera.

Visible Light System

If no linear polarizers are added next to the scattering polarizer (as shown in FIG. 25), then the design does not require the use of an infrared camera. A color or black-and-white visible light camera is able to image the area in front of the screen, so long as there is a visible-light linear polarizer immediately in front of the camera, with the polarization direction parallel to the direction for which the scattering polarizer is transparent. Thus, the projected image is unseen by the camera, allowing the camera to see the area in front of the screen unimpeded. This camera can work either with the existing ambient light or with additional visible lights placed near the display to illuminate users and objects in front of the screen. If additional visible lights are added, the camera and lights may be strobed together, as described in the section of the present application entitled "Directional Ambient Infrared" to improve the quality of the camera's images and limit the effects of ambient and projector light on the image.

For further image quality improvement, a high-speed aperture can be placed in front of the projector's lens. This aperture may be mechanical or electronic; one available electronic aperture is the liquid-crystal-based Velocity Shutter, produced by Meadowlark Optics. In one embodiment, this shutter remains open nearly all of the time, allowing the projector light to pass through. The shutter only closes to block the projector's light while the camera is taking a picture. If the camera's exposure time is brief, then the brightness of the projector will be almost unaffected. Note that the use of a velocity shutter to block the projector's light during the camera's exposure also allows a visible-light camera to be used in front projected interactive floor or wall displays.

Note that with the use of a visible-light camera in an interactive video projection system, a real-time picture of the people in front of the screen (the system's users) is obtained in addition to a vision signal classifying each pixel of the camera's image as foreground or background. This allows the vision system to isolate a picture of the system's users with the static background removed. This information allows the system to place a color image of the users in the image it displays, with artificially generated images inserted on and around the users. If this system is properly calibrated, a user could touch the screen, and the displayed image of the user would touch the same location on the screen at the same time. These features provide significant improvement in the quality of interactive applications running on this display including, for example, allowing users to literally see themselves placed inside the interactive content.

The visible-light image from the camera can be used to create a virtual mirror, which looks and behaves like a real mirror, but the mirror image can be electronically manipulated. For example, the image could be flipped horizontally to create a non-reversing mirror, in which users see an image of themselves as other people see them. Alternatively, the image could be time-delayed so that people could turn around to see their own backs. This system could thus have applications in environments where mirrors are used including, for example, dressing rooms.

Time-of-Flight Camera Interactive Display

Figure 28:
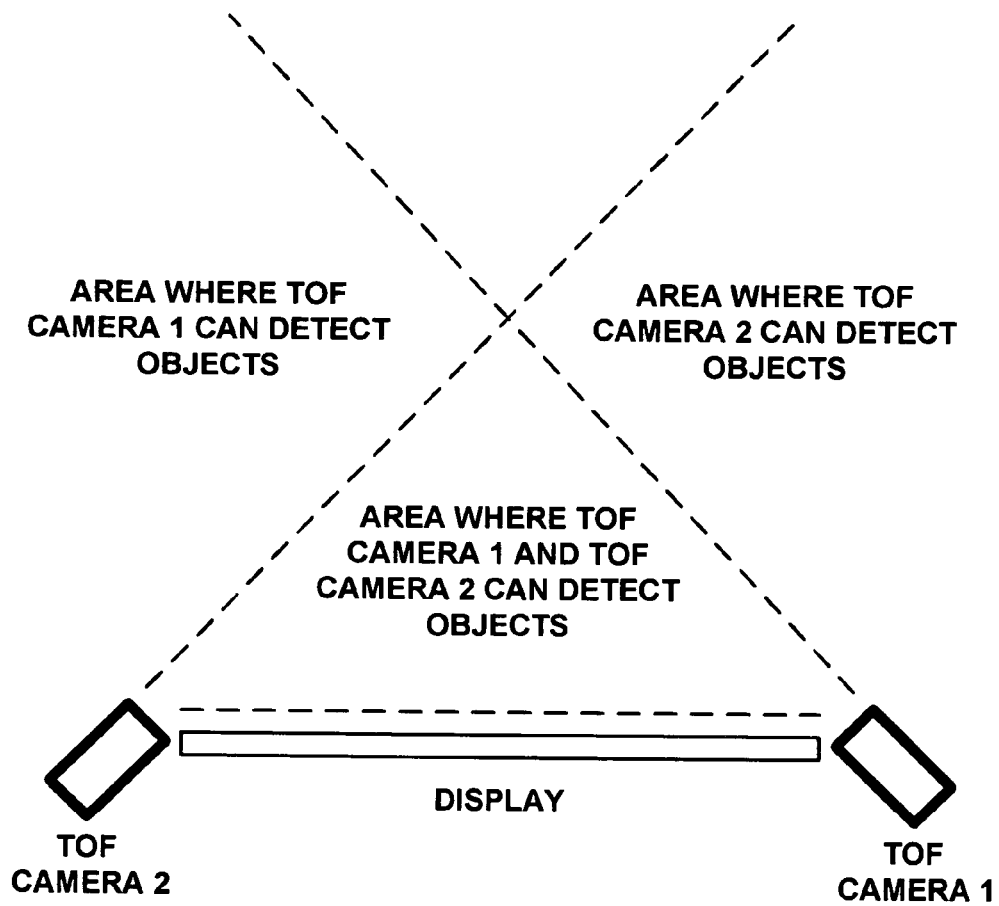
FIG. 28 illustrates a side view of an interactive display including multiple time-of-flight cameras, in accordance with an embodiment of the present invention.

Embodiments of the present invention may be implemented using time-of-flight cameras. A time-of-flight camera has a built-in capability to detect distance information for each pixel of its image. Using a time-of-flight camera eliminates the need for a modified display. In other words, the time-of-flight camera may work with any display (e.g., an LCD panel, a cathode-ray tube display, etc.) without modifications. A single time-of-flight camera may be used. However, a single time-of-flight camera may not be able to detect objects that are blocked by objects closer to the camera. Therefore, embodiments of the present invention utilize multiple time-of-flight cameras, as shown in FIG. 28.

Figure 29:
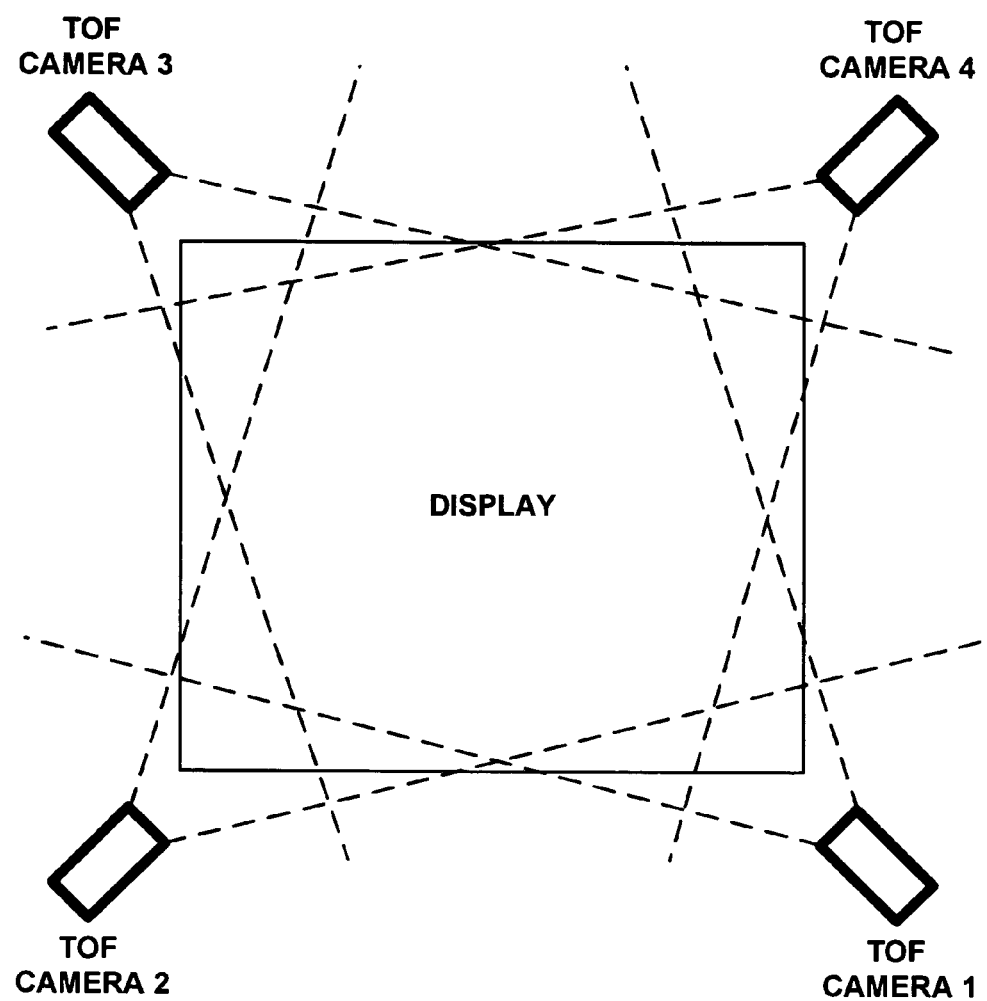
FIG. 29 illustrates a top view of an interactive display including multiple time-of-flight cameras, in accordance with an embodiment of the present invention.

With redundancy of cameras, there is no longer a need to worry about one camera not being able to detect al the objects because of one object occluding another object. For example, as shown in FIG. 29, four time-of-flight cameras may be placed at the corners of a display, ensuring that the entire area of the display is interactive. In order to use this time-of-flight implementation for multiple cameras, a coordinated transform is performed on each pixel of each time-of-flight camera to put it in a common coordinate space. One such space is defined by: (x, y)—the position of the point projected perpendicular onto the display surface, and (z)—the distance from the display. This coordinate space transformation can be determined by looking at the angle of each camera (and position) relative to the screen. Alternatively, the transformation may be determined by a calibration process, in which an object of known size, shape and position is placed in front of the screen. By having each of the cameras image the object, the appropriate transformation function can be determined from points viewed by each camera into points in the common coordinate space. If the camera coordinate transforms are done in real time, then a real-time picture of the area in front of the camera in 3D is achieved.

Uses

The interactive video display system can be used in many different applications. The system's capability to have touch-screen-like behavior as well as full or partial body outline interaction increases its appeal for information interfaces which require more precise selection and manipulation of buttons and objects.

Uses of the transparent-display-screen-based and projector-based interactive display systems include, but are not limited to, interactive video games in which users move their bodies to play the game, interactive menu, catalog, and browsing systems that let users browse through pages of informational content using gestures, systems that allow users to "try on" clothing using an image of themselves, pure entertainment applications in which images or outlines of users serve as input to a video effects system, interactive characters that interact with the motions of users in front of the screen, and virtual playlands and storybooks that users interact with by moving their bodies.

Other uses of the present invention include, but are not limited to: allowing users to customize or view available options for customizing the product on display, allowing the product on display to be ordered at the display, using either the display interface, a keyboard, a credit card swiper, or a combination of the three, comparing the features of multiple products on the display, showing combinations or compatibilities between multiple products on the display, and placing a product in different virtual settings on the screen to demonstrate the features (e.g., water, forest, asphalt, etc.)

Peripherals

Transparent-display-screen-based and projector-based interactive display systems can incorporate additional inputs and outputs, including, but not limited to, microphones, touchscreens, keyboards, mice, radio frequency identification (RFID) tags, pressure pads, cellular telephone signals, personal digital assistants (PDAs), and speakers.

Transparent-display-screen-based and projector-based interactive display systems can be tiled together to create a single larger screen or interactive area. Tiled or physically separate screens can also be networked together, allowing actions on one screen to affect the image on another screen.

In an exemplary implementation, the present invention is implemented using a combination of hardware and software in the form of control logic, in either an integrated or a modular manner. Based on the disclosure and teachings provided herein, a person of ordinary skill in the art will know of other ways and/or methods to implement the present invention.

In one exemplary aspect, the present invention as described above provides a system that allows a camera to view an area in front of a display. In a related invention, a system is provided to create a reactive space in front of the display. The present invention can be used to capture information from the reactive space.

It is understood that the examples and embodiments described herein are for illustrative purposes only and that various modifications or changes in light thereof will be suggested to persons skilled in the art and are to be included within the spirit and purview of this application and scope of the appended claims. All publications, patents, and patent applications cited herein are hereby incorporated by reference for all purposes in their entirety.

Various embodiments of the invention, a self-contained interactive video display system, are thus described. While the present invention has been described in particular embodiments, it should be appreciated that the invention should not be construed as limited by such embodiments, but rather construed according to the below claims.

What is claimed is:

1. A display system comprising:
projecting means for projecting visual images;
depicting means comprising a scattering polarizer for depicting visual images projected by the projecting means, wherein the projecting means is configured to emit polarized light in a polarization substantially scattered by the scattering polarizer;
sensor means sensitive to light of a polarization not substantially scattered by the scattering polarizer positioned on a first side of the depicting means for acquiring images representative of at least a portion of one or more objects positioned on a second side of the depicting means, wherein the first and second sides of the depicting means are substantially opposite sides of the depicting means; and
computing means for detecting an interaction of at least one of the one or more objects with at least a portion of at least one of the visual images projected by the projecting means.

2. The display system of claim 1, wherein the computing means is configured to update the visual images projected by the projecting means in response to the detected interaction.

3. The display system of claim 1, wherein the depicting means comprises a time-based material configured to change from substantially translucent to substantially transparent in response to a state of the projecting means.

4. The display system of claim 1, wherein the depicting means comprises a material that is substantially translucent at a particular angle and substantially transparent at other angles, wherein the projecting means projects light onto the depicting means from at least the particular angle.

5. The display system of claim 1, wherein the depicting means comprises a screen that is at least partially transparent.

6. An interactive video display system comprising:
a projector configured to project a visual image;
a screen positioned so that the visual image is projected onto a back side of the screen, wherein the screen is at least partially transparent and comprises a material that is substantially translucent at a particular angle and substantially transparent at other angles, wherein the projector projects light onto the screen from the particular angle;
a camera configured to acquire images representative of at least a portion of an object near a front side of the screen that is opposite the back side of the screen; and
a computer system configured to receive the images from the camera and, based at least on the images, to detect an interaction of the object with at least a portion of the visual image and to direct the projector to change the visual image in response to the interaction.

7. A method of projecting visual images onto a screen, the method comprising:
projecting a visual image onto a first side of a screen, wherein the screen is at least partially transparent and configured for viewing from a second side of the screen opposite the first side of the screen;
acquiring images from an imaging device positioned on the first side of the screen, wherein the images are representative of at least a portion of an object positioned near the screen;
illuminating the object with strobed illumination that is synced with the imaging device; and
detecting an interaction of the object with at least a portion of the visual image based at least partly on the acquired images.

8. The method of claim 7, further comprising:
updating the visual image in response to the interaction.

9. An interactive video display system comprising:
a projector configured to project a visual image;
a screen positioned so that the visual image is projected onto a back side of the screen, wherein the screen is at least partially transparent;
a camera configured to acquire images representative of at least a portion of an object near a front side of the screen that is opposite the back side of the screen;

an illuminator configured to illuminate the object, wherein the illumination is strobed in time with exposures of the camera; and a computer system configured to receive the images from the camera and, based at least on the images, to detect an interaction of the object with at least a portion of the visual image and to direct the projector to change the visual image in response to the interaction.

10. The interactive video display system as recited in claim 9, further comprising an illuminator configured to illuminate the object with infrared illumination, and wherein the camera is an infrared camera for detecting infrared illumination.

11. The interactive video display system as recited in claim 9 wherein linear polarizing films of perpendicular orientations are placed adjacent to the front side and the back side of the screen.

12. The interactive video display system as recited in claim 9 wherein the projector emits polarized light, and a linear polarizing film of perpendicular orientation is placed adjacent to the front side of the screen.

13. The interactive video display system as recited in claim 1 wherein the projector, the camera, the illuminator, and the computer system are comprised within an enclosure, and wherein one side of the enclosure comprises the screen.

14. The interactive video display system as recited in claim 9 further comprising a mirror for projecting the visual image onto the screen, wherein the projector is pointed indirectly at the screen and the mirror redirects the visual image to the screen.

15. The interactive video display system as recited in claim 1, wherein the illuminator projects illumination through the screen onto the object.

16. The interactive video display system as recited in claim 15, wherein the illuminator is positioned so as to reduce any potential for glare effects on the camera.

17. The interactive video display system as recited in claim 9 wherein the illuminator is located next to the screen such that the illuminator does not project illumination through the screen.

18. The interactive video display system as recited in claim 9 comprising a plurality of illuminators, wherein the illuminators are located next to the screen and behind the screen.

19. The interactive video display system as recited in claim 9 wherein the projector is an off-axis projector.

20. The interactive video display system as recited in claim 9 further comprising a Fresnel lens positioned adjacent to the screen to correct distortion of a view of the camera.

21. The interactive video display system as recited in claim 9, further comprising a series of mirror strips positioned at a distance from the screen to correct distortion of a view of the camera.

22. The interactive video display system as recited in claim 9 wherein the screen comprises a scattering polarizer, wherein the projector emits polarized light in a polarization substantially scattered by the scattering polarizer, and the camera is sensitive to light of a polarization not substantially scattered by the scattering polarizer.

23. The interactive video display system as recited in claim 9 wherein the screen comprises a material that substantially scatters light of wavelengths emitted by the projector, but does not substantially scatter wavelengths detectable to the camera.

24. The interactive video display system as recited in claim 9 wherein the screen comprises a time-based material that can change from substantially translucent to substantially transparent, wherein the screen is substantially translucent when the projector is projecting the visual image, and is substantially transparent when the camera is detecting objects near the front side of the screen.

25. The interactive video display system as recited in claim 9 wherein an image of the camera is calibrated to the visual image such that the interaction caused by the object is matched to a physical position of the object near to the screen.

26. The interactive video display system as recited in claim 9 wherein the interactive video display system is operable to determine information about a distance of the object from the screen.

27. The interactive video display system as recited in claim 26 wherein the camera is a stereo camera.

28. The interactive video display system as recited in claim 26 wherein the camera is a time-of-flight camera.

29. The interactive video display system as recited in claim 28 wherein the time-of-flight camera is positioned such that the time-of-flight camera does not reflect back onto itself.

30. The interactive video display system as recited in claim 1 wherein the interactive video display system provides touchscreen functionality when the object is proximate the screen.

31. The interactive video display system as recited in claim 30 further comprising a transparent touchscreen adjacent the front side of the screen.

32. The interactive video display system as recited in claim 30 further comprising an edge-lit transparent sheet adjacent the front side of the screen, and wherein the camera is operable to distinguish light created when the object comes in contact with the edge-lit transparent sheet.

33. The interactive video display system as recited in claim 9 wherein the object is a body part of a human user.

34. The interactive video display system as recited in claim 9 wherein the interactive video display system may be tiled with a second interactive video display system.

35. The interactive video display system as recited in claim 9 further comprising a second camera, a first Fresnel lens for the camera, and a second Fresnel lens for the second camera, allowing spaces viewed by the camera and the second camera to be stitched together.

* * * * *